US012342332B2

United States Patent
Xin et al.

(10) Patent No.: US 12,342,332 B2
(45) Date of Patent: Jun. 24, 2025

(54) MULTI-LINK RESTRICTED TWT

(71) Applicants: SONY GROUP CORPORATION, Tokyo (JP); SONY CORPORATION OF AMERICA, New York, NY (US)

(72) Inventors: Liangxiao Xin, Santa Clara, CA (US); Mohamed Abouelseoud, Burlingame, CA (US); Li-Hsiang Sun, San Jose, CA (US); Qing Xia, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 356 days.

(21) Appl. No.: 18/049,285

(22) Filed: Oct. 24, 2022

(65) Prior Publication Data
US 2023/0139168 A1 May 4, 2023

Related U.S. Application Data

(60) Provisional application No. 63/263,340, filed on Nov. 1, 2021.

(51) Int. Cl.
*H04W 72/12* (2023.01)
*H04W 52/02* (2009.01)
(Continued)

(52) U.S. Cl.
CPC ....... *H04W 72/12* (2013.01); *H04W 52/0216* (2013.01); *H04W 74/0816* (2013.01);
(Continued)

(58) Field of Classification Search
CPC . H04W 72/12; H04W 76/15; H04W 52/0216; H04W 74/0816; H04W 74/0833; H04W 74/0866; H04W 84/12
See application file for complete search history.

(56) References Cited

U.S. PATENT DOCUMENTS

| 2021/0289512 | A1 | 9/2021 | Hu |
| 2021/0329500 | A1 | 10/2021 | Cariou |
| 2021/0360646 | A1 | 11/2021 | Chu |

FOREIGN PATENT DOCUMENTS

| JP | 2024508532 | | 8/2022 |
| JP | 2024532781 | A | 9/2024 |
| TW | 20211015 | A1 | 3/2021 |

OTHER PUBLICATIONS

Jason Yuchen Guo (Huawei Technologies Co Ltd): "CR-for-TXOP-Termination-of-NSTR-MLD", IEEE Draft; 11-21-1416-01-00BE-CR-FOR-TXOP-TERMINATION-Of-NSTR-MLD, IEEE-SA Mentor, Piscataway, NJ USAvol. 802.11 EHT; 802.11be, No. 1 Oct. 12, 2021 (Oct. 12, 2021), pp. 1-4, XP068185366.
(Continued)

*Primary Examiner* — Gbemileke J Onamuti
(74) *Attorney, Agent, or Firm* — O'BANION & RITCHEY LLP; John P. O'Banion

(57) ABSTRACT

A wireless protocol CSMA/CA and scheduling SPs of a R-TWT for RTA frame exchange. In addition to link level scheduling, R-TWTs can be scheduled from an MLD level. An R-TWT scheduling MLD is configured to schedule a Multi-Link (ML) R-TWT with SP scheduled on multiple links. These ML R-TWTs can be one or more SL R-TWTs, and a ML R-TWT can be an independent R-TWT from the SL R-TWT. The R-TWT scheduling MLD can: (a) assign a unique ML level R-TWT ID to identify a ML R-TWT, and if a ML R-TWT consists of SL R-TWTs each SL R-TWT is assigned to a unique link level R-TWT ID to identify it on its link; and (b) complete ML R-TWT signaling on one link for the ML R-TWT management on multiple links.

24 Claims, 33 Drawing Sheets

(51) Int. Cl.
    *H04W 74/08*     (2024.01)
    *H04W 74/0816*   (2024.01)
    *H04W 74/0833*   (2024.01)
    *H04W 76/15*     (2018.01)
    *H04W 84/12*     (2009.01)

(52) U.S. Cl.
    CPC ... *H04W 74/0833* (2013.01); *H04W 74/0866* (2013.01); *H04W 76/15* (2018.02); *H04W 84/12* (2013.01)

(56)           References Cited

OTHER PUBLICATIONS 802 11 Working Group of the LAN/MAN Standards Committee of the IEEE Computer Society: "Draft Standard for Information technology-Tele-communications and information exchange between systems Local and metropolitan area networks—Specific requirements ?? Part 11: Wireless LAN Medium Access Control ? (MAC) and Physical Layer (PHY) Specifications ?? Amendment 8: Enhancements for extre", IEEE Draft; Draft ,P802.11BE_D1.2_REDLINE_COMPARED_TO_DI.1, IEEE-Sa, Piscataway, NJ USA.
Chunyu Hu et al., "Protected TWT Enhancement for Latency Sensitive Traffic", IEEE 802.11-20/1046r5, Aug. 2020.
Liwen Chu et al., "Low Latency Support", IEEE 802.11-20/1058r0, Sep. 2, 2020.
Zhou Lan et al., "MLO Typical Usage Cases and Sub-Feature Prioritization", Broadcom Inc., IEEE 802.11-20/292r0, Jan. 2020.

TWT Setup Frame

| Frame Control | Duration | Address 1 | Address 2 | Address 3 | Sequence Control | data | FCS |
|---|---|---|---|---|---|---|---|

| Category | Action | Dialog token | TWT element |
|---|---|---|---|

**FIG. 2
(Prior Art)**

TWT Element

| Element ID | Length | Control | TWT parameter Information |
|---|---|---|---|

**FIG. 3
(Prior Art)**

Control Field

| NDP Paging Indicator | Responder PM Mode | Negotiation Type | TWT Information Frame Disabled | Wake Duration Unit | Reserved |
|---|---|---|---|---|---|

**FIG. 4
(Prior Art)**

Broadcast TWT Info Field (type 2 or 3)

| Request Type | Target Wake Time | Nominal Minimum TWT Wake Duration | TWT Wake Interval Mantissa | Broadcast TWT Info | Restricted TWT Traffic Info (optional) |
|---|---|---|---|---|---|

FIG. 5
(Prior Art)

Request Type Field

| TWT Request | TWT Setup Command | Trigger | Last Broadcast Parameter Set | Flow Type | Broadcast TWT Recommendation | TWT Wake Interval Exponent | Reserved |
|---|---|---|---|---|---|---|---|

FIG. 6
(Prior Art)

Broadcast TWT Info Field

| Restricted TWT Traffic Info Present | Reserved | Broadcast TWT ID | Broadcast TWT persistence |
|---|---|---|---|

FIG. 7
(Prior Art)

TWT Flow Field (type = 0 or 1)

| TWT Flow Identifier | Reserved | Negotiation Type | Teardown All TWT |
|---|---|---|---|

TWT Flow Field (type = 2)

| Reserved | Negotiation Type | Reserved |
|---|---|---|

TWT Flow Field (type = 3)

| Broadcast TWT ID | Negotiation Type | Teardown All TWT |
|---|---|---|

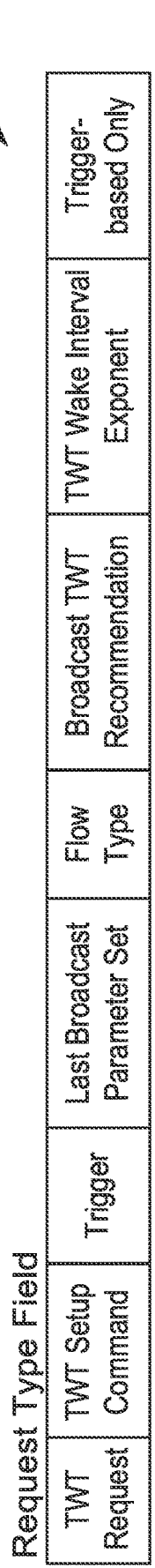
FIG. 29
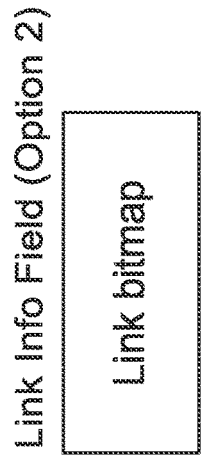
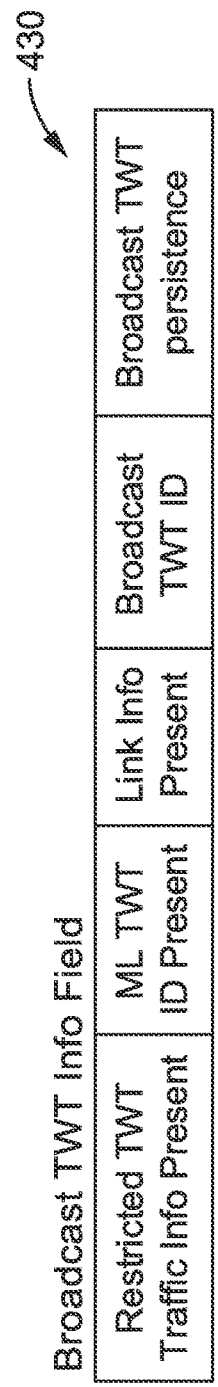
FIG. 30
FIG. 31
FIG. 32

Link Info Field (Option 3) 490

| Link ID | More Link ID | ... | Link ID | More Link ID |

FIG. 33

Link Info Field (Option 4) 510

| Link ID | Last Link ID | ... | Link ID | Last Link ID |

FIG. 34

Link Info Field (Option 5) 530

| Number of Link ID | Link ID | ... | Link ID |

FIG. 35

MULTI-LINK RESTRICTED TWT

CROSS-REFERENCE TO RELATED APPLICATIONS

This application claims priority to, and the benefit of, U.S. provisional patent application Ser. No. 63/263,340 filed on Nov. 1, 2021, incorporated herein by reference in its entirety.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

STATEMENT REGARDING FEDERALLY SPONSORED RESEARCH OR DEVELOPMENT

Not Applicable

BACKGROUND

1. Technical Field

The technology of this disclosure pertains generally to wireless local area networks using CSMA/CA, and more particularly to MLD R-TWT scheduling of a Multi-Link (ML) R-TWT with Service Periods (SPs) on multiple links.

2. Background Discussion

Current wireless technologies using Carrier-Sense Multiple Access with Collision Avoidance (CSMA/CA) focus principally on high throughput performance of the network, however, these lack low latency capability. However, an increasing number of applications, such as Real Time Applications (RTA), require low latency; and thus, there is a technology gap.

The RTA requires low latency communication and uses best effort communications. The data generated from the RTA is called RTA traffic and will be packetized as RTA frame(s) at the transmitter STA. Also, the data generated from the non-time sensitive application is called non-RTA traffic and will be packetized as non-RTA frame(s) at the transmitter STA. Then, the transmitter STA transmits packets carrying frames to the receiver STA over the channel.

The RTA frame requires low latency due to its high timeliness requirements on delivery. The RTA frame is valid when it is delivered within a certain period of time. One solution in the CSMA/CA wireless technology is to schedule a Service Period (SP) of Restricted Target Wake Time (R-TWT) for the RTA frame exchange. During the R-TWT SPs, the RTA frames have higher priority to transmit than other frames.

However, current implementations of the R-TWT mechanism suffer from scheduling and overhead issues. The present disclosure overcomes these issues and provide additional benefits.

BRIEF SUMMARY

A wireless local area network (WLAN) using Carrier Sense Multiple Access/Collision Avoidance (CSMA/CA) and scheduling a Service Period (SP) of Restricted Target Wake Time (R-TWT) for the RTA frame exchange. During the R-TWT SPs, the RTA frames have higher priority to transmit than other frames. In the present disclosure, a protocol is described in which an R-TWT scheduling MLD can schedule a Multi-Link (ML) R-TWT with Service Periods (SPs) scheduled on multiple links. These ML R-TWTs can be one or more Single-Link (SL) R-TWTs, and a ML R-TWT can be an independent R-TWT from the SL R-TWT. The R-TWT scheduling MLD can assign a unique ML level R-TWT ID to identify a ML R-TWT. If a ML R-TWT consists of SL R-TWTs, each SL R-TWT is assigned to a unique link level R-TWT ID to identify it on its link. The R-TWT scheduling AP MLD can complete ML R-TWT signaling on one link for the ML R-TWT management on multiple links.

A non-AP MLD sends a ML R-TWT request frame to negotiate its membership of the ML R-TWT. The AP MLD responds with a ML R-TWT response frame to accept or reject the request from the non-AP MLD. The non-AP MLD becomes a member of the ML R-TWT if the AP MLD accepts its request.

A non-AP STA sends a frame containing a ML TWT element for ML R-TWT signaling. The ML TWT element carries one or more Broadcast ML TWT Parameter Set Fields. The ML TWT element contains link information to indicate which links the information in the Broadcast ML TWT Parameter Set Fields is applied to.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 2 is a data field diagram of a TWT setup frame.

FIG. 3 is a data field diagram of a TWT element defined in IEEE 802.11ax.

FIG. 4 is a data field diagram of a Control field of the TWT element.

FIG. 5 is a data field diagram of a Broadcast TWT Parameter Information field (TWT parameter Information field in TWT element when Negotiation Type is 2 or 3).

FIG. 6 is a data field diagram in the Request type field of the Broadcast TWT parameter Information field of FIG. 5.

FIG. 7 is a data field diagram of a Broadcast TWT Info field of the Broadcast TWT parameter Information field of FIG. 5.

FIG. 29 is a data field diagram of a Request Type field of the Broadcast ML TWT Parameter Set Field, according to at least one embodiment of the present disclosure.

FIG. 30 is a data field diagram of a Request Type field of the Broadcast ML TWT Parameter Set Field, according to at least one embodiment of the present disclosure.

FIG. 31 through FIG. 35 is a data field diagram of the Link Info field according to at least one embodiment of the present disclosure.

DETAILED DESCRIPTION

1. Current Wireless Technologies 1.1. Restricted TWT (R-TWT)

Figure 1:
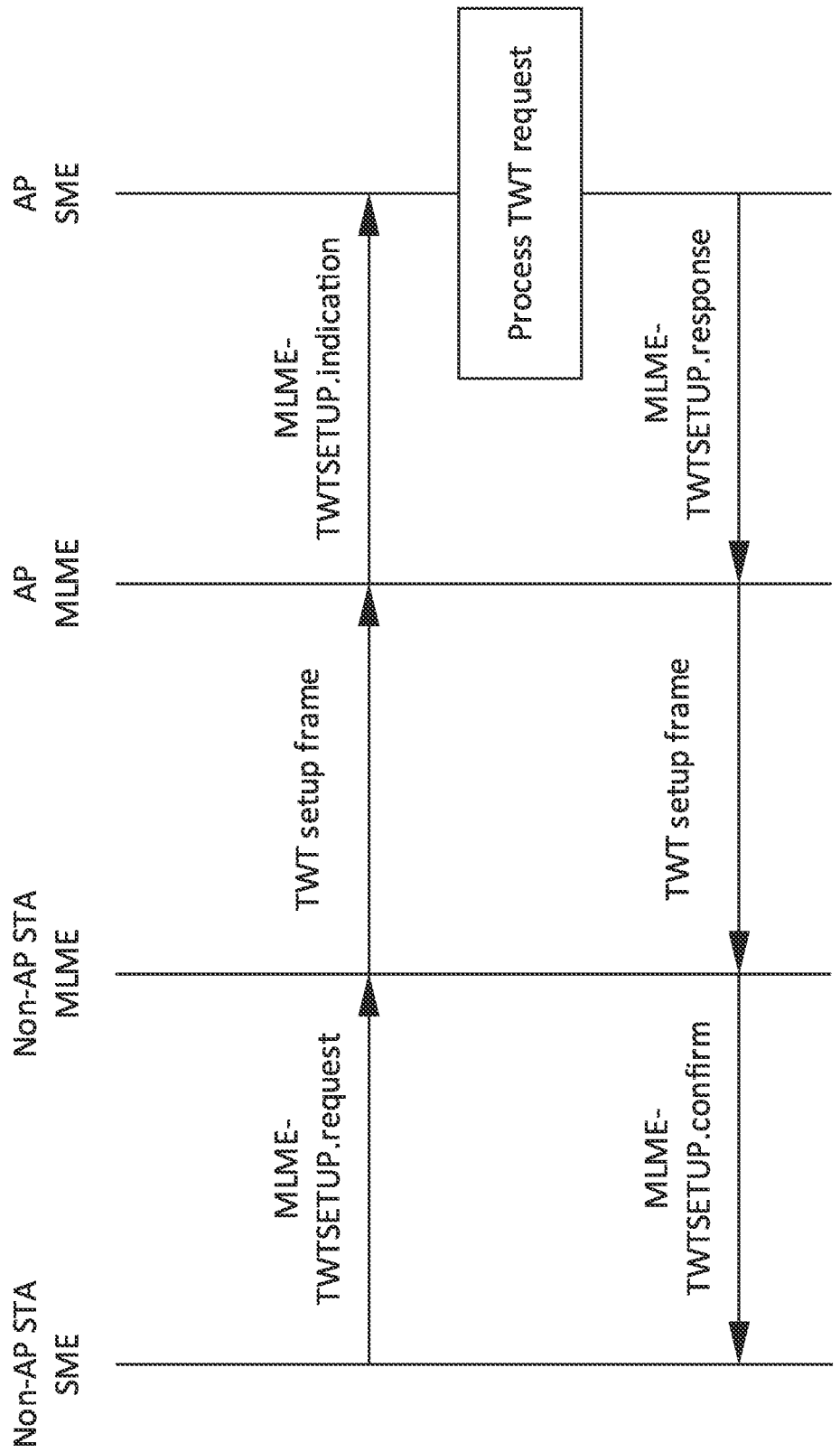
FIG. 1 is an interworking communications diagram of performing Target Wait Time (TWT) in IEEE802.11ax.

FIG. 1 shows an example of a Target Wait Time (TWT) setup defined in IEEE 802.11ax. The interworking model of the STAs can be the same as defined in the IEEE 802.11 standard.

When the non-AP STA decides to initiate a TWT setup procedure with the AP, then the Station Management Entity (SME) of the non-AP STA sends a MLME-TWTSETUP.request message to its Medium Access Control (MAC) Sublayer Management Entity (MLME). When the MLME of the non-AP STA receives the MLME-TWTSETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME.

Then, the SME of the AP sends an MLME-TWTSETUP.response message containing TWT setup result to its MLME. Then, the MLME of the AP sends a TWT setup frame (i.e., TWT response frame) to the non-AP STA. The MLME of the non-AP STA receives the frame and sends an MLME-TWTSETUP.confirm message to its SME. Then, the non-AP can recognize whether the TWT setup has been successful or not.

FIG. 2 depicts the format of a TWT setup frame, having the following fields: Frame Control, Duration, Address (1-3), Sequence Control, data, and Frame Check Sequence (FCS). The lower portion of the figure details the subfields within the data field as: Category, Action, Dialog Token and a TWT element which is detailed in FIG. 3

FIG. 3 depicts the format of TWT element defined in IEEE 802.11ax. The fields are shown as Element ID, Length, Control and TWT Parameter Information. When the negotiation type field in the control field in the TWT element is set to a value of 2 or 3, then the TWT parameter information field in the TWT element carries the broadcast TWT parameter Information field as shown in FIG. 5.

It should be noted that there is an update in IEEE 802.11be (Draft P802.11be_D1.01) at this time. When the broadcast TWT recommendation field in the Request type field in the Broadcast TWT parameter Information field is set to a value of 4, then this represents the broadcast TWT (B-TWT) indicated in the Broadcast TWT parameter Information field as a restricted TWT (R-TWT).

FIG. 4 depicts the subfields in the Control field of the TWT element seen in FIG. 3. The subfields are shown as: Neighbor Discovery Protocol (NDP) Paging Indicator, Responder Power-Management (PM) mode, Negotiation type, TWT Information Frame disabled, Wake Duration Unit, and a reserved subfield.

FIG. 5 depicts a Broadcast TWT Parameter Information field (TWT parameter Information field in TWT element when Negotiation Type is 2 or 3).

FIG. 6 depicts the subfields in the Request type field of the Broadcast TWT parameter Information field of FIG. 5. The subfields are shown as: TWT Request, TWT Setup Command, Trigger, Last Broadcast Parameter Set, Flow Type, Broadcast TWT Recommendation, TWT Wake Interval Exponent, and a Reserved subfield.

FIG. 7 depicts the subfields of the Broadcast TWT Info field of the Broadcast TWT parameter Information field of FIG. 5. The subfields are shown as: Restricted TWT Traffic Information Present, Reserved, Broadcast TWT ID, and Broadcast TWT Persistence.

According to the definition in IEEE 802.11be, R-TWT elements have the following characteristics. (a) A restricted TWT R-TWT scheduling AP, referred to as an R-TWT scheduling AP, is an Extra High Throughput (EHT) AP that supports restricted TWT operation and sets the Restricted TWT Support subfield in transmitted EHT Capabilities elements to the value of 1. (b) A restricted TWT R-TWT scheduled STA, referred to as an R-TWT scheduled STA, is a non-AP EHT STA that supports restricted TWT operation and sets the Restricted TWT Support subfield in the transmitted EHT Capabilities elements to a value of 1. (c) A R-TWT scheduled STA can establish membership of one or more R-TWTs scheduled by the R-TWT scheduling AP. The R-TWT setup signaling is the same as broadcast TWT with additional parameter settings, which is used for the membership negotiation of a R-TWT between the R-TWT scheduled STA and the R-TWT scheduling AP. After a R-TWT scheduled STA establishes the membership of the R-TWT scheduled by the R-TWT scheduling AP, the R-TWT scheduled STA has higher priority or is allowed to exchange frames with the R-TWT scheduling AP during the SPs of the R-TWT. On the other hand, the R-TWT scheduled STA that is not a member of the R-TWT is either given a lower priority or is not allowed to exchange frames with the R-TWT scheduling AP during the SPs of the R-TWT.

Figure 8:
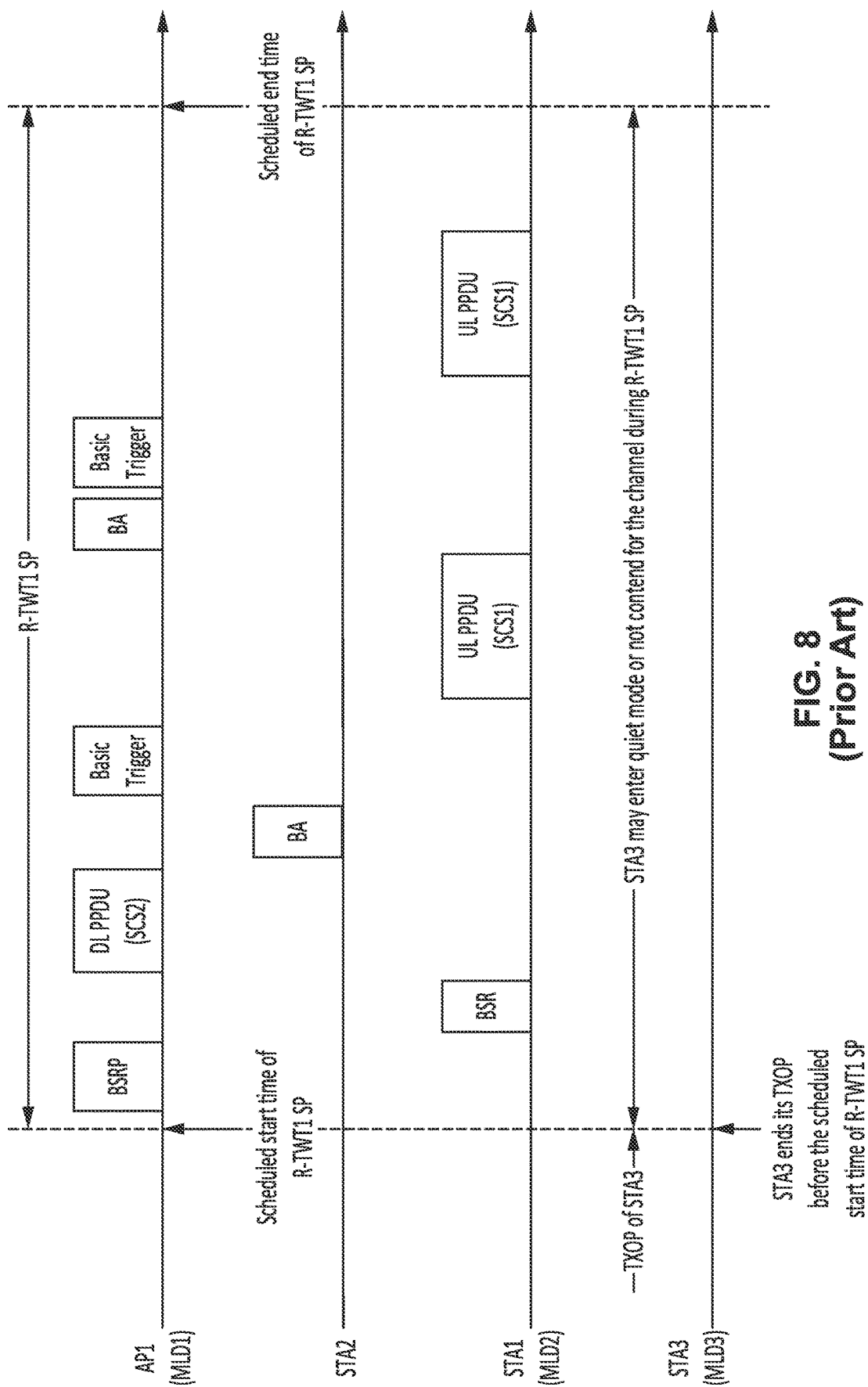
FIG. 8 is a communications diagram of a R-TWT SP communication operation in a scenario having AP1, STA1, STA2, and STA3.

FIG. 8 shows an example of a R-TWT SP communication operation in a scenario having AP1, STA1, STA2, and STA3.

AP1 is the R-TWT scheduling AP which announces R-TWT1 scheduling and manages the members of R-TWT1. STA1 and STA2 are the member STAs of R-TWT1. During the R-TWT1 SP, AP1 schedules and prioritizes the frame exchange with the member STAs (e.g., UL PPDU of SCS1 with STA1 and DL PPDU of SCS2 with STA2). STAs which can receive (hear) and recognize (understand) the R-TWT scheduling are called R-TWT scheduled STAs. STA3 is a R-TWT scheduled STA but not a member STA of R-TWT1. STA3 has to end its TXOP before the start time of R-TWT1 SP. STA3 can also enter quiet mode or not contend for the channel during R-TWT1 SP. The scheduling AP can broadcast a quiet element to announce a quiet interval during a R-TWT SP, and the STA hears this element may enter quiet mode.

Figure 9:
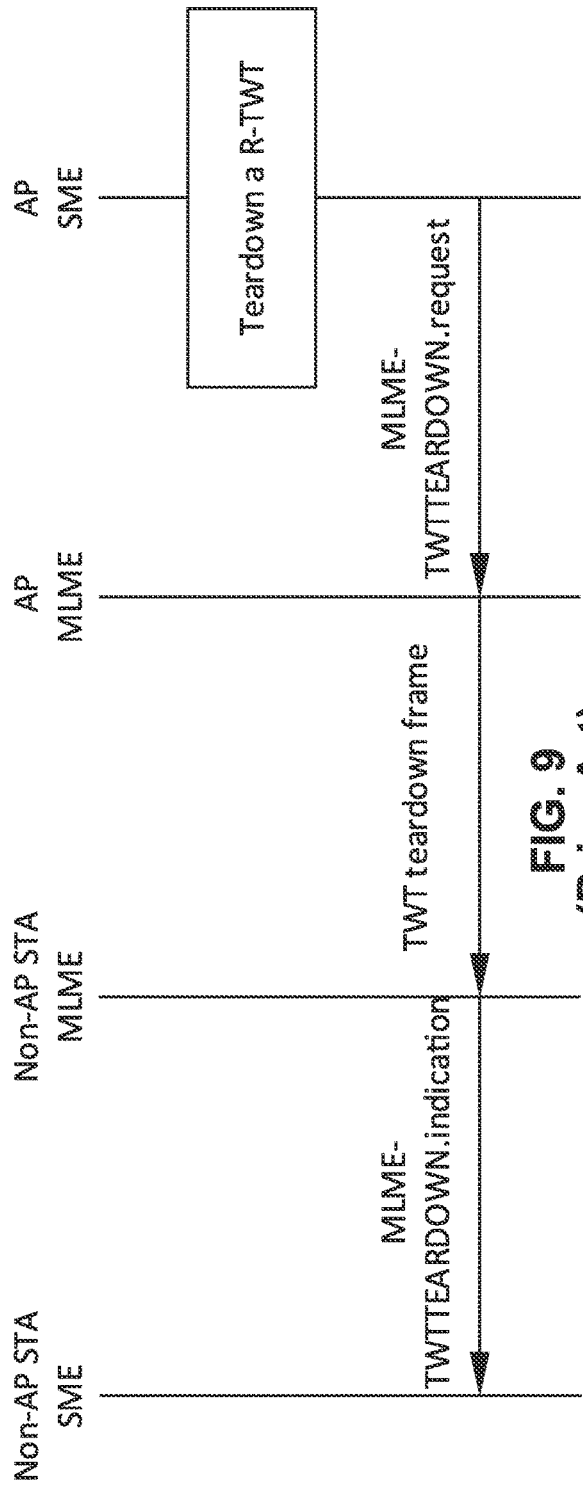
FIG. 9 is an interworking communications diagram of TWT teardown signaling defined in IEEE 802.11ax.

FIG. 9 shows the TWT teardown signaling defined in IEEE 802.11ax. The interworking model of the STAs can be the same as defined in IEEE 802.11ax standard.

The AP decides to teardown a TWT and performs the following. The Station Management Entity (SME) of the AP sends a MLME-TWTTEARDOWN.request message to its MAC Sublayer Management Entity (MLME). When the MLME of the AP receives the MLME-TWTTEARDOWN.request message, it collects the information in the MLME-TWTTEARDOWN.request message and sends (e.g., unicast, groupcast, or broadcast) a TWT teardown frame to the non-AP STAs. The MLME of the non-AP STA receives the frame and generates a MLME-TWTTEARDOWN.indication message carrying the information in the frame to its SME. Then, the SME of the non-AP STA sends an MLME-TWTTEARDOWN.indication message to its MLME. Then, the MLME of the non-AP STA knows which TWT(s) is teared down by the AP.

Figure 10:
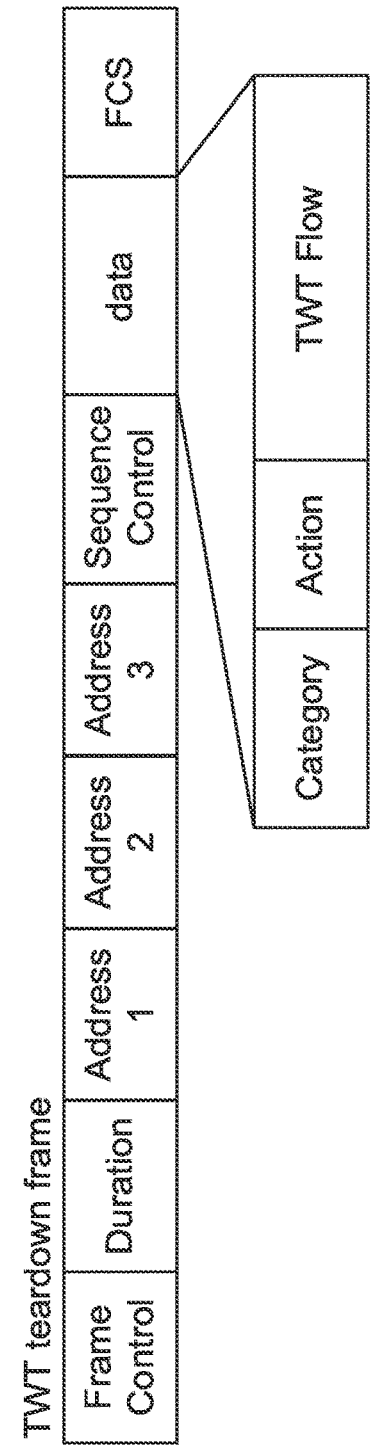
FIG. 10 is a data field diagram of a TWT Teardown frame.

FIG. 10 depicts the format of TWT Teardown frame, having fields: Frame Control, Duration, Address (1-3), Sequence Control, data and FCS. The data field is shown here having subfields of Category, Action and TWT Flow.

Figures 11, 12, 13, 14:
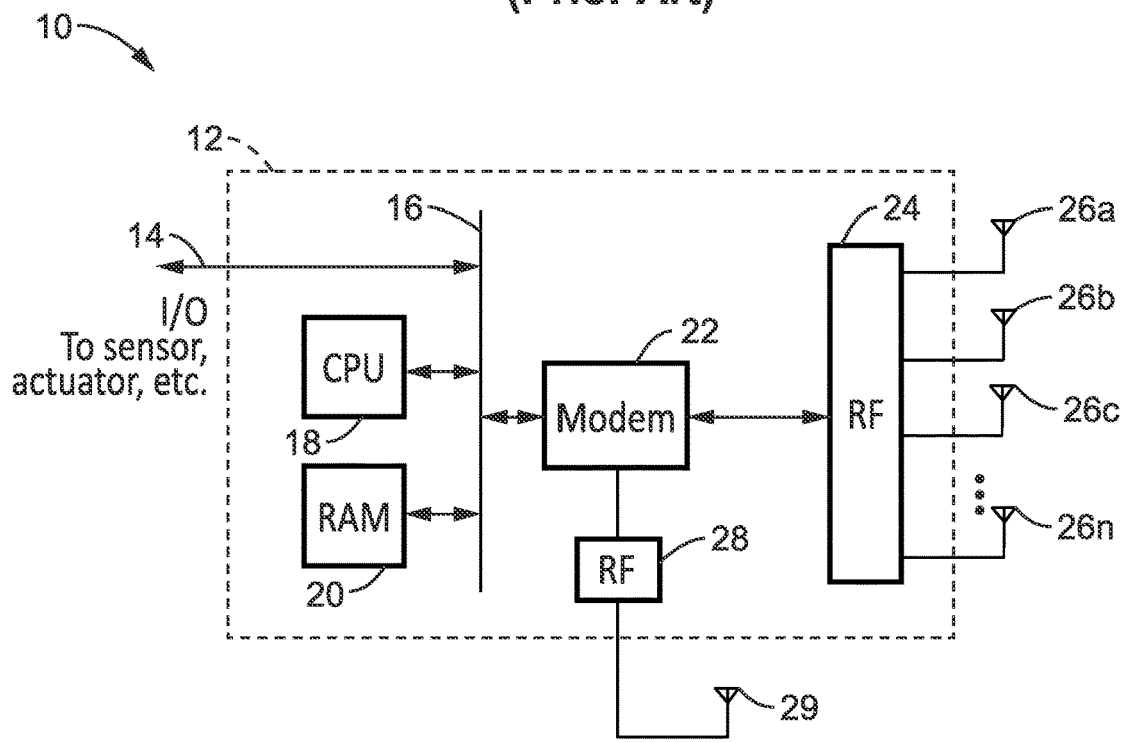
FIG. 11 through FIG. 13 are data field diagrams of fields of the TWT Flow field.
FIG. 14 is a hardware block diagram of wireless station (STA) hardware according to at least one embodiment of the present disclosure.

FIG. 11 through FIG. 13 depict fields of the TWT Flow field as was seen in FIG. 10. A type 0 or 1 TWT Flow field format is seen in FIG. 11 having the subfields of: TWT Flow Identifier, Reserved, Negotiation Type, and Teardown All TWT. A type 2 TWT Flow field format is seen in FIG. 12 having the subfields of: Reserved, Negotiation Type, and Reserved. A type 3 TWT Flow field is seen in FIG. 13 indicating the teardown of a broadcast TWT whose ID is indicated in the Broadcast TWT ID field. If the Broadcast TWT ID field is referred to a R-TWT, then this field indicates the teardown of a R-TWT. This field also contains a Negotiation Type, and Teardown All TWT subfields.

2. Problem Statement

The current wireless communication systems use EDCA and R-TWT to prioritize the RTA traffic transmission. During the R-TWT SP, the RTA traffic is prioritized to transmit. Meanwhile, the current wireless communication systems define a multiple-link device (MLD) which affiliates with one or more STAs whereby each STA operates on a different link. R-TWT SPs can be scheduled on multiple links to provides improved quality of service, such as throughput, latency, reliability, and jitter, for the RTA traffic transmission. However, the current R-TWT is managed and operated at the link level only. There is no mechanism to manage and schedule R-TWTs from the view of MLD. The R-TWT is scheduled on each link separately which can result in significantly large overhead due to the signaling for R-TWT management. Also, the coordination of the R-TWTs on different links is not feasible in view of link level management considerations.

3. Contribution of the Present Disclosure

By utilizing the proposed technologies, the R-TWT scheduling MLD can schedule a Multi-Link (ML) R-TWT whose SPs are scheduled on multiple links. A ML R-TWT can consist of one or more Single-Link (SL) R-TWTs as described in Section 1.1, whose SPs are scheduled on the same link. Alternatively, a ML R-TWT can be an independent R-TWT from the SL R-TWT.

By utilizing the protocol of the present disclosure, the R-TWT scheduling MLD can assign a unique ML level R-TWT ID to identify a ML R-TWT. If a ML R-TWT consists of SL R-TWTs, each SL R-TWT is assigned to a unique link level R-TWT ID to identify it on its link.

By utilizing the protocol of the present disclosure, the R-TWT scheduling AP MLD can complete (finish) the ML R-TWT signaling on one link for the ML R-TWT management on multiple links.

4. Embodiment 4.1. Communication Station (STA and MLD) Hardware

FIG. 14 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implement the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. The present disclosure is primarily directed at the sub 6 GHz band.

It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware as shown in the figure, can be combined into a multi-link device (MLD), which typically will have a processor and memory for coordinating the activity, while there is not always a need for a separate CPU and memory for each STA within the MLD.

Figure 15:
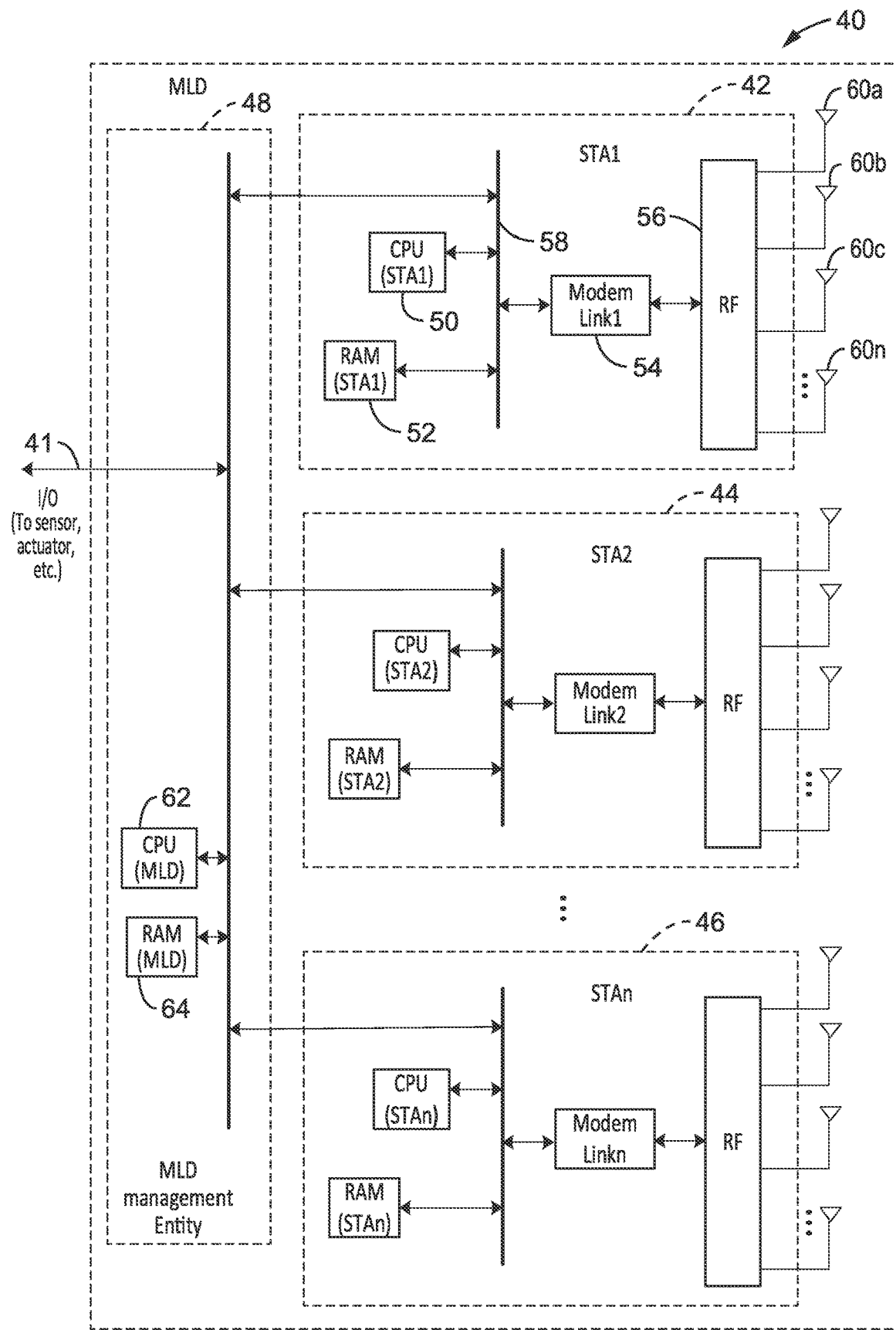
FIG. 15 is a hardware block diagram of a station configuration, such as contained in Multi-Link Device (MLD) hardware, according to at least one embodiment of the present disclosure.

FIG. 15 illustrates an example embodiment 40 of a Multi-Link Device (MLD) hardware configuration. Soft AP MLD is a MLD that consists of one or more affiliated STAs, which are operated as APs. Soft AP MLD should support multiple radio operation on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHz).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implement communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. Network Topology for Consideration

Figure 16:
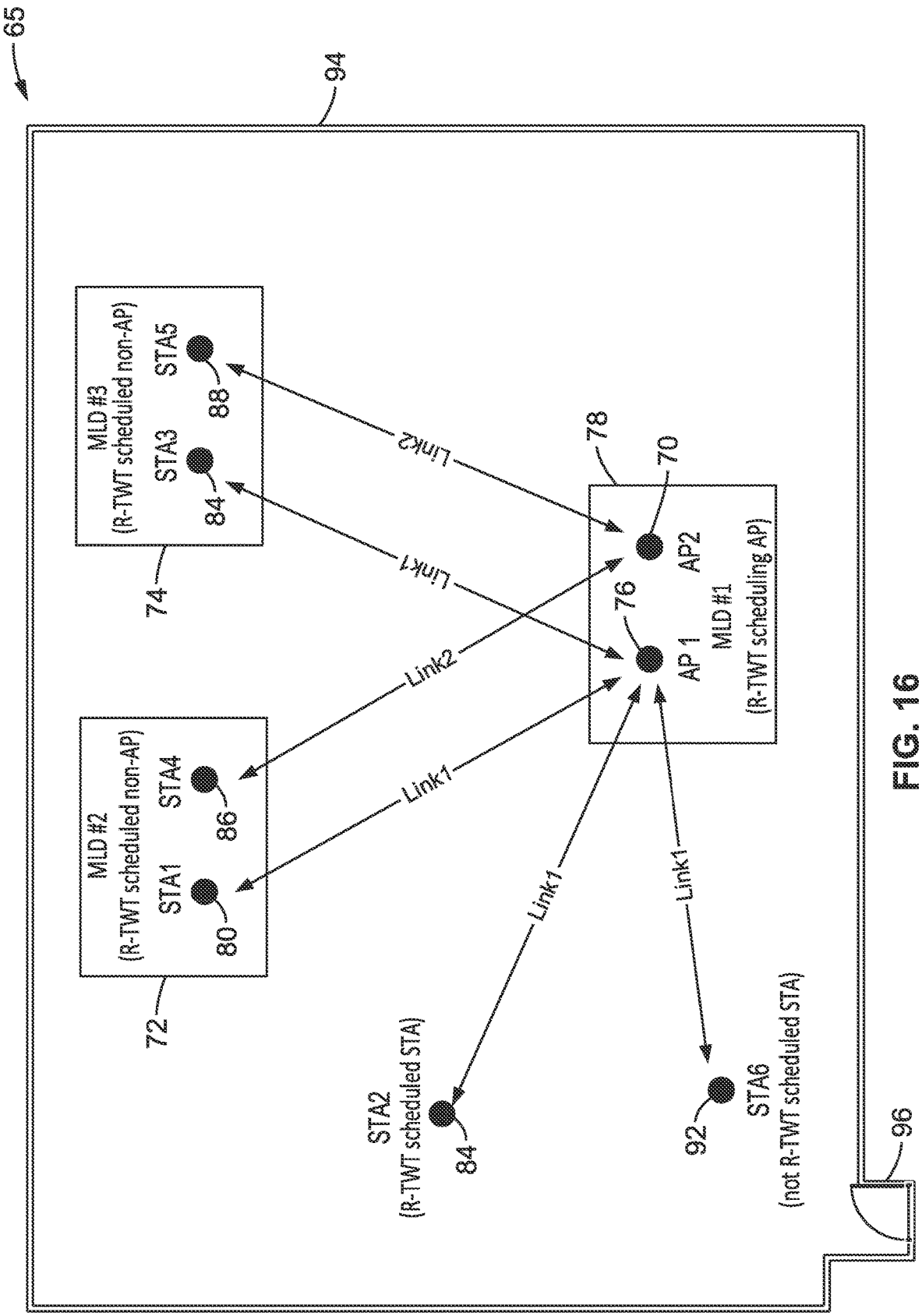
FIG. 16 is a station topology diagram for consideration according to at least one embodiment of the present disclosure.

FIG. 16 illustrates an example STA topology 65 for consideration in the examples of the present disclosure. The figure is provided to aid in the discussions of the techniques involved and toward engendering an improved understanding of the proposed technology. It should be appreciated that the present disclosure is in no way limited to the topology of this example, as the protocol may be utilized on communications between WLAN STAs and MLDs of any desired topology.

A MLD is a device that has more than one affiliated STA and has one MAC service access point (SAP) to logical link control (LLC), which includes one MAC data service.

An MLD is an AP MLD, if APs are affiliated with that MLD. An MLD is a non-AP MLD, if non-AP STAs are affiliated with that MLD.

As shown in FIG. 16 the scenario is exemplified as having three MLDs 70, 72 and 74. AP1 76 and AP2 78 are affiliated with multi-link device 70 (MLD) #1, STA1 80 and STA4 86 are affiliated with MLD #2 72, and STA3 84 and STA5 88 are affiliated with MLD#3 74. STA2 84 is a R-TWT scheduled station which may comprise a non-AP STA operating on Link1, or a single link MLD (i.e., a special MLD which only has one STA and operates on one link). STA6 92 is not a R-TWT scheduled station, and this station may also comprise a non-AP STA operating on Link1, or a single link MLD (i.e., a special MLD which only has one STA and operates on one link).

As shown in the figure this scenario assumes there are three MLDs, two APs, and six STAs in a given area, depicted here as meeting room 94, shown with aperture(s) (e.g., doors, windows and so forth) 96. STA1, STA2, STA3, and STA6 are associated with AP1 over Link1 and STA4 and STA5 are associated with AP2 over Link2.

All STAs use EDCA for random channel access on all the links. A R-TWT scheduling AP is able to schedule and announce R-TWTs. A R-TWT scheduled STA is the non-AP STA that is able to receive and recognize the R-TWT announcement from the R-TWT scheduling AP and support the R-TWT operations. A R-TWT scheduled STA is able to negotiate membership of a R-TWT with the R-TWT scheduling AP. When a R-TWT scheduled STA becomes a member STA of a R-TWT, the traffic (e.g., UL, DL, P2P) of the R-TWT scheduled STA (i.e., the R-TWT member STA) is scheduled and prioritized to transmit during the SPs of that R-TWT.

AP1 and AP2 are the R-TWT scheduling APs. STA1 through STA5 are R-TWT scheduled STAs; while STA6 is not a R-TWT scheduled STA.

4.3. Definitions of ML R-TWT

This introduces the definitions used in this disclosure. An AP MLD which supports ML R-TWT operation is denoted as a R-TWT scheduling AP MLD. A non-AP MLD which supports ML R-TWT operation is denoted as a R-TWT scheduled MLD. After a R-TWT scheduled MLD negotiates ML R-TWT setup with the R-TWT scheduling AP MLD successfully, the R-TWT scheduled MLD becomes a member MLD of that R-TWT. Then, the traffic of the member MLD will be prioritized to transmit during the SPs of that R-TWT. For example, as shown in FIG. 16, MLD1 is the R-TWT scheduling AP MLD. MLD2 and MLD3 are the R-TWT scheduled MLDs.

A SL R-TWT is scheduled by a R-TWT scheduling AP and its SPs are scheduled on the same link of the R-TWT scheduling AP, which is the same as defined in Section 1.1. The R-TWT scheduling AP assigns a unique ID, denoted as link level R-TWT ID, to the SL R-TWT. A link level R-TWT ID can be used to identify a SL R-TWT by the R-TWT scheduling AP and its affiliated STA on their own link.

A ML R-TWT is scheduled by the R-TWT scheduling MLD and its SPs are scheduled on one or more links. An ML R-TWT consists of one or more SL R-TWTs scheduled by the different APs affiliated with a same R-TWT scheduling AP MLD. The SPs of the ML R-TWT are the SPs of those SL R-TWTs. A ML R-TWT can be either an implicit ML R-TWT or an explicit ML R-TWT.

An explicit ML R-TWT is an ML R-TWT which is assigned to a unique ID, denoted as MLD level R-TWT ID, by the R-TWT scheduling AP MLD over all its links (or more than one link). A MLD level R-TWT ID can be used to identify a ML R-TWT by the R-TWT scheduling AP MLD and its affiliated MLDs on all their links.

An implicit ML R-TWT is not assigned to a unique MLD level R-TWT ID by the R-TWT scheduling AP MLD. An implicit ML R-TWT can be a group of SL R-TWTs which share at least one of the following in common. (a) The SL R-TWTs have the same link level R-TWT ID but are scheduled on different links. (b) The SL R-TWTs have the same SP scheduling on different links. (c) The SL R-TWTs whose scheduling is announced in the same ML TWT element.

It should be noted that the implicit ML R-TWT is not the implicit TWT (individual TWT) as defined in IEEE 802.11.

When a ML R-TWT consists of one SL R-TWT only, it is the same as a SL R-TWT.

In some instances, a R-TWT scheduled MLD can become a member MLD of an ML R-TWT on some of the links where the ML R-TWT SPs are scheduled. Then, the traffic of the member MLD is prioritized to transmit only on those links, but not all the links of ML R-TWT SPs, during ML R-TWT SPs. For example, a ML R-TWT schedules its SPs on link1, link2, and link3. A R-TWT scheduled MLD becomes a member MLD of that ML R-TWT only on link1 and link2. Then, the traffic of the R-TWT scheduled MLD is prioritized to transmit on link1 and link2 during ML R-TWT SPs.

The operation of the R-TWT scheduling AP and R-TWT scheduled STA for the ML R-TWT SPs on each link can be the same as R-TWT operation defined in IEEE 802.11be. For example, a R-TWT scheduled STA shall end its TXOP before the start of a ML R-TWT SP scheduled on its link.

In at least one embodiment/mode/option the SP scheduling (such as SP start time, SP duration, interval between SPs and so on) of a ML R-TWT on different links has to be the same.

4.4. ML R-TWT Signaling

This section explains the ML R-TWT signaling for ML R-TWT scheduling announcement, ML R-TWT membership negotiation, and ML R-TWT teardown. The purpose of ML R-TWT signaling is to let the signaling transmitted over one link manage the ML R-TWTs.

If all the R-TWT scheduled MLDs are operating (or enabled) on the same link, then the R-TWT scheduling AP may only launch a signal sequence (such as trigger frame+ PS-Poll in B-TWT SP) on that link to indicate the start of the ML R-TWT SPs on multiple links.

The R-TWT scheduling AP may only send a signal (such as a broadcast EOSP signal) on that link to indicate the end of the ML R-TWT SPs on multiple links. The R-TWT scheduling AP may announce ML R-TWT scheduling through sending a beacon on that link only.

If a R-TWT scheduled MLD requests the membership of a ML R-TWT for the transmission of a traffic stream under a Traffic Specification (TSPEC) or a QoS Characteristics element during the ML R-TWT SPs, then the AP considers whether it can satisfy the QoS requirements of the traffic stream based on the capacity of all the links where the ML R-TWT SPs are scheduled. It should be noted that for a SL R-TWT membership negotiation, the AP may only consider whether it can satisfy QoS requirements of the traffic stream based on the capacity of the link where the SL R-TWT SPs are scheduled.

The traffic transmitted during ML R-TWT SPs may be subject to the TID-to-Link mapping between the non-AP MLD and AP MLD. For SPs of a ML R-TWT on multiple links, it is possible that all those links shall have the same TID to link mapping during ML R-TWT SP, or each link shall have at least one TID of latency sensitive traffic that can be mapped to the link during ML R-TWT SP.

It should be noted that the ML R-TWT signaling as described in this disclosure can also be used for the broadcast TWT signaling when the broadcast TWT recommendation field in the Request type field in Broadcast ML TWT parameter Information field is set to a value of "2" or "3".

4.4.1. Announcement of ML R-TWT Scheduling

Figure 17:
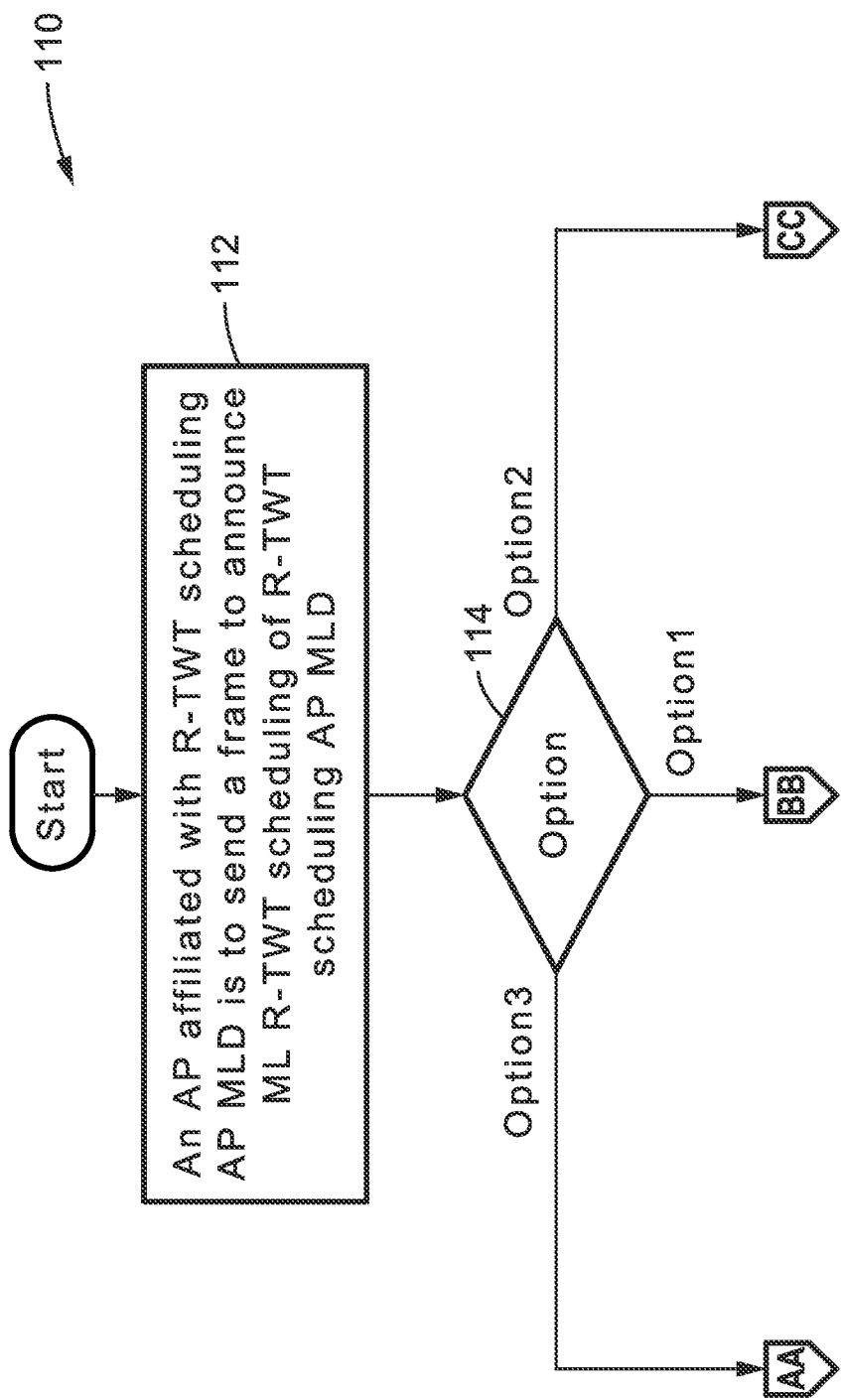
FIG. 17 and FIG. 18 is a flow diagram of an AP affiliated with the R-TWT scheduling AP MLD announcing ML R-TWT scheduling according to at least one embodiment of the present disclosure.
Figure 18:
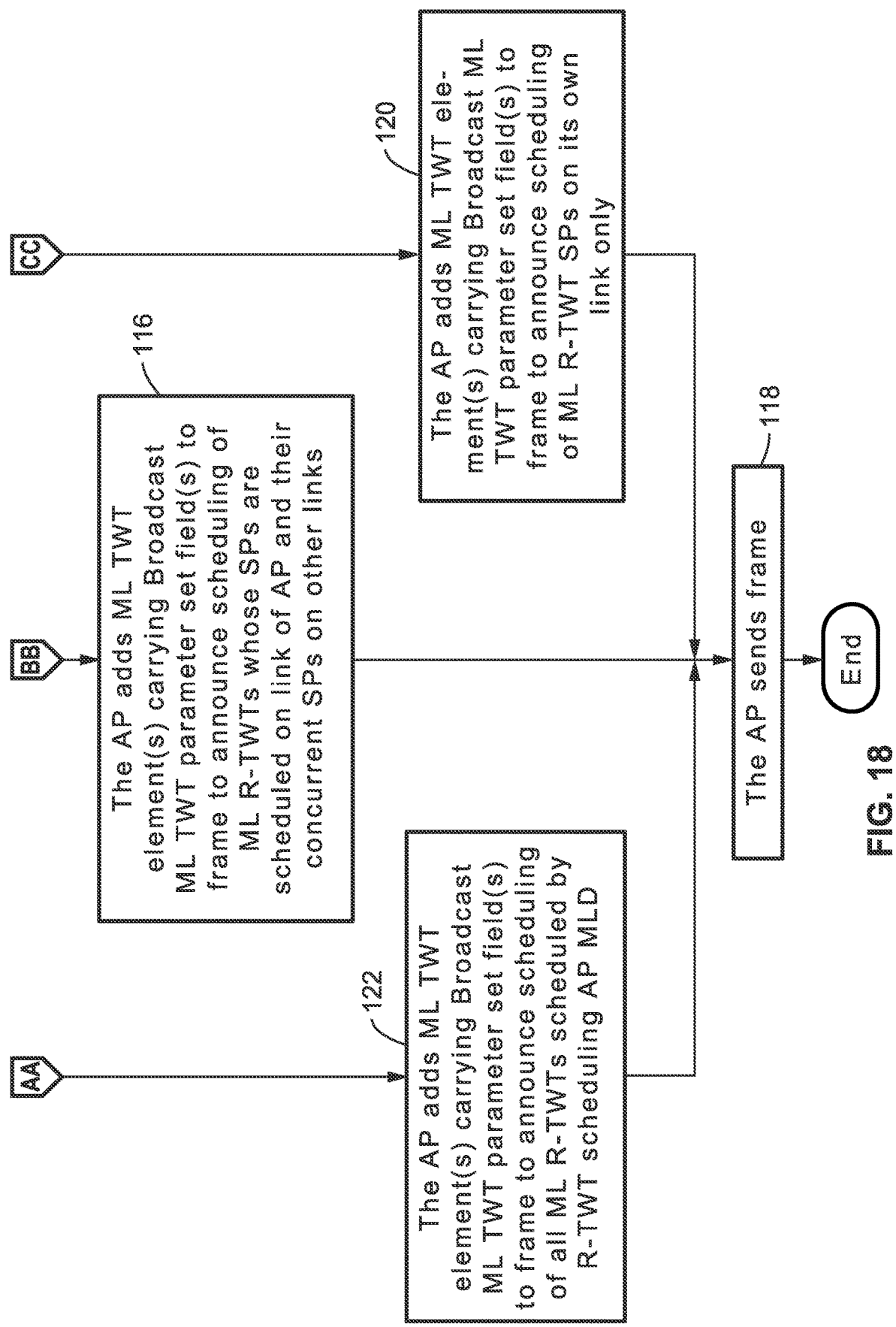

FIG. 17 and FIG. 18 illustrate an example embodiment 110 of an AP affiliated with R-TWT scheduling AP MLD announcing the ML R-TWT scheduling. When the AP is to send 112 a frame to announce the ML R-TWT scheduling, it can have multiple options as determined at block 114.

Figure 39:
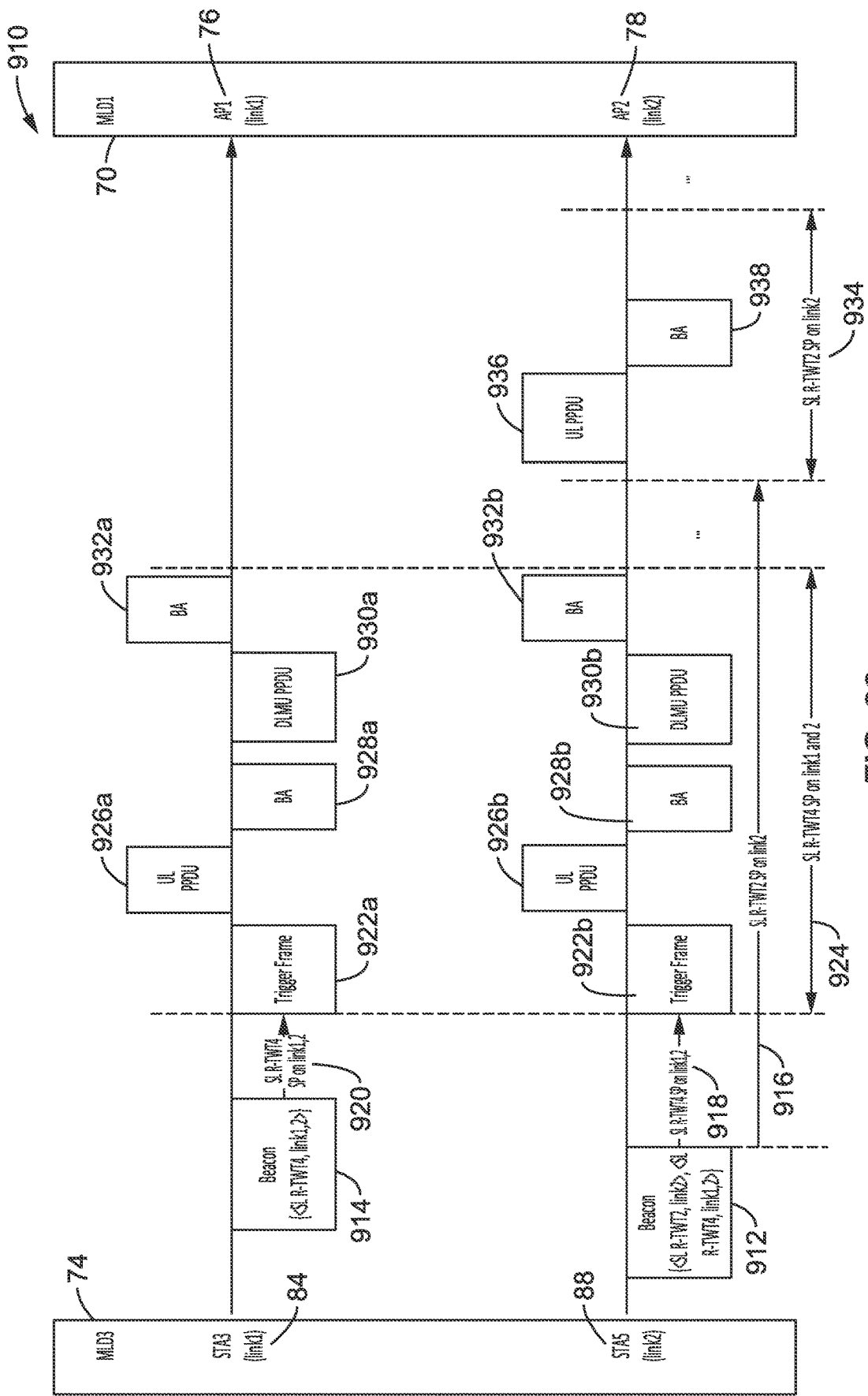
FIG. 39 is a communications diagram of R-TWT scheduling with AP announcements of ML R-TWT scheduling of SPs on its link, according to at least one embodiment of the present disclosure.
Figure 40:
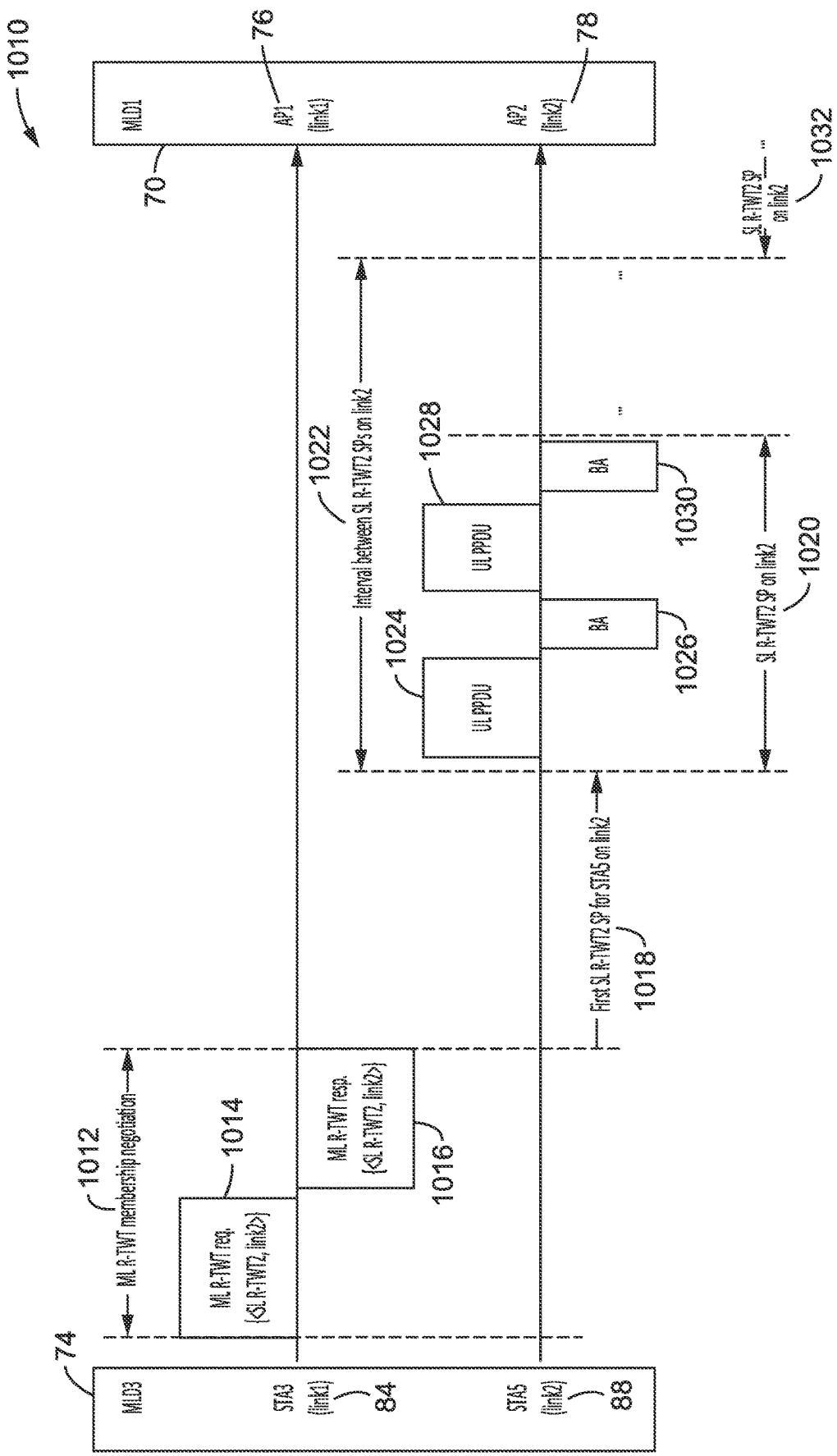
FIG. 40 is a communications diagram of a ML R-TWT setup procedure, according to at least one embodiment of the present disclosure.

If the AP selects Option1, then at block 116 of FIG. 18 the AP adds ML TWT element(s) carrying the Broadcast ML TWT parameter set field(s) to the frame to announce the scheduling of the ML R-TWTs that has SPs scheduled on the link of the AP and their concurrent SPs on other links. Examples of Option 1 are shown in FIG. 39 and FIG. 40.

Figure 36:
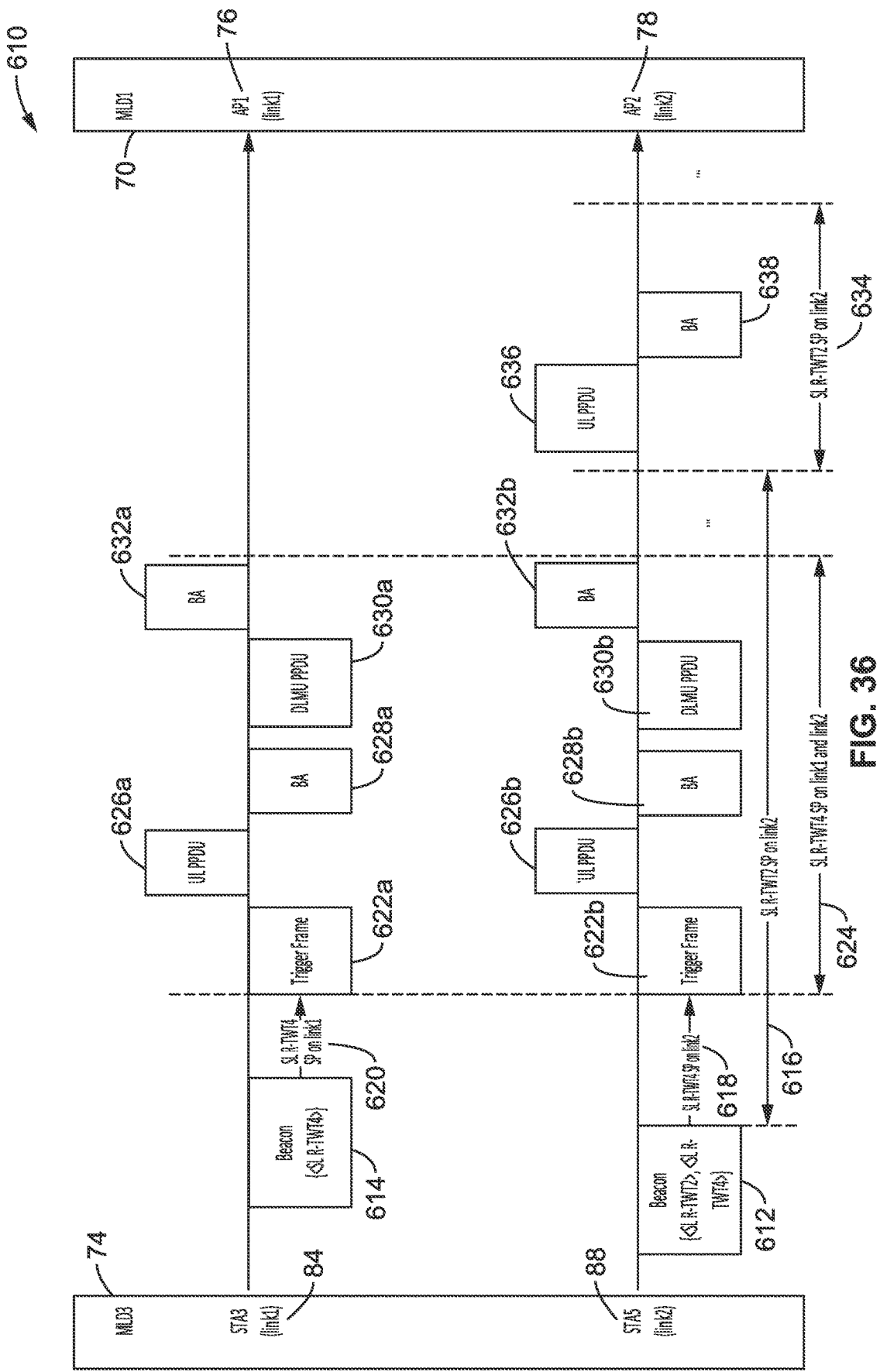
FIG. 36 is a communications diagram of R-TWT scheduling with the AP announcing the ML R-TWT SP scheduling on its own link only, according to at least one embodiment of the present disclosure.

If at block 114 in FIG. 17, the AP chooses Option 2, then at block 120 in FIG. 18 the AP adds ML TWT element(s) carrying the Broadcast ML TWT parameter set field(s) to the frame to announce the scheduling of the ML R-TWT SPs on its own link only. For example, for a ML R-TWT whose SPs are scheduled on link1 and link2, the AP on link1 only announces the SP scheduling of the ML R-TWT on link1 in its frame, and the AP on link2 only announces the SP scheduling of the ML R-TWT on link2 in its frame. An example is shown in FIG. 36.

If at block 114 in FIG. 17, the AP chooses Option 3, then at block 122 in FIG. 18 the AP adds ML TWT element(s) carrying the Broadcast ML TWT parameter set field(s) to the frame to announce the scheduling of all the ML R-TWTs scheduled by the R-TWT scheduling AP MLD. Examples of this case are depicted in FIG. 37, FIG. 38, FIG. 46, and FIG. 48.

Then, in each of these cases the AP sends 118 of FIG. 18 (e.g., unicasts, multicasts, groupcasts, or broadcasts) the frame to its associated non-AP STAs.

The frame which carries the information of ML R-TWT scheduling can be a beacon frame, (ML) probe response frame, (re)association response frame or other management frames.

It is possible that the ML TWT element is contained in Multiple BSSID elements as defined in IEEE 802.11 to announce the ML R-TWT scheduling of the R-TWT MLD of the corresponding non-transmitted BSS.

The format of ML TWT element and Broadcast ML TWT parameter set field are shown in Section 4.5.

4.4.2. Negotiation of ML R-TWT Membership

This section shows the flowcharts of ML R-TWT membership negotiation from the R-TWT scheduled MLD side and the R-TWT scheduling AP MLD side.

Figure 19:
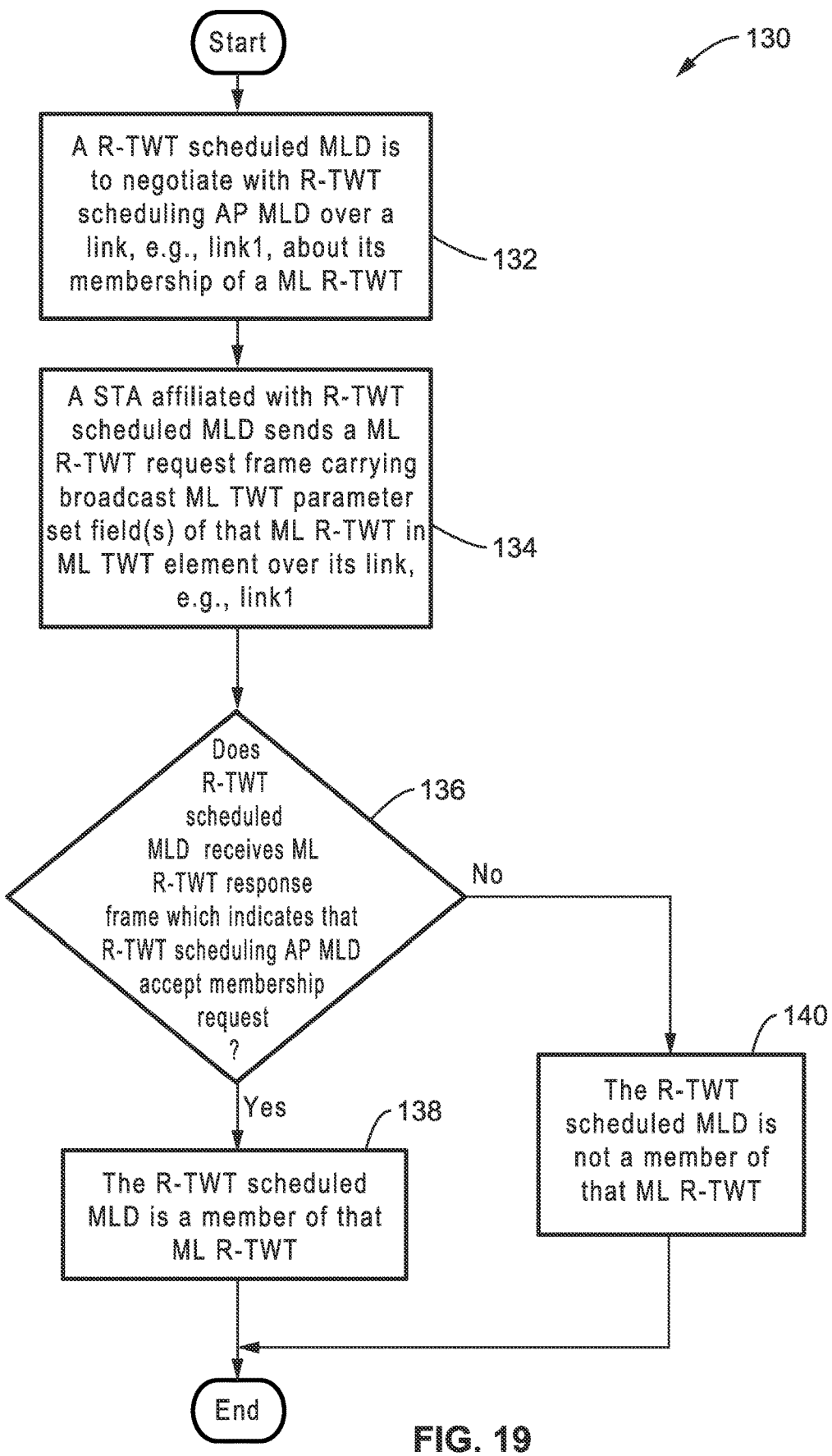
FIG. 19 is a flow diagram of a R-TWT scheduled MLD requesting ML R-TWT membership according to at least one embodiment of the present disclosure.

FIG. 19 illustrates an example embodiment 130 of a R-TWT scheduled MLD requesting ML R-TWT membership. A R-TWT scheduled MLD is to negotiate 132 with the R-TWT scheduling AP MLD over a link, for example link1, about its membership of a ML R-TWT scheduled by the R-TWT scheduling AP MLD.

Then, the STA affiliated with the R-TWT scheduled MLD on link1 sends 134 a ML R-TWT request frame carrying the broadcast ML TWT parameter set fields of that ML R-TWT in ML TWT element over link1.

A check 136 determines if the R-TWT scheduled MLD receives the ML TWT response frame which indicates that the R-TWT scheduling AP accepts the membership request of the ML R-TWT. If this condition is met, then the R-TWT scheduled MLD is a member 138 of the ML R-TWT.

Otherwise, if this condition is not met, then the R-TWT scheduled MLD is not a member 140 of the ML R-TWT.

Figure 24:
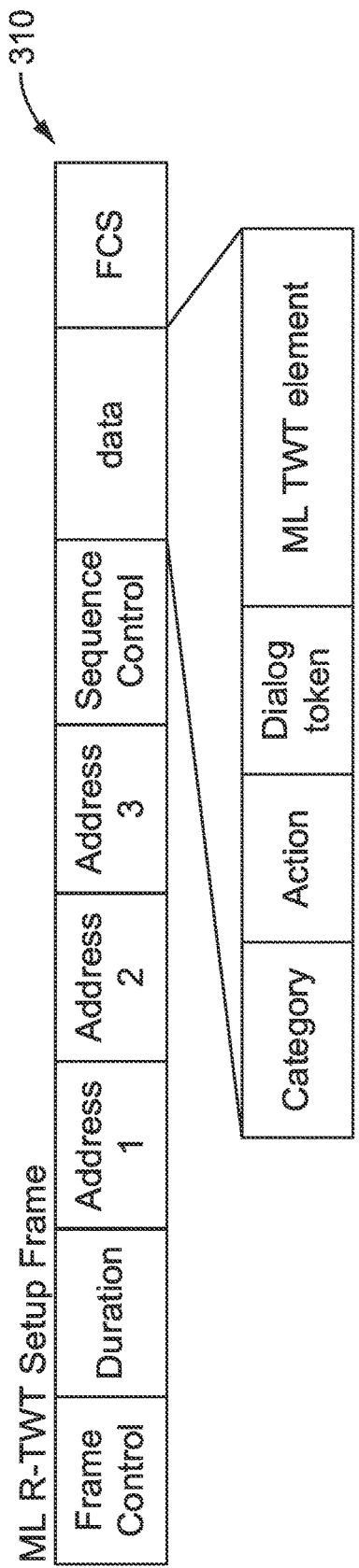
FIG. 24 is a data field diagram of a ML R-TWT setup frame used for membership management of ML R-TWT, according to at least one embodiment of the present disclosure.
Figure 42:
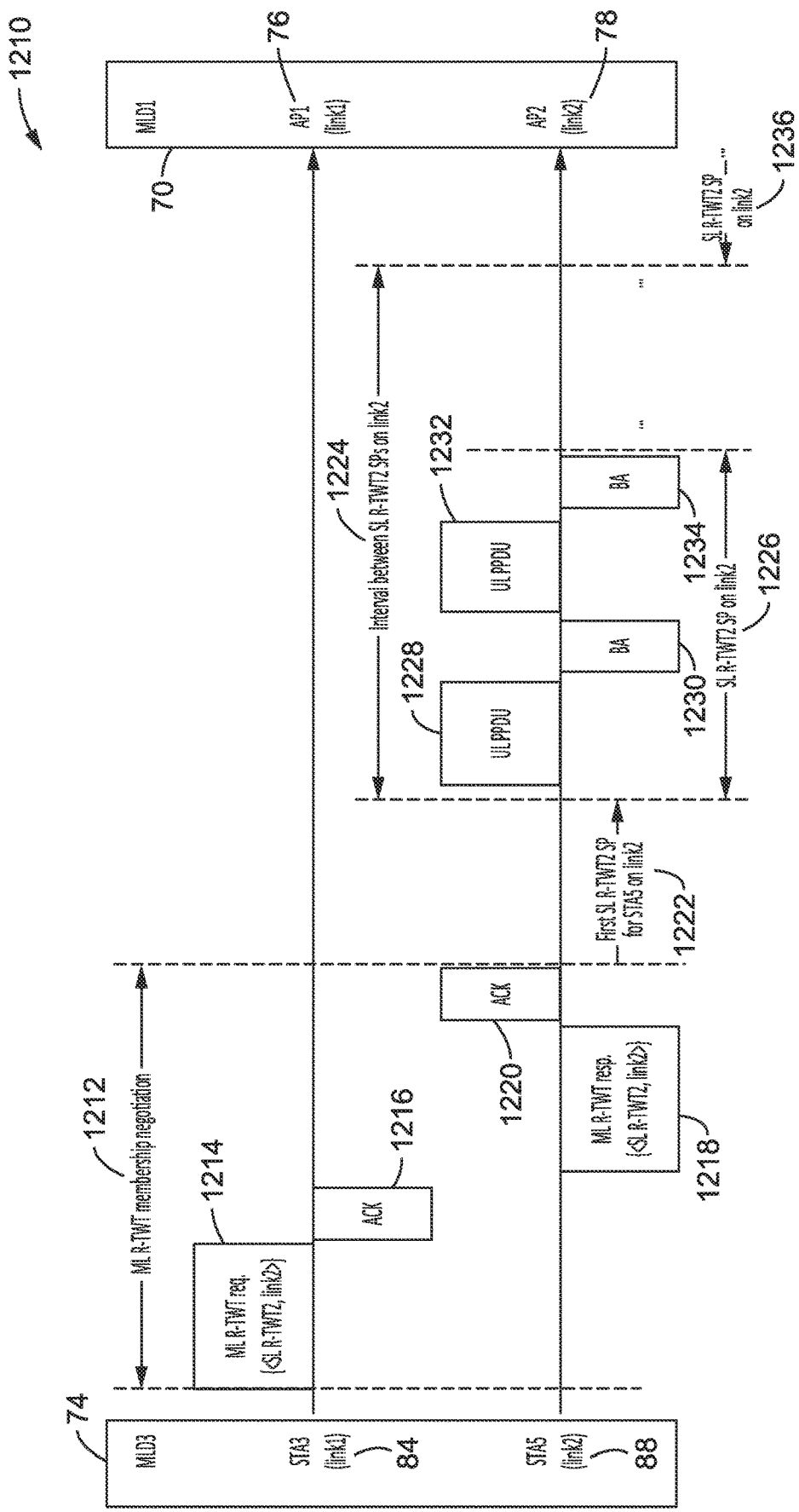
FIG. 42 is a communications diagram of a ML R-TWT setup procedure over multiple links, according to at least one embodiment of the present disclosure.

It should be noted that it is possible that the ML R-TWT request frame and the ML TWT response frame are to be transmitted over different links. An example is shown in FIG. 42. The format of the ML R-TWT request frame and the ML TWT response frame are shown in FIG. 24.

When the R-TWT scheduled MLD requests ML R-TWT whose SPs are scheduled on multiple links, in at least one embodiment/mode/option the R-TWT scheduling AP MLD can respond that the R-TWT scheduled MLD is to be member of the ML R-TWT on partial links where the ML R-TWT SPs are scheduled. For example, if the ML R-TWT consists of multiple SL R-TWTs, then the ML R-TWT scheduled MLD can become a member of some of the SL R-TWTs, while not be allowed as a member of the other SL R-TWTs. Then, the ML R-TWT scheduled MLD may request membership of the other SL R-TWTs of which it is not a member independently. In at least one other embodiment/mode/option the R-TWT scheduling AP MLD can be configured to either accept the membership of ML R-TWT SPs on all the links where the ML R-TWT SPs are scheduled, or not to allow membership on any of those links.

Figure 20:
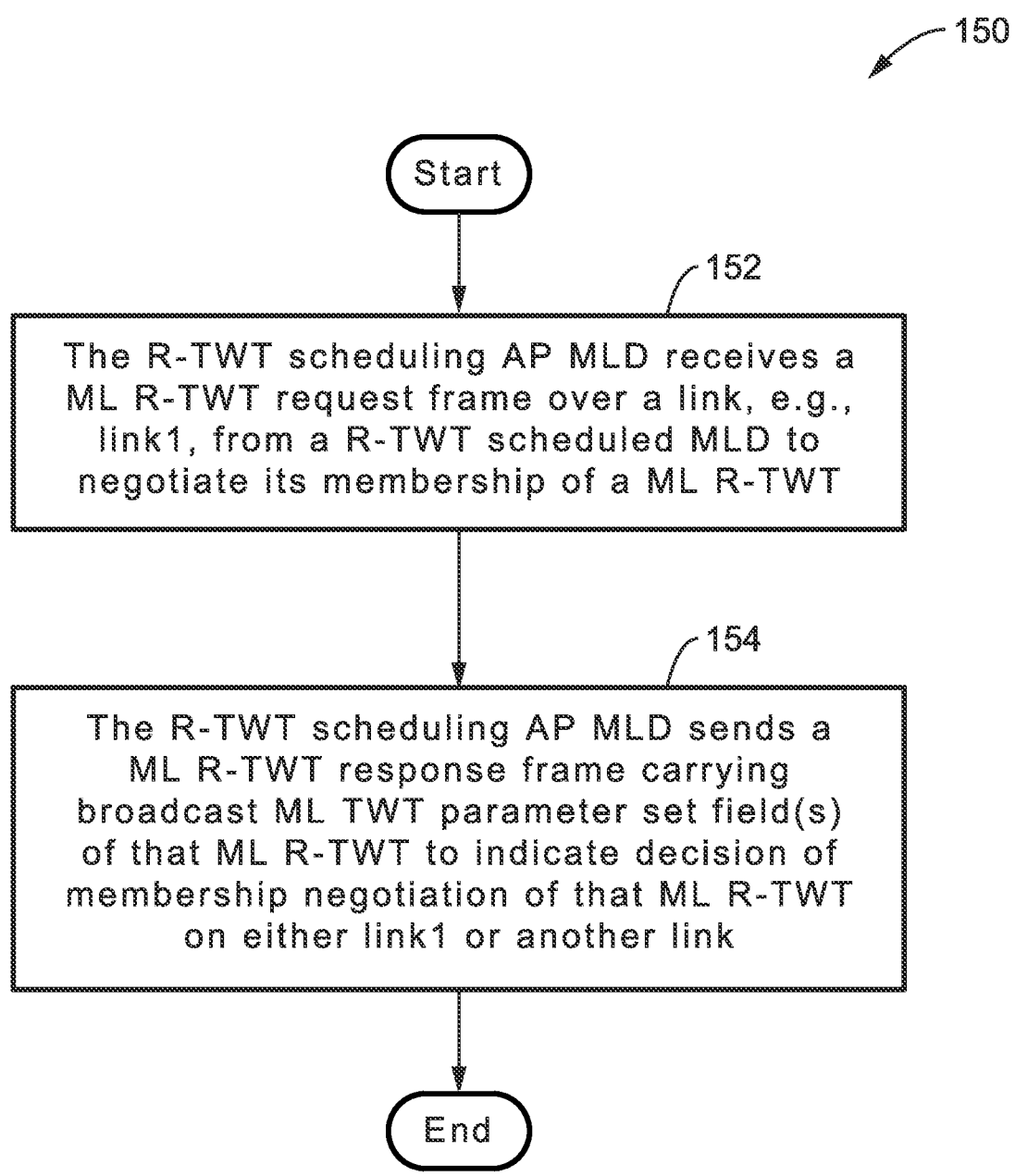
FIG. 20 is a flow diagram of a R-TWT scheduling an AP MLD responding to a ML R-TWT membership, according to at least one embodiment of the present disclosure.

FIG. 20 illustrates an example embodiment 150 of a R-TWT scheduling AP MLD responding to a ML R-TWT membership. The R-TWT scheduling AP MLD receives 152 a ML R-TWT request frame over a link, such as link1, from a R-TWT scheduled MLD to negotiate its membership of a ML R-TWT.

Then, the R-TWT scheduling AP MLD sends 154 a ML R-TWT response frame carrying the broadcast ML TWT parameter set fields of that ML R-TWT to indicate the decision of membership negotiation of that ML R-TWT on either link1 or another link.

In at least one embodiment/mode/option the R-TWT scheduling AP MLD has to send a ML R-TWT response frame on the same link as the ML R-TWT request frame was sent over (e.g., link1 in this example). The format of the ML R-TWT request frame and the ML TWT response frame are shown in FIG. 24.

Figure 21:
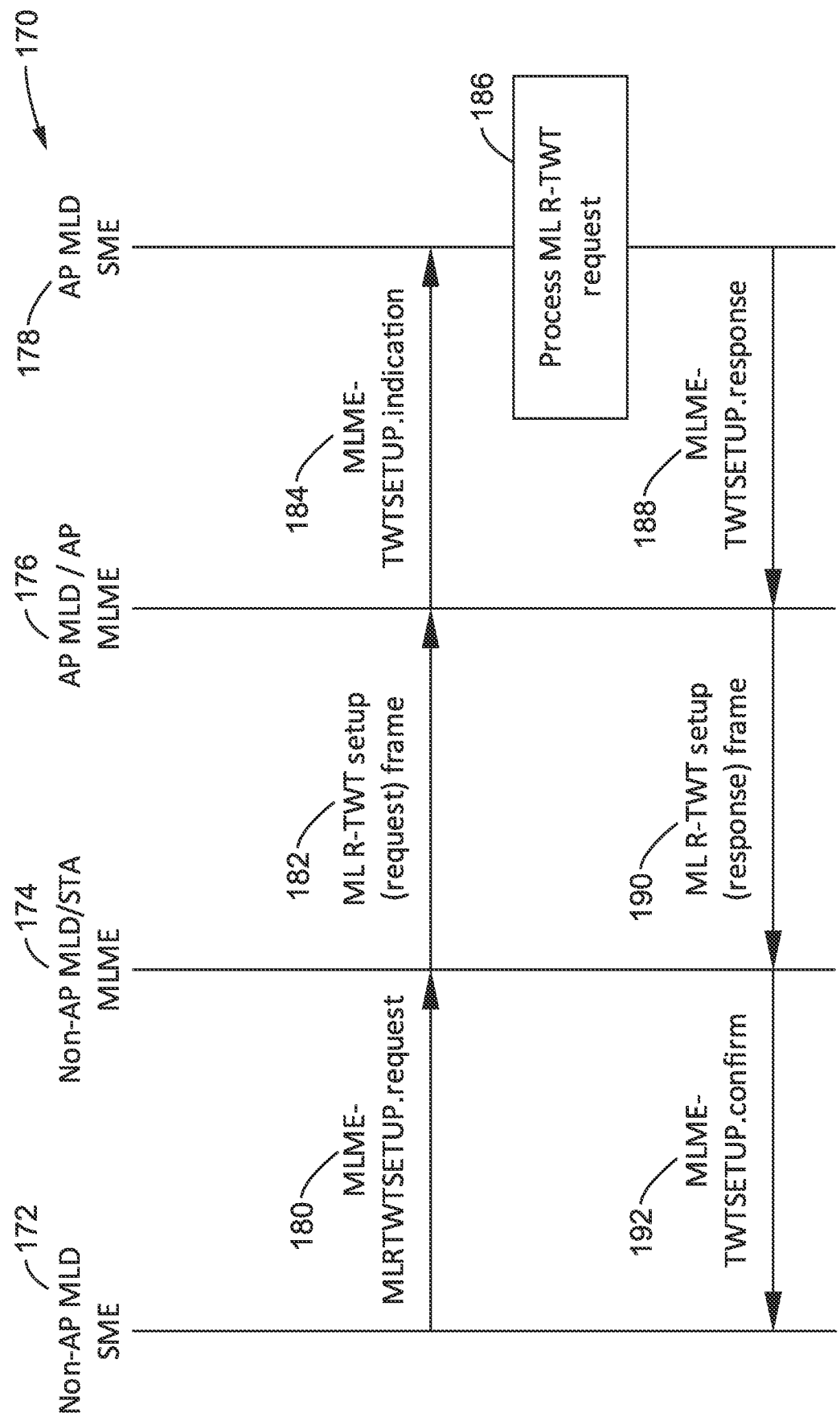
FIG. 21 is an interworking communications diagram of ML R-TWT membership negotiation signaling according to at least one embodiment of the present disclosure.

FIG. 21 illustrates an example embodiment 170 of ML R-TWT membership negotiation signaling (i.e., setup procedure) between the R-TWT scheduled MLD (non-AP MLD) and the R-TWT scheduling AP MLD (AP MLD). The figure depicts communications between a non-AP MLD Station Management Entity (SME) 172 and its MLD/STA MAC Layer Management Entity (MLME) 174, and over the network with an AP MLD/AP MLME 176 and its AP SME 178. The interworking model of the STAs can be the same as that defined in IEEE 802.11be standard.

The non-AP MLD decides (determines) to initiate a ML R-TWT setup procedure with the AP MLD. The Station Management Entity (SME) of the non-AP MLD sends a MLME-TWTSETUP.request message 180 to its MAC Sublayer Management Entity (MLME). When the MLME of the non-AP MLD/STA receives the MLME-TWTSETUP.request message, it collects the information in the MLME-TWTSETUP.request message and sends a ML R-TWT setup frame 182 (i.e., ML R-TWT request frame) to the AP MLD. The MLME of the AP or the AP MLD receives the frame and generates a MLME-TWTSETUP.indication message 184 to its SME.

Then, the SME of the AP MLD processes 186 this request information and sends an MLME-TWTSETUP.response message 188 containing ML R-TWT setup results to its MLME. Then, the MLME of the AP or the AP MLD sends a ML R-TWT setup frame 190 (i.e., ML R-TWT response frame) to the non-AP MLD. The MLME of the non-AP MLD or STA receives the frame and sends an MLME-TWTSETUP.confirm message 192 to its SME. Then, the non-AP MLD can determine (know) whether the ML R-TWT setup was successful or not. The format of ML R-TWT setup frame is shown in FIG. 24.

In at least one embodiment/mode/option the AP MLD can send an unsolicited ML R-TWT response frame to the non-AP MLD to establish, modify, or terminate the ML R-TWT membership of the non-AP MLD.

4.4.3. Teardown of ML R-TWT

Figure 22:
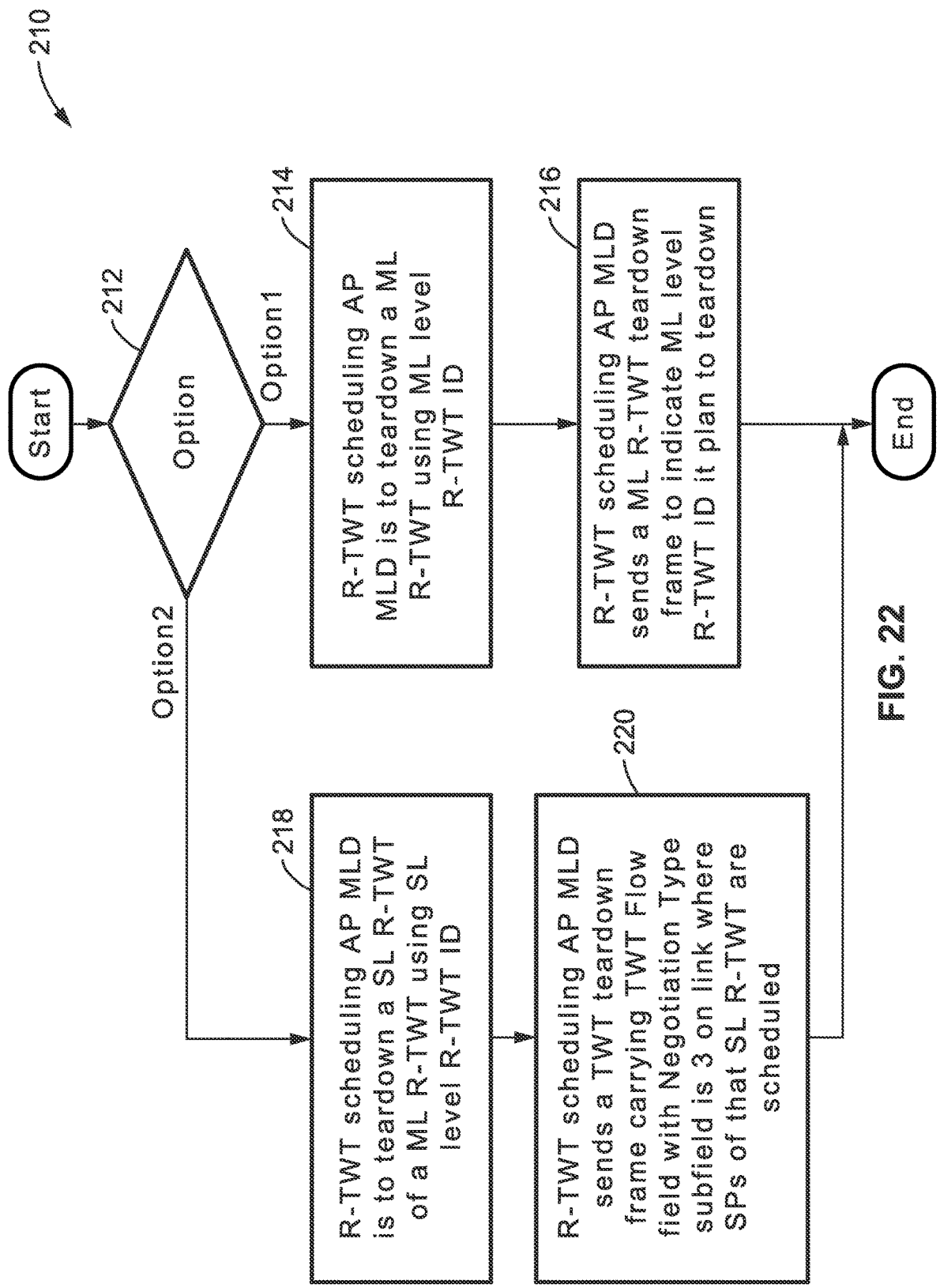
FIG. 22 is a flow diagram of a R-TWT scheduling AP MLD tearing down a ML R-TWT according to at least one embodiment of the present disclosure.

FIG. 22 illustrates an example embodiment 210 of a R-TWT scheduling AP MLD tearing down a ML R-TWT. The AP determines 212 either of multiple options, here indicated as Option 1 and Option 2, for tearing down the ML R-TWT.

If at block 212 Option 1 is selected, then at block 214 the R-TWT scheduling AP MLD tears down a ML R-TWT using ML level R-TWT ID. In this case, the R-TWT scheduling AP MLD sends 216 a ML R-TWT teardown frame to indicate the ML level R-TWT ID it plans to tear down. The format of ML R-TWT teardown frame can be as that shown in FIG. 25.

If at block 212 Option 2 is selected, then at block 218 then the R-TWT scheduling AP MLD tears down a SL R-TWT of a ML R-TWT using SL level R-TWT ID. Then, the R-TWT scheduling AP MLD sends 220 a TWT teardown frame carrying TWT Flow field with Negotiation Type subfield=3 on the link where the SPs of that SL R-TWT are scheduled. It should be noted that the other SL R-TWTs of the ML R-TWT is not torn down in this case. The format of TWT teardown frame can be the same as shown in FIG. 10, but is not limited thereto.

Figure 23:
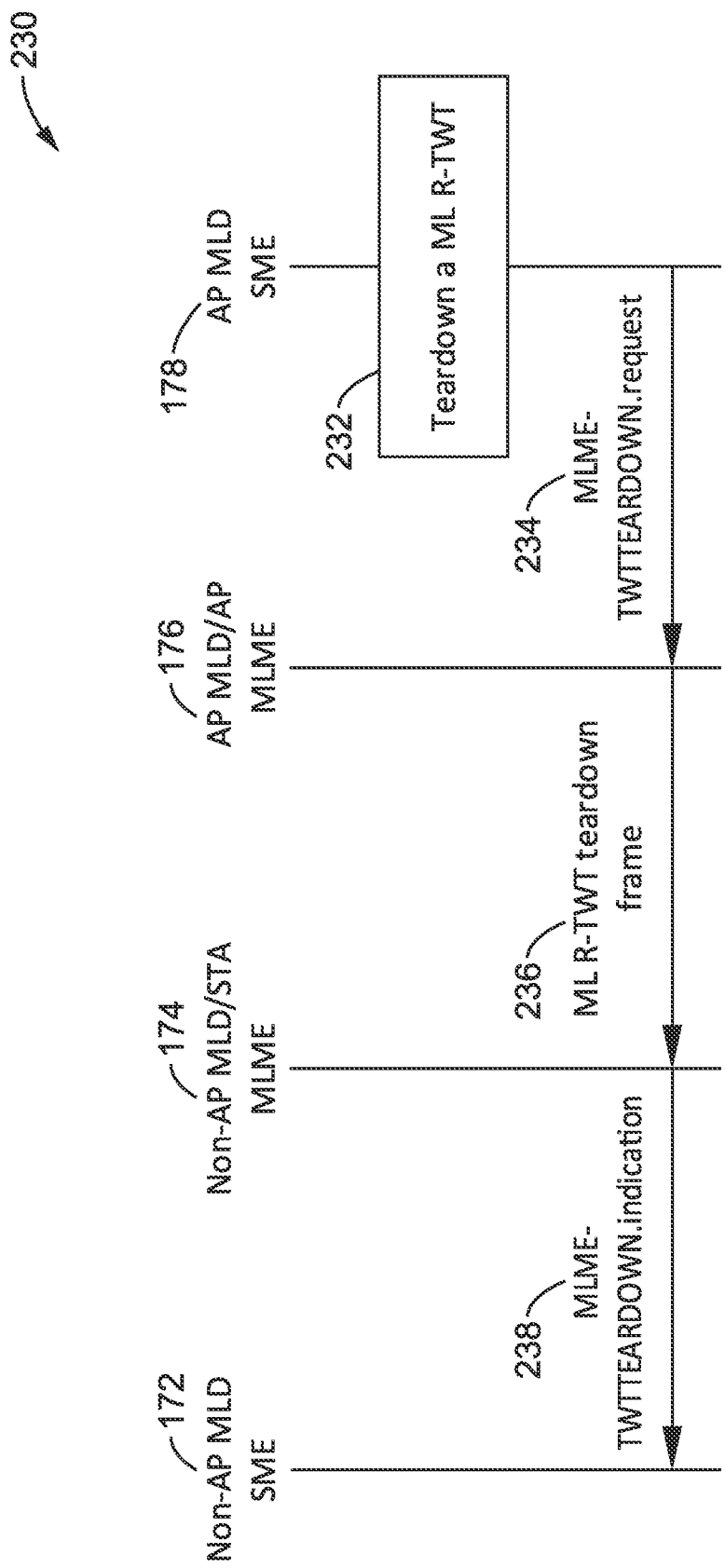
FIG. 23 is an interworking communications diagram of ML R-TWT teardown signaling using ML level R-TWT ID, according to at least one embodiment of the present disclosure.

FIG. 23 illustrates an example embodiment 230 of ML R-TWT teardown signaling using ML level R-TWT ID. The interworking model of the STAs can be the same as defined in IEEE 802.11be standard. In FIG. 23, as in FIG. 21, are depicted communications between a non-AP MLD Station Management Entity (SME) 172 and its MLD/STA MAC Layer Management Entity (MLME) 174, and over the network with an AP MLD/AP MLME 176 and its AP SME 178.

The AP MLD has determined (decided) 232 to teardown a ML R-TWT. The Station Management Entity (SME) of the AP MLD sends a MLME-TWTTEARDOWN.request message 234 to its MAC Sublayer Management Entity (MLME) or the MLME of its affiliated AP. When the MLME of the AP or the AP MLD receives the MLME-TWTTEARDOWN-.request message, it collects the information in the MLME-TWTTEARDOWN.request message and sends (unicast, groupcast, or broadcast) a ML R-TWT teardown frame 236 to the non-AP MLD. The MLME of the non-AP MLD or STA receives the frame and generates a MLME-TWTTEARDOWN.indication message carrying the information in the frame to its SME.

Figure 25:
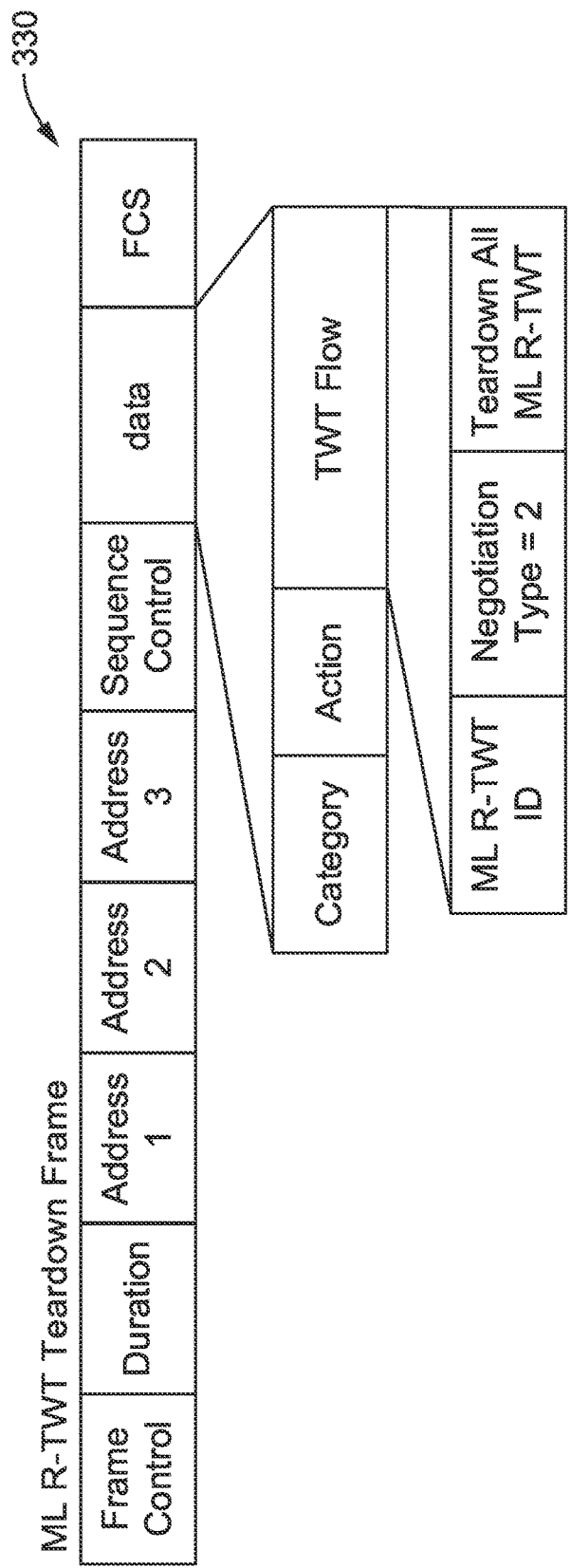
FIG. 25 is a data field diagram of a ML R-TWT teardown frame, according to at least one embodiment of the present disclosure.

Then, the SME of the non-AP MLD sends 238 an MLME-TWTTEARDOWN.indication message to its MLME or the MLME of its affiliated AP. Then, the MLME of the non-AP MLD or STA can recognize (know) which TWT(s) have been torn down by the AP. The format of TWT teardown frame is shown in FIG. 25.

4.5. Frame Formats

This section shows the format of ML R-TWT setup frame and ML R-TWT Teardown frame.

4.5.1. ML R-TWT Setup Frame

FIG. 24 illustrates an example embodiment 310 of a ML R-TWT setup frame used for membership management of ML R-TWT.

When a ML R-TWT setup frame is sent to request a membership of ML R-TWT, it is a ML R-TWT request frame. When a ML R-TWT setup frame is sent in response to a membership request of ML R-TWT, it is a ML R-TWT response frame. It should be noted that in at least one embodiment/mode/option the R-TWT scheduling AP MLD can send an unsolicited ML R-TWT response frame to the non-AP MLD to establish, modify, or terminate the ML R-TWT membership of the non-AP MLD.

The ML R-TWT setup frame has the following fields. The Frame Control field indicates the type of frame. Duration field contains Network Allocation Vector (NAV) information used for CSMA/CA channel access. The Address1 field contains address for the recipient of the frame. The Address2 field contains the address of the STA that transmitted the frame. The Address3 field contains the BSSID for the recipient. The Sequence control field contains the fragment number and the sequence number of the frame.

The data field is shown with the following subfields. The Category and Action subfields are set to indicate the frame is a ML R-TWT setup frame. In at least one embodiment/mode/option the Category field and the Action field can be set to the same values of the TWT setup frame as shown in FIG. 2.

The Dialog token subfield is used for matching the ML R-TWT response frame with the ML R-TWT request frame when there are multiple concurrent ML R-TWT membership negotiations. For a ML R-TWT membership negotiation, the ML R-TWT response frame and the ML R-TWT request frame should share the same unique dialog token number. If the ML R-TWT response frame and the ML R-TWT request frame are sent over different links, their dialog tokens should be unique over all the links between the non-AP MLD which sends the ML R-TWT request frame and the AP MLD which sends the ML R-TWT response frame.

Figure 26:
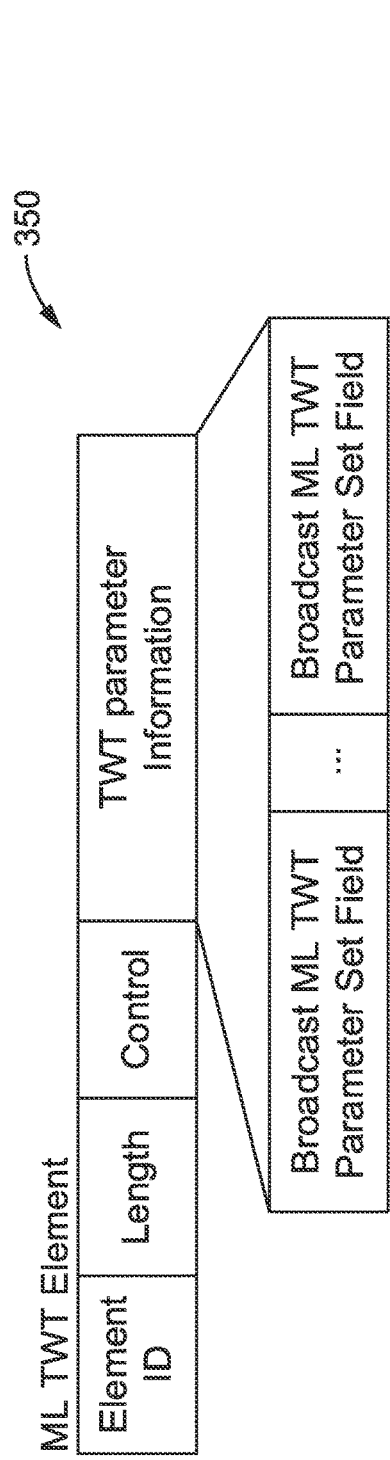
FIG. 26 is a data field diagram of a ML TWT element according to at least one embodiment of the present disclosure.

The ML TWT element is set to indicate the ML R-TWT membership negotiation or management information. The format of the ML TWT element is shown in FIG. 26.

4.5.2. ML R-TWT Teardown Frame

FIG. 25 illustrates an example embodiment 330 of a ML R-TWT teardown frame, having the following fields. The Frame Control field indicates the type of the frame. The Duration field contains NAV information used for CSMA/CA channel access. The Address1 field contains an address for the recipient of the frame. The Address2 field contains the address of the STA that transmitted the frame. The Address3 field contains the BSSID for the receiver. The Sequence control field contains the fragment number and the sequence number of the frame.

The data field is shown with the following subfields. The Category and Action subfield are set to indicate the frame is a ML R-TWT teardown action frame. It is possible that the Category subfield and the Action subfield are set to the same numbers of the TWT teardown frame as shown in FIG. 10.

The TWT Flow subfield is set to indicate which ML R-TWT is torn down by the R-TWT scheduling AP MLD. When the receiver, i.e., the R-TWT scheduled MLD, receives this subfield, it can recognize (know) which ML R-TWT has been torn down. Accordingly, it should not request membership of that ML R-TWT. If the receiver is already a member of that ML R-TWT, it should quit its membership immediately after receiving this subfield. If the ML R-TWT consists of multiple SL R-TWTs, it is possible that when the ML R-TWT is torn down, its SL R-TWTs are also torn down. Alternatively, in at least one embodiment/mode/option when the ML R-TWT is torn down, its associated SL R-TWTs are not necessarily torn down.

The subfields of the TWT flow subfield are as follows. The ML R-TWT ID subfield is set to indicate which ML R-TWT has been torn down by the R-TWT scheduling AP MLD. This subfield can be reserved when the Teardown All ML R-TWT field is set to "1".

The Negotiation Type subfield is set to indicate that the content in the TWT flow field is for ML R-TWT teardown, such as the existence of ML R-TWT field and Teardown All ML R-TWT field. For example, the negotiation type can be set to a value of 2.

The Teardown All ML R-TWT subfield is set to indicate whether the R-TWT scheduling MLD tears down all its ML R-TWTs. This subfield can be implemented as one bit indication, as exemplified here. When this subfield is set to a first state (e.g., "1"), this indicates that the R-TWT scheduling MLD tears down all its ML R-TWTs. Otherwise, it is set to a second state (e.g., "0") indicating that the R-TWT scheduling MLD only tears down the ML R-TWT indicated in the ML R-TWT ID field.

4.6. ML TWT Element Format

This section illustrates the format of ML TWT element. The ML TWT element is set to indicate the ML R-TWT membership negotiation or management information.

If the ML TWT element is sent in a ML R-TWT request frame, then the ML TWT element is set to indicate the requirement of the ML R-TWT membership of the transmitter. When the recipient receives this element, it makes a determination of whether to accept the membership request based on the requirements of the ML R-TWT membership request. Then, the receiver sends a ML R-TWT response frame to indicate its decision on the membership request.

If the ML TWT element is sent in a ML R-TWT response frame, then the ML TWT element is set to indicate the decision of the ML R-TWT membership request.

If the ML R-TWT membership request is accepted, the ML TWT element also carries the ML R-TWT SP scheduling for its member. When the receiver, such as the R-TWT scheduled MLD, receives this field, it recognizes that its ML R-TWT membership request has been accepted, and it becomes a member of the ML R-TWT, and operates following ML R-TWT SP scheduling.

If ML R-TWT membership request is rejected, then the receiver recognizes that it is not a member of the ML R-TWT. Additionally, the ML TWT element may carry the suggested parameters that the receiver can use to re-request the ML R-TWT member.

If the ML TWT element is sent in a ML R-TWT scheduling announcement frame, such as a beacon, then this field is set to indicate the ML R-TWT scheduling of the ML R-TWT scheduling AP MLD. The recipient receiving this element can determine the ML R-TWT scheduling of the ML R-TWT scheduling AP MLD. If the receiver is a R-TWT scheduled MLD, it operates following the ML R-TWT scheduling. It can also request membership of the ML R-TWTs that are announced by the ML R-TWT scheduling AP MLD.

There also may exist multiple ML TWT elements in the same ML R-TWT setup frame or in the same ML R-TWT scheduling announcement frame.

FIG. 26 illustrates an example embodiment 350 of a ML TWT element, having the following fields. An Element ID field is set to indicate that the element is an ML TWT element. This field can be set to the same value as the TWT element as shown in FIG. 3. A Length field is set to indicate the length of the element. A Control field is included whose subfields are described below in FIG. 27. A TWT Parameter Information field is included which may have multiple Broadcast ML TWT Parameter Set field, whose subfields are described in FIG. 28.

If the Broadcast ML TWT Parameter Set Field is used for the scheduling announcement, then it indicates the ML R-TWT scheduling. The receiver, such as R-TWT scheduled MLD, can operate following the ML R-TWT scheduling and request membership of the ML R-TWT.

If a Broadcast ML TWT Parameter Set Field is used by the R-TWT scheduled MLD to send a ML R-TWT membership request, then it is set to indicate its requirement of the ML R-TWT. When the ML R-TWT scheduling AP MLD receives the request, it decides to accept or reject the request based on the requirement of the R-TWT scheduled MLD.

If a Broadcast ML TWT Parameter Set Field is used by the R-TWT scheduling MLD to accept a membership request from a R-TWT scheduled MLD, then it is set to indicate the ML R-TWT scheduling of which the R-TWT scheduled MLD becomes the member. After the R-TWT scheduled MLD receives this field, it becomes the member of the ML R-TWT. The traffic of the R-TWT scheduled MLD will be prioritized to transmit during the SPs of the ML R-TWT.

If the Broadcast ML TWT Parameter Set Field is used by the R-TWT scheduling MLD to reject (e.g., the TWT setup command field is set to "Reject TWT") a membership request from a R-TWT scheduled MLD, then the R-TWT scheduled MLD recognizes that its membership request has been rejected or its existing ML R-TWT membership is terminated by the R-TWT scheduling MLD after it receives the field.

If the Broadcast ML TWT Parameter Set Field is used by the R-TWT scheduling MLD to reject (e.g., the TWT setup command field is set to "Alternate TWT" or "Dictate TWT") a membership request from a R-TWT scheduled MLD, then it is set to indicate the suggested parameters that the R-TWT scheduled MLD can use to request the ML R-TWT membership for the next time. When the R-TWT scheduled MLD receives this field, it recognizes that it has not obtained membership for the ML R-TWT, but can use the suggested parameters to re-request ML R-TWT membership.

Each Broadcast ML TWT Parameter Set Field can represent the parameter setting of either multiple (including one) SL R-TWTs or one ML R-TWT. The following are provided by way of example. (a) One Broadcast ML TWT Parameter Set Field can represent a ML R-TWT with a MLD level R-TWT ID. (b) One broadcast ML TWT Parameter Set Field can represent one or more SL R-TWTs with the same parameter setting and the same SL level R-TWT ID, but scheduled on different links. The SL R-TWTs in the same broadcast ML TWT Parameter Set Field may belong to a same ML R-TWT.

Figure 27:
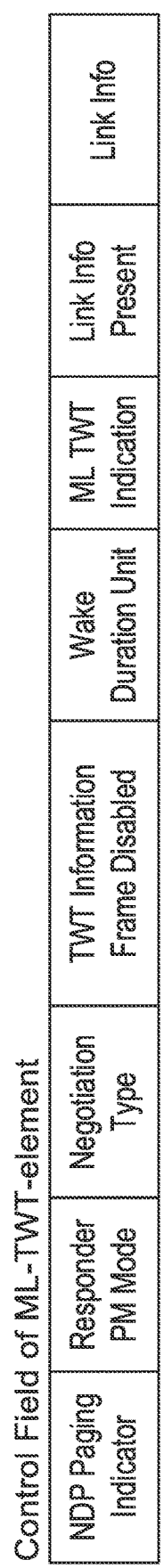
FIG. 27 is a data field diagram of the format of the Control field of ML TWT element according to at least one embodiment of the present disclosure.

FIG. 27 illustrates an example embodiment 370 of the Control field of ML TWT element shown in FIG. 26. The fields NDP Paging Indicator, Responder PM Mode, Negotiation Type, TWT Information Frame Disabled, and Wake Duration Unit field can be identical to those in the control field of the TWT element as shown in FIG. 4.

The ML TWT Indication field is set to indicate whether the TWT Parameter Information field in the ML TWT element carries the Broadcast ML TWT Parameter Set Field. This field may be implemented as a one bit indication. For example, when this field is set to a first state (e.g., "1"), then the ML TWT element carries the Broadcast ML TWT Parameter Set Field only. Otherwise, this field is set to a second state (e.g., "0") and the ML TWT element carries the Broadcast TWT Parameter Set Field only. It should be noted that if the element ID of the ML TWT element is the same as in the TWT element, then this field can also be used to indicate whether the element is a TWT element or a ML TWT element. If this field is set to a first state (e.g., "1"), then the element is a ML TWT element; otherwise, if this field set to a second state (e.g., "0") then it is a TWT element.

A Link Info Present field is set to indicate the presence of the link info field. If this field is set to a first state (e.g., "1"), then the link info field is presented in the control field. If this field is set to a second state (e.g., "0"), then the link info field is not presented in the control field.

A Link Info field is set to indicate which links the content to which the ML TWT element applies (i.e., which links the content of all the broadcast ML TWT Parameter Set fields in the ML TWT element are applied to). When the receiver, e.g., an MLD, receives this field it has information on which links the content of the ML TWT element is applied to and forwards those parameters to its affiliated STAs operating on those links. For example, if an MLD receives a ML TWT element on link1 and the Link Info field in the Control Field is set to link2, then the ML TWT element is for the R-TWT SP scheduled on link2. The MLD may forward the Broadcast ML TWT Parameter Set Field to its affiliated STA on link2. The format of the Link Info field can be one of the figures between FIG. 31 through FIG. 35.

Figure 28:
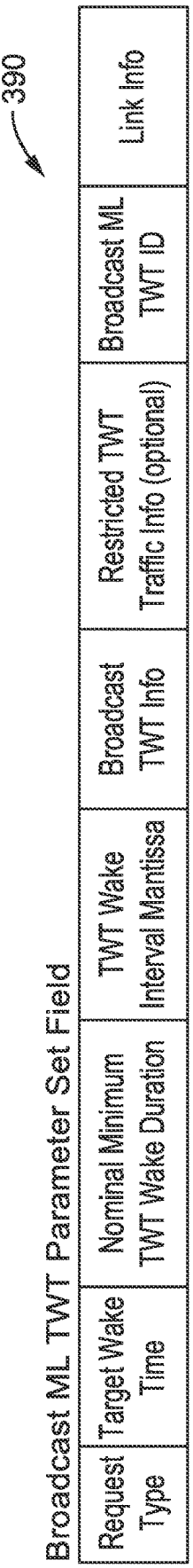
FIG. 28 is a data field diagram of a Broadcast ML TWT Parameter Set Field, according to at least one embodiment of the present disclosure.

It should be noted that the Link Info field in the Control field as shown in FIG. 27 and Link Info field in the Broadcast ML TWT Parameter Set Field as shown in FIG. 28 cannot be present in the same ML TWT element at the same time.

If the Link Info field is not present in both the Control field and the Broadcast ML TWT Parameter Set Field, then the Broadcast ML TWT Parameter Set Field is for a SL R-TWT on the link where the Broadcast ML TWT Parameter Set Field is transmitted.

FIG. 28 illustrates an example embodiment 390 of a Broadcast ML TWT Parameter Set Field. Each Broadcast ML TWT Parameter Set Field can represent the parameter setting for one or more SL R-TWTs (with the same link level ID but scheduled on different links) which belong to a ML R-TWT. A Request Type field can be set as shown in FIG. 29.

A Target Wake Time field is set to indicate the start time of the R-TWT SP. If this field is set for the scheduling announcement, then this field indicates the start time of the first SP of the R-TWT after the scheduling announcement frame (e.g., beacon). The R-TWT scheduled MLD will have start time information for the first SP of the R-TWT after receiving this field. If this field is set for the ML R-TWT membership request of the R-TWT scheduled MLD, then this field indicates the start time of the first SP of the R-TWT if the R-TWT scheduled MLD becomes the member of the R-TWT. The R-TWT scheduling MLD can decide whether to accept the membership request according to this field. If this field is set for the ML R-TWT response when the TWT setup command field is set to "Alternate TWT" or "Dictate TWT", then this field indicates the suggested parameter that the R-TWT scheduled MLD can use to set this field when it decides to request membership in the R-TWT for the next time. If this field is set for the ML R-TWT response which accepts a ML R-TWT request, then this field indicates the start time of the first SP of the R-TWT after the R-TWT scheduled MLD receives this field and becomes the member of the R-TWT.

A Target Wake Time field can be set by using one of the following options. In Option1 the Target Wake Time field is set to the TSF time of the STA which sends this field. In Option2 the Target Wake Time field is set to the TSF time of the link which is indicated in the Link Info field of the same Broadcast ML TWT Parameter Set Field if the Link Info is only allowed to indicate one link. In Option3 the Target Wake Time field is set to the TSF time of the link which is indicated in the Link Info field in the Control field of the ML TWT element if the Link Info is only allowed to indicate one link. In Option4 the Target Wake Time field is set to the TSF time of the link which is the first bit (the MSB or the LSB in Link bitmap as shown in FIG. 32 or the first LinkID field as shown in FIG. 33 through FIG. 35) of the Link Info field.

A nominal minimum TWT Wake Duration field is set to indicate the R-TWT SP duration. A TWT Wake Interval Mantissa field and the TWT Wake Interval Exponent field as shown in FIG. 29 are set to represent the interval between the R-TWT SPs, which is similar to those as defined in IEEE 802.11ax. A Broadcast TWT Info field can be as shown in FIG. 30. A Restricted TWT Traffic Info field is present when the Restricted TWT Traffic Info Present field as shown in FIG. 30 is set to a first state (e.g., "1"), and this field can be identical to that defined in IEEE 802.11be. A Broadcast ML TWT ID field is set to indicate the MLD level R-TWT ID of the ML R-TWT. The receiver can use this field to identify the ML R-TWT.

A Link Info field is set to indicate which links the content of the broadcast ML TWT Parameter Set field is applied to. When the receiver receives this field, it now has information on which links the content of the broadcast ML TWT Parameter Set field is applied to and forwards those parameters to the STAs operating on those links. For example, if a MLD receives a Broadcast ML TWT Parameter Set Field on link1 and the Link Info field of the Broadcast ML TWT Parameter Set Field is set to link2, then the Broadcast ML TWT Parameter Set Field is for the R-TWT SP scheduled on link2. The MLD may forward the Broadcast ML TWT Parameter Set Field to its affiliated STA on link2. The format of the Link Info field can be one of the figures between FIG. 31 through FIG. 35.

FIG. 29 illustrates an example embodiment 410 of the Request Type field of the Broadcast ML TWT Parameter Set Field. The fields of TWT Request field, TWT Setup Commands, Trigger, Last Broadcast Parameter Set, Flow Type, Broadcast TWT Recommendation and TWT Wake Interval Exponent field can be identical to those defined in IEEE 802.11ax.

A Trigger-based Only field is set to indicate whether the ML R-TWT scheduled MLDs are allowed to contend for the channel during the R-TWT SPs. In at least one embodiment this field can be a one bit indication. For example, if this field is set to a first state (e.g., "1"), then the UL traffic transmission of the R-TWT member can only be triggered by the ML R-TWT scheduling AP MLD during the R-TWT SPs. If this field is set to a second state (e.g., "0"), then the R-TWT member can contend and access the channel for UL traffic transmission during the R-TWT SPs.

In at least one embodiment/mode/option when the Broadcast TWT Recommendation field is set to indicate the Broadcast ML TWT Parameter Set field is for R-TWT (e.g., value 4), the Trigger field works as the Trigger Based Only field and the Trigger based Only field is not needed.

FIG. 30 illustrates an example embodiment 430 of the Request Type field of the Broadcast ML TWT Parameter Set Field, having the following subfields.

A Restricted TWT Traffic Info Present field, in at least one embodiment, is a one bit indication to indicate whether the Restricted TWT Traffic Info field is present in the Broadcast ML TWT Parameter Set Field, which can be identical to that seen in FIG. 7.

An ML TWT ID Present field is set to indicate whether the Broadcast ML TWT ID field in the Broadcast ML TWT Parameter Set Field as shown in FIG. 28 is present or not. In at least one embodiment this field can be one bit indication. For example, when this field is set to a first state (e.g., "1"), then the Broadcast ML TWT ID field is present in the Broadcast ML TWT Parameter Set Field. Otherwise, this field is set to a second state (e.g., "0") and the Broadcast ML TWT ID field is not present in the Broadcast ML TWT Parameter Set Field.

A Link Info Present field, can be in at least one embodiment, a one bit indication to indicate whether the Link Info field is present in the Broadcast ML TWT Parameter Set Field as shown in FIG. 28. For example, when this field is set to a first state (e.g., "1"), then the Link Info field is present in the Broadcast ML TWT Parameter Set Field. Otherwise, it is set to a second state (e.g., "0") and the Link Info field is not present in the Broadcast ML TWT Parameter Set Field. Then, the Broadcast ML TWT Parameter Set Field is for the ML R-TWT parameter setting on the link it is transmitted.

A Broadcast TWT ID field is set to indicate the link level R-TWT ID of the SL R-TWT. The parameters in the Broadcast ML TWT Parameter Set Field are for those specific SL R-TWT(s) on the link indicated in the Link Info field.

A Broadcast TWT Persistence field can be identical to that defined in IEEE 802.11ax.

In at least one embodiment/mode/option the ML TWT ID Present field is set to indicate whether to set the Broadcast TWT ID to MLD level R-TWT ID or link level R-TWT ID. When the ML TWT ID Present field is set to a first state (e.g., "1"), then the Broadcast TWT ID field is set to indicate the MLD level R-TWT ID. When the ML TWT ID Present field is set to a second state (e.g., "0"), then the Broadcast TWT ID field is set to indicate the link level R-TWT ID; whereby the Broadcast ML TWT ID field in the Broadcast ML TWT Parameter Set Field is then not needed.

FIG. 31 through FIG. 35 illustrate five options 450, 470, 490, 510 and 530 for the format of Link Info field, presented by way of example and not limitation.

In Option 1 of FIG. 31 the Link Info field can only carry one Link ID field. The link ID field is set to represent one link that the information is applied to.

In Option 2 of FIG. 32, the Link Info field can carry one link bitmap field. This field can be the same as it is defined in IEEE 802.11be. The link bitmap field consists of multiple bits. Each bit represents a link. If a bit is set to a first state (e.g., "1"), then it represents that the information is applied to the corresponding link of that bit. Otherwise, a bit is set to a second state (e.g., "0") then this indicates that the information is not applied to the corresponding link of that bit.

In Option 3 of FIG. 33, the Link Info field can carry multiple Link ID fields. Each Link ID field is set to represent one link that the information is applied to. A More Link ID field is set to indicate whether there is another Link ID field following it. For example, if the More Link ID field is set to a first state (e.g., "1"), then there is another Link ID field following it. Otherwise, this field is set to a second state (e.g., "0") and there is no Link ID field following it.

In Option 4 of FIG. 34, the Link Info field can carry multiple Link ID fields. Each Link ID field is set to represent one link that the information is applied to. The Last Link ID field is set to indicate whether there is another Link ID field following it. If, for example, the Last Link ID field is set to a second state (e.g., "0"), then there is another Link ID field following it. Otherwise, this field is set to a first state (e.g., "1") and there is no Link ID field following it.

In Option 5 of FIG. 35, the Link Info field can carry multiple Link ID fields. Each link ID field is set to represent one link that the information is applied to. Before the Link ID fields, there is a Number of Link ID field. This field is set to indicate the number of Link ID fields in the Link Info field.

It should be noted that the format of Link Info field in a ML TWT element for the ML R-TWT scheduling announcement can be different from the format of the Link Info field in a ML TWT element for the ML R-TWT setup (membership negotiation).

In at least one embodiment/mode/option the ML TWT Indication field is not needed since the Broadcast ML TWT Parameter Set Field contains a Link Info Present field and a ML TWT ID Present field. Those two fields are preferably located at reserved bits of the Broadcast TWT Parameter Set Field as shown in FIG. 5. If for example they are set to a second state (e.g., "0"), then the Broadcast ML TWT Parameter Set Field is the same as the Broadcast TWT Parameter Set Field as shown in FIG. 5.

4.7. Examples

This section provides multiple examples of ML R-TWT signaling. The network topology in these examples is shown as in FIG. 16. In the examples of this section, SL R-TWTx represents a SL R-TWT with link level R-TWT ID=x; while ML R-TWTy represents a ML R-TWT with MLD level R-TWT ID=y.

In these examples of frame exchange, a pair of "{ }" in a frame represents a ML TWT element. The content between "{ }" represents the content in that ML TWT element. A pair of "< >" in a ML TWT element represents a Broadcast ML TWT Parameter Set Field. The content between "< >" represents the content in that Broadcast ML TWT Parameter Set Field. For example, {<SL R-TWT1, link1, 2>, <SL R-TWT2, link1>} represents a ML TWT element carrying two Broadcast ML TWT Parameter Set fields. One Broadcast ML TWT Parameter Set field is for a SL R-TWT1 whose SPs are scheduled on link1 (SL R-TWT1 on link1) and another SL R-TWT1 whose SPs are scheduled on link2 (SL R-TWT1 on link1). Another Broadcast ML TWT Parameter Set field is for a SL R-TWT2 whose SPs are scheduled on link1 (SL R-TWT2 on link1). {<SL R-TWT1, ML R-TWT2, link1, 2>} represents an ML TWT element carrying one Broadcast ML TWT Parameter Set field which is for SL R-TWT1 on link1 and link2 that belong to ML R-TWT2.

4.7.1. Link Info per Broadcast ML TWT Parameter Set Field

This section also considers the scenario that only the Link Info field is present per Broadcast ML TWT Parameter Set Field as shown in FIG. 28. That is, the Link Info field is not present in the Control field of the ML TWT element as shown in FIG. 27.

4.7.1.1. Implicit ML R-TWT

This section considers the scenario when an implicit ML R-TWT consists of one or more SL R-TWTs. Each SL R-TWT is assigned to a unique link level R-TWT ID by the R-TWT scheduled AP on its link. The R-TWT scheduling AP MLD does not assign ML level R-TWT ID to a ML R-TWT. That is, the Broadcast ML TWT ID field is not present in the Broadcast ML TWT Parameter Set field as shown in FIG. 28.

In the examples of this section, AP1 schedules SL R-TWT4 on link1. AP2 schedules SL R-TWT2 and SL R-TWT4 on link2. The scheduling of SL R-TWT4s on link1 and link2 is the same (i.e., their SP start time, SP duration, and interval between SPs are the same) but the scheduling of SL R-TWT2 is different from the other two. According to Section 4.3, the SL R-TWT4 on link1 and link2 can be considered as an implicit ML R-TWT and the SL R-TWT2 can be considered as another implicit ML R-TWT.

FIG. 36 illustrates an example embodiment 610 of R-TWT scheduling with the AP announcing the ML R-TWT SP scheduling on its own link only. By way of example and not limitation, the figure depicts interactions between MLD1 70 with AP1 76 and AP2 78 and MLD3 74 with STA3 84 and STA5 88.

When AP1 sends a beacon 614 on link1, the beacon carries a ML TWT element. The ML TWT element carries a Broadcast ML TWT Parameter Set field to indicate the SL R-TWT4 SP scheduling start 620 and duration 624 on link1 only. It should be noted that the Broadcast ML TWT Parameter Set field of SL R-TWT4 does not contain a Link Info field which indicates that it is for SL R-TWT4 on link1.

When AP2 sends a beacon 612 on link2, the beacon carries a ML TWT element. The ML TWT element carries two Broadcast ML TWT Parameter Set fields. One indicates the scheduling of SL R-TWT2 616 on link2 and the other one indicates the scheduled start 618 and duration 624 of SL R-TWT4 on link2.

During the SL R-TWT4 SP on link1 620 and link2 618, AP1 and AP2 can exchange frames with the members of SL R-TWT4 on link1 and link2. During the SL R-TWT4 SP on link1 and link2, AP1 and AP2 can exchange frames with the members of SL R-TWT4 on link1 and link2, respectively. As shown in the figure, SL R-TWT4 on link1 and link2 is trigger-based only. Then AP1 and AP2 access the channel to trigger UL and DL transmissions. The members of SL R-TWT4 on link1 and link2 should not access the channel during the SL R-TWT4 SP on link1 and link2.

During the SL R-TWT2 SP on link2, AP2 can exchange frames with the members of SL R-TWT2 on link2. As shown in the figure, SL R-TWT2 on link2 is not trigger-based only. Then, if STA5 is a member of SL R-TWT2 on link2, it can contend for and access the channel to exchange frames with AP2 during the SL R-TWT2 SP on link2.

AP1 is seen sending Trigger Frame (TF) 622*a*, and AP2 sending TF 622*b*, to which STA3 and STA5, respectively, respond with UL PPDU 626*a* and 626*b*. Upon receiving the transmission, the APs respond with BA 628*a* and 628*b*. AP1 and AP2 are seen sending DLMU PPDUs 630*a* and 630*b*, and receiving BAs 632*a*, 632*b* from STA3 and STA5 respectively. Each of these transmissions are depicted as being aligned for links of a Non-Simultaneous Transmit-Receive (NSTR) link pair. Then in an SL R-TWT2 SP on link2 634, STA5 sends a non-triggered UL PPDU 636 and receives a BA 638 from AP2.

It should be noted that in the above case, there is no need of the Link info field. The format of ML TWT element can be the same as TWT element. That is, the ML TWT element can be decoded by STAs which supports broadcast TWT as defined in IEEE 802.11ax. Therefore, the ML TWT element can also be used to announce the broadcast TWT scheduling.

It should be noted that PPDU alignment during SL R-TWT4 SP on link1 and link2 is not needed if link1 and link2 are not links of an NSTR link pair.

Figure 37:
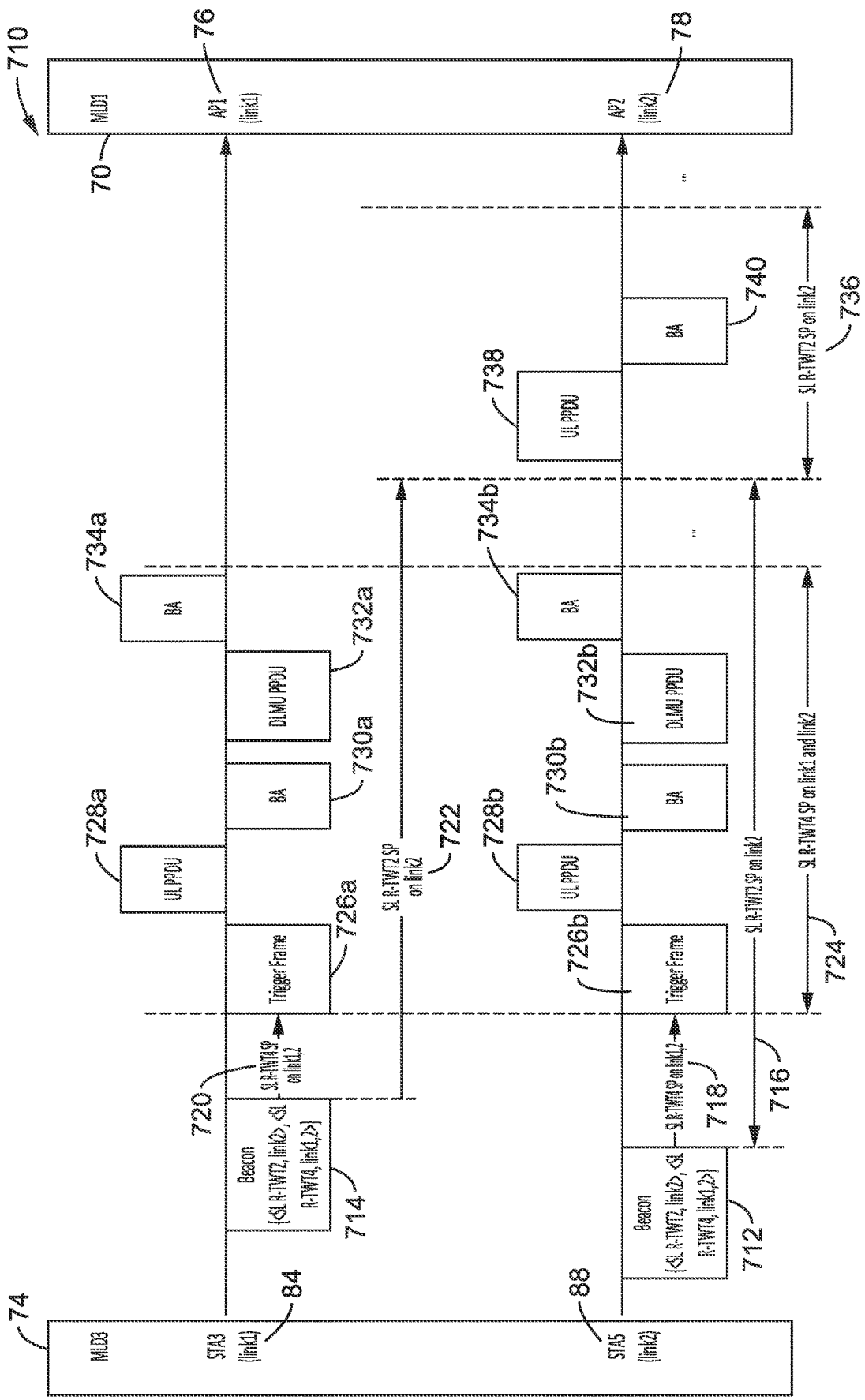
FIG. 37 is a communications diagram of a R-TWT scheduling AP announcing SL R-TWT scheduling on all the links, according to at least one embodiment of the present disclosure.

FIG. 37 illustrates an example embodiment 710 of a R-TWT scheduling AP announcing SL R-TWT scheduling on all the links. In this example, a link Info field in the Broadcast ML TWT Parameter Set Field can represent multiple links. That is, the format of the link Info field can be as shown in FIG. 32 through FIG. 35. By way of example and not limitation, the figure depicts interactions between MLD1 70 with AP1 76 and AP2 78 and MLD3 74 with STA3 84 and STA5 88.

AP1 sends a beacon 714 carrying a ML TWT element on link1. The ML TWT element carries two Broadcast ML TWT Parameter Set fields. One field indicates the scheduling of SL R-TWT2 722 on link2; while the other one indicates the scheduling of SL R-TWT4 724 on link1 and link2. The Target Wake Time fields of the Broadcast ML TWT Parameter Set fields are set to the TSF time of AP1.

AP2 sends a beacon 712 carrying a ML TWT element on link2. The ML TWT element carries two Broadcast ML TWT Parameter Set fields. One indicates the scheduling of SL R-TWT2 716 on link2. The other one indicates the scheduling of SL R-TWT4 start 718 and duration 724 on link1 and link2. The Target Wake Time fields of the Broadcast ML TWT Parameter Set fields in the ML TWT element are set to the TSF time of AP2.

The remainder of the figure is the same as in FIG. 36, with AP1 sending Trigger Frame (TF) 726*a*, and AP2 sending TF 726*b*, to which STA3 and STA5, respectively, respond with UL PPDU 728*a* and 728*b*. Upon receiving the transmission, the APs respond with BA 730*a* and 730*b*. AP1 and AP2 are seen sending DLMU PPDUs 732*a* and 732*b*, and receiving BAs 734*a*, 734*b* from STA3 and STA5 respectively. Each of these transmissions are depicted as being aligned for links of an NSTR link pair. Then in an SL R-TWT2 SP 736 on link2 STA5 sends a non-triggered UL PPDU 738 and receives a BA 740 from AP2.

Figure 38:
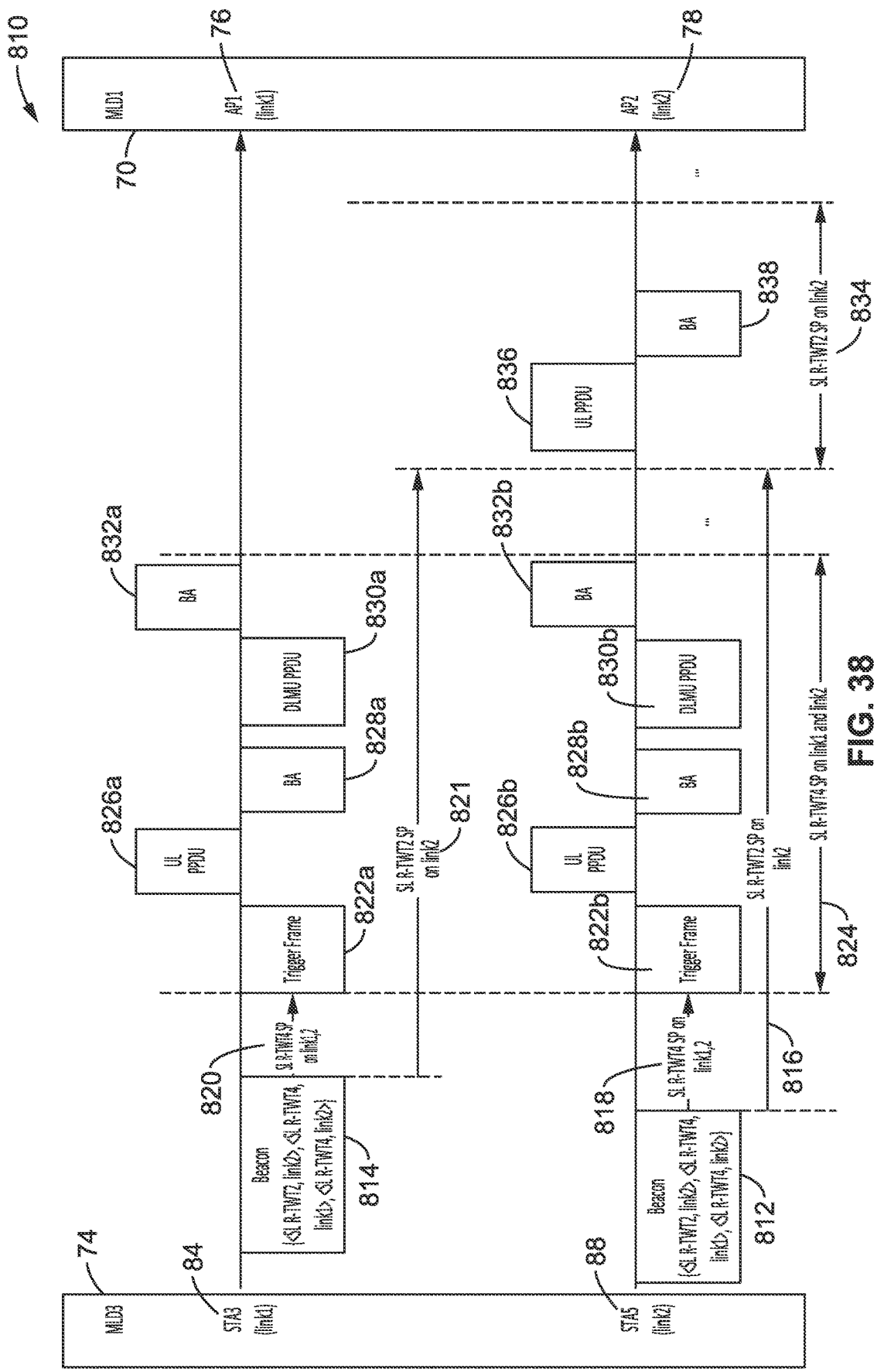
FIG. 38 is a communications diagram of another option for the R-TWT scheduling AP to announce SL R-TWT scheduling on all the links, according to at least one embodiment of the present disclosure.

FIG. 38 illustrates another example embodiment 810 of the R-TWT scheduling AP announcing SL R-TWT scheduling on all the links. In this example, a link Info field in the Broadcast ML TWT Parameter Set Field can only represent one link. That is, the format of the link Info field can be as shown in FIG. 31 or FIG. 32 (e.g., only one bit can be set to "1"). Again, the figure depicts, by way of example and not limitation, interactions between MLD1 70 with AP1 76 and AP2 78 and MLD3 74 with STA3 84 and STA5 88.

AP1 sends a beacon 814 carrying a ML TWT element on link1. The ML TWT element carries three Broadcast ML TWT Parameter Set fields. The first one indicates the scheduling of SL R-TWT2 821 on link2. The second and third ones indicate the scheduling of SL R-TWT4 start 820 and duration 824 on link1 and link2. The Target Wake Time field of a Broadcast ML TWT Parameter Set field is set to the TSF time of the AP on the link indicated in the Link Info field of that Broadcast ML TWT Parameter Set field. For example, the Target Wake Time field of a Broadcast ML TWT Parameter Set field of SL R-TWT2 on link2 is set to TSF time of AP2 on link2.

AP2 sends a beacon 812 carrying a ML TWT element on link2. The ML TWT element is identical to that in the beacon transmitted on link1.

The remainder of the figure is like FIG. 36, with AP1 sending Trigger Frame (TF) 822*a*, and AP2 sending TF 822*b*, to which STA3 and STA5, respectively, responds with UL PPDU 826*a*, 826*b*. Upon receiving the transmission, the APs respond with BA 828*a* and 828*b*. AP1 and AP2 are seen sending DLMU PPDUs 830a and 830b, and receiving BAs 832a, 832b from STA3 and STA5 respectively. Each of these transmissions are depicted as being aligned for links of an NSTR link pair. Then in an SL R-TWT2 SP 834 on link2 STA5 sends a non-triggered UL PPDU 836 and receives a BA 838 from AP2.

FIG. 39 illustrates an example embodiment 910 of R-TWT scheduling with AP announcements of ML R-TWT scheduling of SPs on its link. In this example, a link Info field in the Broadcast ML TWT Parameter Set Field can represent multiple links. That is, the format of the link Info field can be as shown in FIG. 32 through FIG. 35. Again, the figure depicts, by way of example and not limitation, interactions between MLD1 70 with AP1 76 and AP2 78 and MLD3 74 with STA3 84 and STA5 88.

AP1 sends a beacon 914 carrying a ML TWT element on link1. Since SL R-TWT4 on link1 and SL R-TWT4 on link2 are considered as a ML R-TWT, the ML TWT element carries one Broadcast ML TWT Parameter Set field which indicates the scheduling of SL R-TWT4 start 920 and duration 924 on link1 and link2. The Target Wake Time fields of the Broadcast ML TWT Parameter Set fields are set to the TSF time of AP1.

AP2 sends a beacon 912 carrying a ML TWT element on link2. The ML TWT element carries two Broadcast ML TWT Parameter Set fields. One indicates the scheduling of SL R-TWT2 916 on link2. The other one indicates the scheduling of SL R-TWT4 start 918 and duration 924 on link1 and link2 since SL R-TWT4 on link1 and SL R-TWT4 on link2 are considered as a ML R-TWT. The Target Wake Time fields of the Broadcast ML TWT Parameter Set fields in the ML TWT element are set to the TSF time of AP2.

The remainder of the figure is the same as FIG. 38, with AP1 sending Trigger Frame (TF) 922a, and AP2 sending TF 922b, to which STA3 and STA5, respectively, respond with UL PPDU 926a, 926b. Upon receiving the transmission, the APs respond with BA 928a and 928b. AP1 and AP2 are seen sending DLMU PPDUs 930a and 930b, and receiving BAs 932a, 932b from STA3 and STA5 respectively. Each of these transmissions are depicted as being aligned for links of an NSTR link pair. Then in an SL R-TWT2 SP 934 on link2 STA5 sends a non-triggered UL PPDU 936 and receives a BA 938 from AP2.

FIG. 40 illustrates an example embodiment 1010 of a ML R-TWT setup procedure. Again, the figure depicts, by way of example and not limitation, interactions between MLD1 70 with AP1 76 and AP2 78 and MLD3 74 with STA3 84 and STA5 88.

An ML R-TWT membership negotiation commences 1012 with STA3 transmitting a ML R-TWT request frame 1014 to AP1 over link1 to request the membership of SL R-TWT2 whose SPs are scheduled on link2. After AP1 receives this request, it sends a ML R-TWT response 1016 back to indicate that the membership request is accepted. It can also indicate the start time 1018 of the first SL R-TWT2 SP for STA5 on link2. Then, STA5 becomes the member STA of SL R-TWT2. During the SL R-TWT2 SP 1020, STA5 can contend for the channel and transmit UL PPDUs 1024 and 1028 to AP2 if the SL R-TWT2 is not triggered-based only. The figure also shows AP2 responding to receipt of the UL PPDUs with BAs 1026 and 1030.

The interval 1022 between SL R-TWT2 SPs on link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

Figure 41:
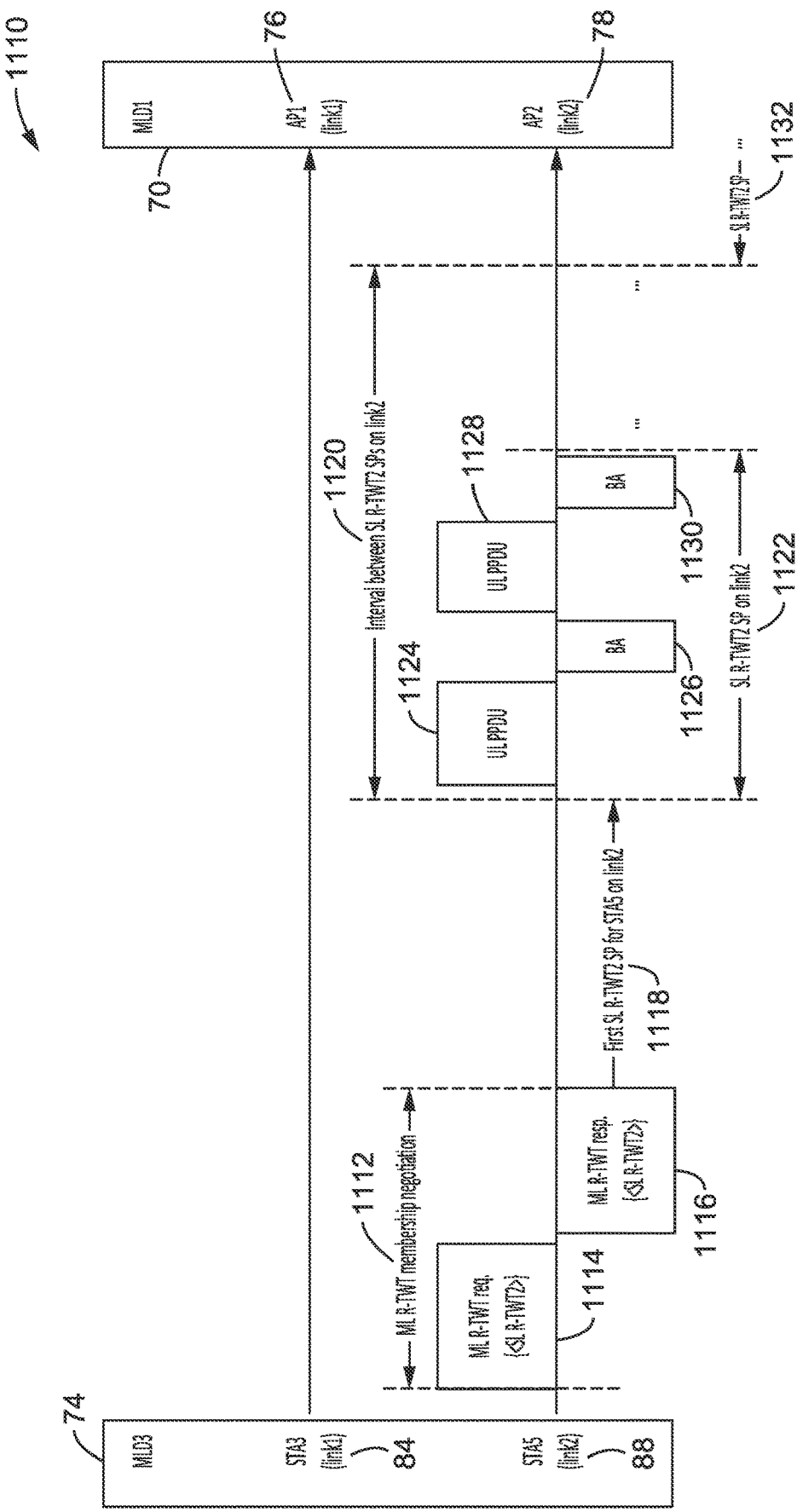
FIG. 41 is a communications diagram of a ML R-TWT setup procedure, according to at least one embodiment of the present disclosure.

FIG. 41 illustrates an example embodiment 1110 of ML R-TWT setup procedure when the Link Info field is not present in the Broadcast ML TWT Parameter Set field. Again, the figure depicts, by way of example and not limitation, interactions between MLD1 70 with AP1 76 and AP2 78 and MLD3 74 with STA3 84 and STA5 88.

An ML R-TWT membership negotiation 1112 commences with STA5 sending a ML R-TWT request frame 1114 to AP2 over link2 to request the membership of SL R-TWT2 whose SPs are scheduled on link2. After AP2 receives this request, it sends a ML R-TWT response 1116 back to indicate that the membership request is accepted. It can also indicate the start time 1118 of the first SL R-TWT2 SP for STA5 on link2. Then, STA5 becomes the member STA of SL R-TWT2 1122. During the SL R-TWT2 SP 1122, STA5 can contend for the channel and transmit UL PPDUs 1124 and 1128 to AP2 if the SL R-TWT2 is not triggered-based only. The figure also shows AP2 responding to receipt of the UL PPDUs with BAs 1126 and 1130.

The interval 1120 between SL R-TWT2 SPs on link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

It should be noted that in this case, there is no need of the Link info field. The format of ML TWT element can be the same as the TWT element. That is, the ML TWT element can be decoded by STAs which support broadcast TWT as defined in IEEE 802.11ax. Therefore, the ML TWT element can also be used for the broadcast TWT setup.

FIG. 42 illustrates an example embodiment 1210 of a ML R-TWT setup procedure over multiple links. Again, the figure depicts, by way of example and not limitation, interactions between MLD1 70 with AP1 76 and AP2 78 and MLD3 74 with STA3 84 and STA5 88.

An ML R-TWT membership negotiation 1212 commences with STA3 sending a ML R-TWT request frame 1214 to AP1 over link1 to request the membership of SL R-TWT2 whose SPs are scheduled on link2. After AP1 receives this request, it sends an ACK frame 1216 to indicate the request has been received.

Then AP1 forwards this request (not shown as it is an intra-MLD transfer) to AP2. AP2 then sends a ML R-TWT response 1218 over link2 to indicate that the membership request has been accepted. It can also indicate the start time 1222 of the first SL R-TWT2 SP for STA5 on link2. Then, STA5 sends an ACK frame 1220 to indicate it has received the response and STA5 has become a member STA of SL R-TWT2. During SL R-TWT2 SP 1226, STA5 can contend for the channel and transmit UL PPDUs 1228 and 1232 to AP2 if the SL R-TWT2 is not triggered-based only. The figure also shows AP2 responding to receipt of the UL PPDUs with BAs 1230 and 1234.

The interval 1224 between SL R-TWT2 SPs on link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

Figure 43:
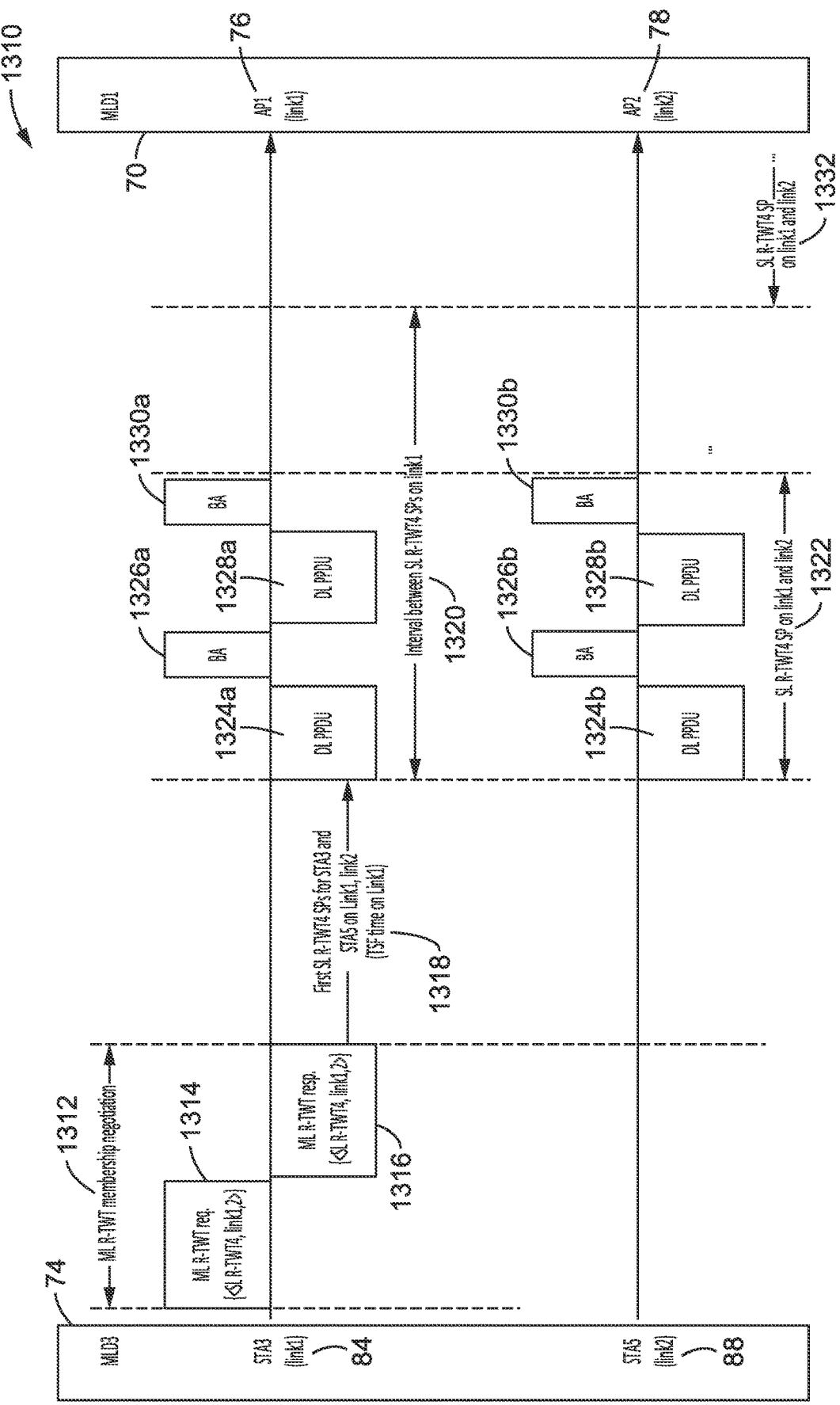
FIG. 43 is a communications diagram of a ML R-TWT setup procedure for a ML R-TWT over a link, according to at least one embodiment of the present disclosure.

FIG. 43 illustrates an example embodiment 1310 of a ML R-TWT setup procedure for a ML R-TWT over a link. In this example, the ML R-TWT consists of SL R-TWT4 on link1 and SL R-TWT4 on link2. A link Info field in the Broadcast ML TWT Parameter Set Field can represent multiple links. That is, the format of the link Info field can be as shown in FIG. 32 through FIG. 35. Again, the figure depicts, by way of example and not limitation, interactions between MLD1 70 with AP1 76 and AP2 78 and MLD3 74 with STA3 84 and STA5 88.

An ML R-TWT membership negotiation 1312 commences with STA3 sending a ML R-TWT request frame 1314 to AP1 over link1 to request the membership of SL R-TWT4 scheduled on link1 and link2. After AP1 receives this request, it sends a ML R-TWT response frame 1316 back to indicate that the membership request is accepted. The Target Wake Time field of the Broadcast ML TWT Parameter Set field of SL R-TWT4 is set to indicate the start time 1318 of the first SL R-TWT4 SP for STA3 on link1 and for STA5 on link2 in the TSF time of AP1 (on link1).

Then, STA3 becomes a member STA of R-TWT4 on link1 and STA5 becomes the member STA of R-TWT4 1322 on link2. During SL R-TWT4 SPs on link1 and link2, STA3 and STA5 exchange frames with AP1 and AP2, respectively. Thus, AP1 is shown transmitting DL PPDUs 1324a and 1328a, and receiving BAs 1326a and 1330a from STA3; while AP2 is shown transmitting DL PPDUs 1324b and 1328b, and receiving BAs 1326b and 1330b from STA5.

The interval 1320 between SL R-TWT4 SPs on link1 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

Figure 44:
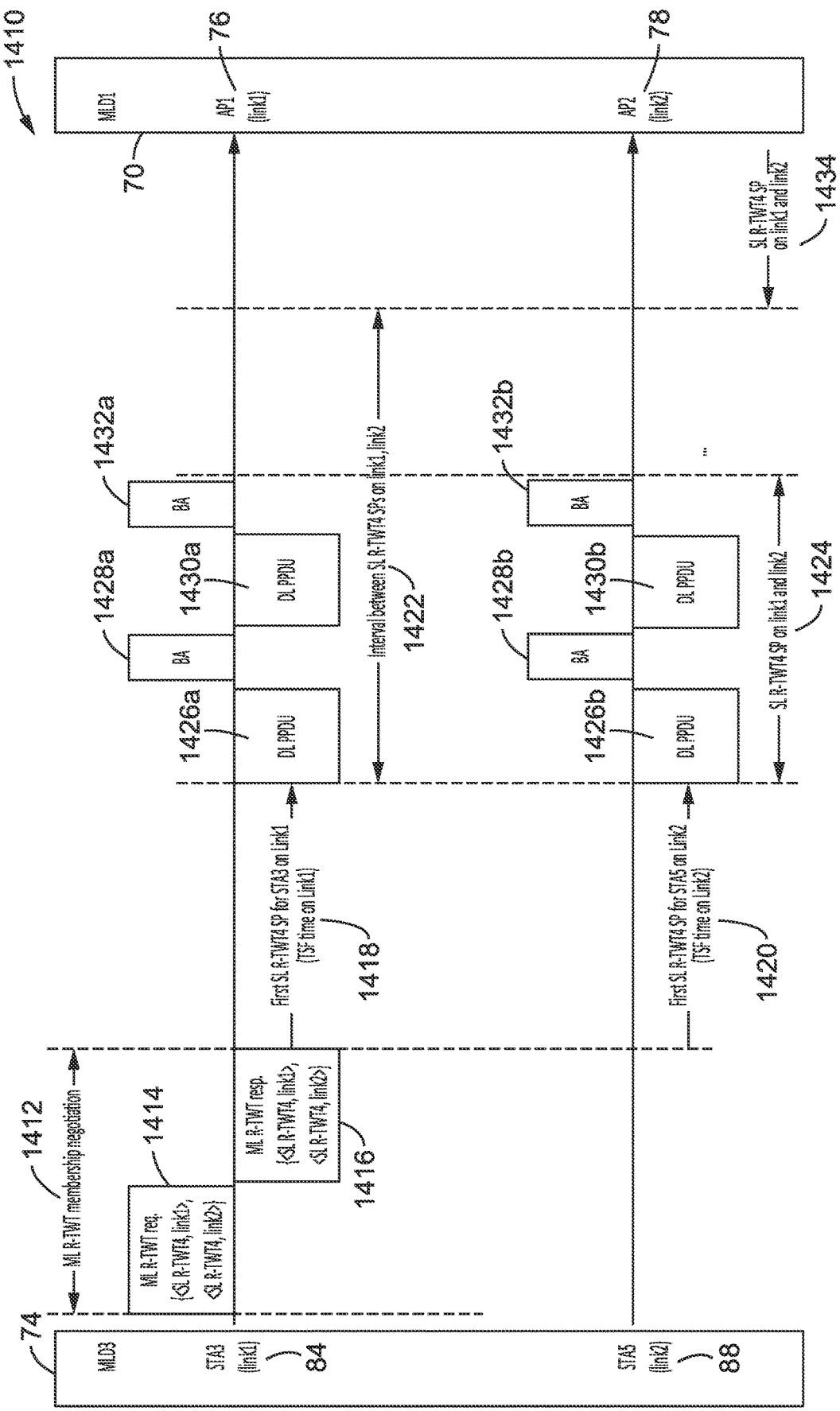
FIG. 44 is a communications diagram of a ML R-TWT setup procedure for a ML R-TWT, according to at least one embodiment of the present disclosure.

FIG. 44 illustrates an example embodiment 1410 of a ML R-TWT setup procedure for a ML R-TWT. In this example, the ML R-TWT consists of SL R-TWT4 on link1 and SL R-TWT4 on link2. Compared with the previous example, a link Info field in the Broadcast ML TWT Parameter Set Field can only represent one link. That is, the format of the link Info field can be as shown in FIG. 31 or FIG. 32 (e.g., only one bit can be set to "1"). Again, the figure depicts, by way of example and not limitation, interactions between MLD1 70 with AP1 76 and AP2 78 and MLD3 74 with STA3 84 and STA5 88.

An ML R-TWT membership negotiation 1412 commences with STA3 sending a ML R-TWT request frame to AP1 over link1 to request the membership of SL R-TWT4 scheduled on link1 and link2. After AP1 receives this request, it sends a ML R-TWT response frame 1416 back to indicate that the membership request is accepted.

The ML R-TWT request/response frames contain a ML TWT element with two Broadcast ML TWT Parameter Set fields for SL R-TWT4 on link1 and link2. The Target Wake Time field of the Broadcast ML TWT Parameter Set field for SL R-TWT4 on link1 is set to indicate the start time 1418 of the first SL R-TWT4 SP for STA3 on link1 in the TSF time of AP1 (on link1). The Target Wake Time field of the Broadcast ML TWT Parameter Set field for SL R-TWT4 on link2 is set to indicate the start time 1420 of the first SL R-TWT4 SP for STA5 on link2 in the TSF time of AP2 (on link2).

Then, STA3 becomes the member STA of R-TWT4 on link1 and STA5 becomes the member STA of R-TWT4 on link2. During SL R-TWT4 SPs on link1 and link2, STA3 and STA5 exchange frames with AP1 and AP2, respectively. In particular, AP1 is shown transmitting DL PPDUs 1426a and 1430a, and receiving BAs 1428a and 1432a from STA3; while AP2 is shown transmitting DL PPDUs 1426b and 1430b, and receiving BAs 1428b and 1432b from STA5.

The interval 1422 between SL R-TWT4 SPs on link 1 and link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

Figure 45:
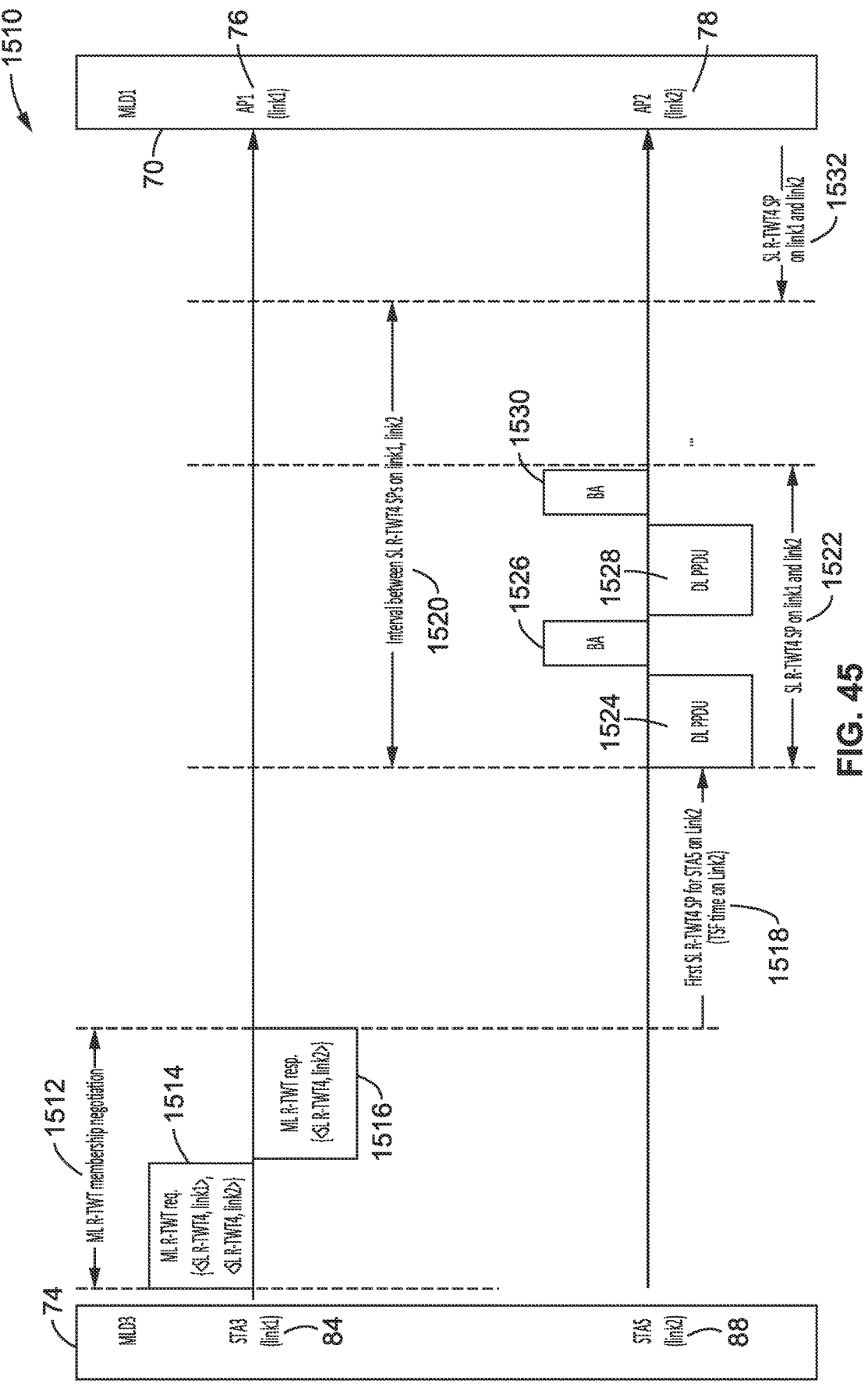
FIG. 45 is a communications diagram of a ML R-TWT setup procedure for a ML R-TWT in which only a partial request is accepted, according to at least one embodiment of the present disclosure.

FIG. 45 illustrates an example embodiment 1510 of a ML R-TWT setup procedure for a ML R-TWT in which only a partial request is accepted. In this example, the ML R-TWT consists of SL R-TWT4 on link1 and SL R-TWT4 on link2. In this example a link Info field in the Broadcast ML TWT Parameter Set Field can only represent one link. That is, the format of the link Info field can be as shown in FIG. 31 or FIG. 32 (e.g., only one bit can be set to "1"). Again, the figure depicts, by way of example and not limitation, interactions between MLD1 70 with AP1 76 and AP2 78 and MLD3 74 with STA3 84 and STA5 88.

An ML R-TWT membership negotiation 1512 commences with STA3 sending a ML R-TWT request frame 1514 to AP1 over link1 to request the membership of SL R-TWT4 scheduled on link1 and link2. After AP1 receives this request, it sends a ML R-TWT response frame 1516 back to indicate that only the membership request for SL R-TWT4 on link2 is accepted, and indicates its start time 1518.

Thus, STA5 becomes a member STA of R-TWT4 on link2, while STA3 is not a member STA of R-TWT4 on link1. During SL R-TWT4 SPs on link2, STA5 exchanges frames with AP2. In particular, AP2 is shown transmitting DL PPDUs 1524 and 1528, and receiving BAs 1526 and 1530 from STA5.

The interval 1520 between SL R-TWT4 SPs on link1 and link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

4.7.1.2 Explicit ML R-TWT

This section considers the scenario when an explicit ML R-TWT consists of one or more SL R-TWTs. Each SL R-TWT is assigned to a unique link level R-TWT ID by the R-TWT scheduled AP on its link. The R-TWT scheduling AP MLD also assigns ML level R-TWT IDs to its ML R-TWTs. In particular, the Broadcast ML TWT ID field presents in the Broadcast ML TWT Parameter Set field as shown in FIG. 28 if it is for SL R-TWT(s) belonging to a ML R-TWT.

In the examples of this section, AP1 schedules SL R-TWT1 on link1. MLD1 schedules a ML R-TWT1 consisting of SL R-TWT2 on link1 and link2.

Figure 46:
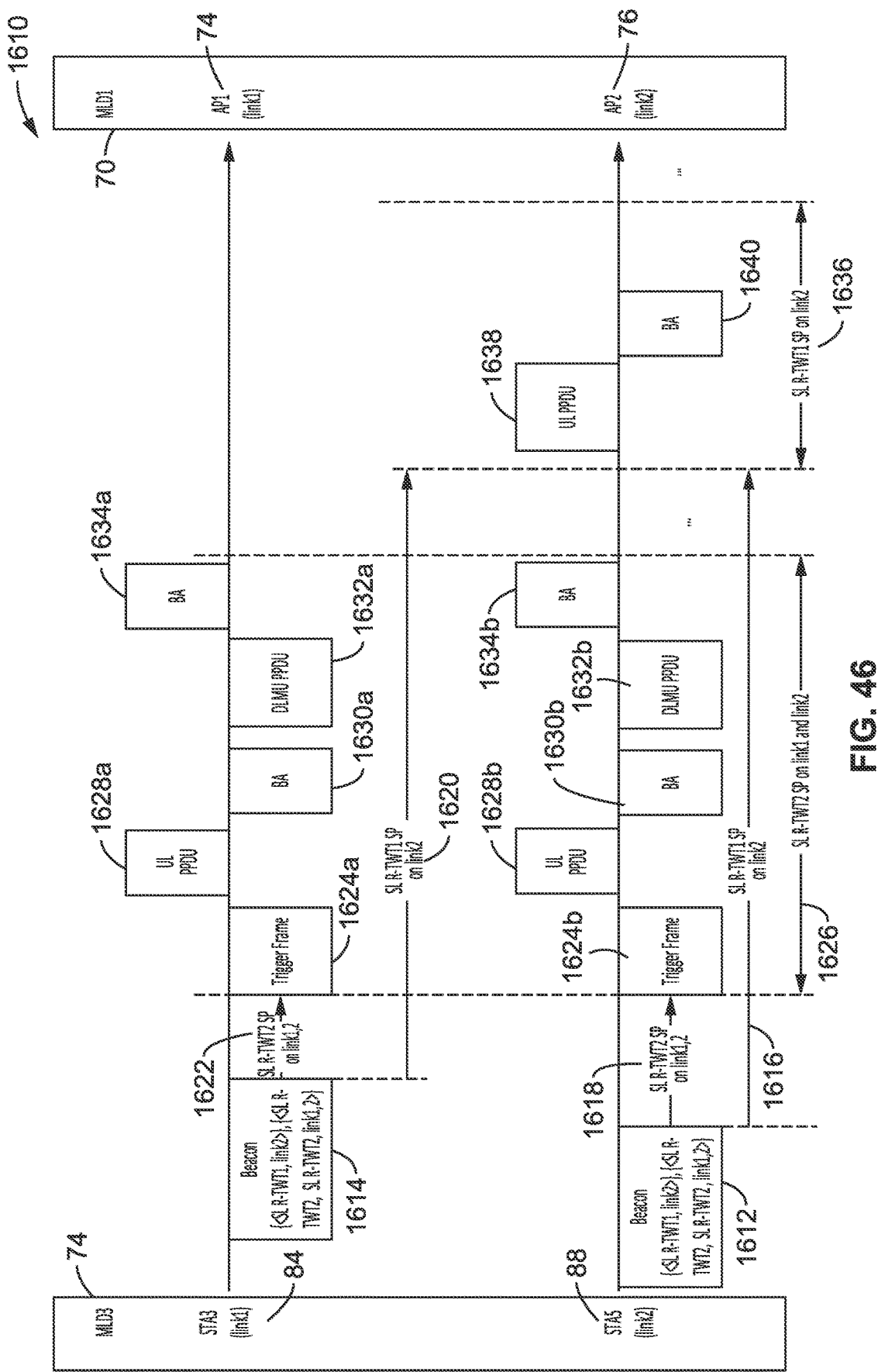
FIG. 46 is a communications diagram of R-TWT scheduling with an AP announcing the SL R-TWT scheduling and ML R-TWT scheduling in a ML TWT element, according to at least one embodiment of the present disclosure.

FIG. 46 illustrates an example embodiment 1610 of R-TWT scheduling with an AP announcing the SL R-TWT scheduling and ML R-TWT scheduling in a ML TWT element. Again, the figure depicts, by way of example and not limitation, interactions between MLD1 70 with AP1 76 and AP2 78 and MLD3 74 with STA3 84 and STA5 88.

AP1 sends a beacon 1614 on link1 carrying a ML TWT element. The ML TWT element contains two Broadcast ML TWT Parameter Set fields. One element is for scheduling SL R-TWT1 1622 and scheduling a subsequent SL R-TWT1 1620 on link2. The other one is for SL R-TWT2 on link1 and link2.

AP2 also sends a beacon 1612 on link1 carrying a SL TWT element. The SL TWT element contains two Broadcast ML TWT Parameter Set fields. One is for scheduling SL R-TWT1 1618 (same for link1 and link2) and the other for subsequent 1616 on link2 only. The other one is for SL R-TWT2 consisting of SL R-TWT2 1626 on link1 and link2.

Then, during the ML R-TWT1 SPs 1626, MLD1 can exchange frames with the members of the ML R-TWT1 on link1 and link2. During the SL R-TWT1 SPs, AP2 can exchange frames with the members of the SL R-TWT1 on link2. In particular, AP1 is seen sending TF 1624a, receiving UL PPDU 1628a, sending BA 1630a and DLMU PPDU 1632a, and receiving BA 1634a; while AP2 is seen sending TF 1624b, receiving UL PPDU 1628b, sending BA 1630b and DLMU PPDU 1632b, and receiving BA 1634b.

After the end of SL R-TWT1 SP 1616 on link 2, then another SL R-TWT1 SP 1636 on link 2 commences with STA5 transmitting UL PPDU 1638 and receiving BA 1640.

Figure 47:
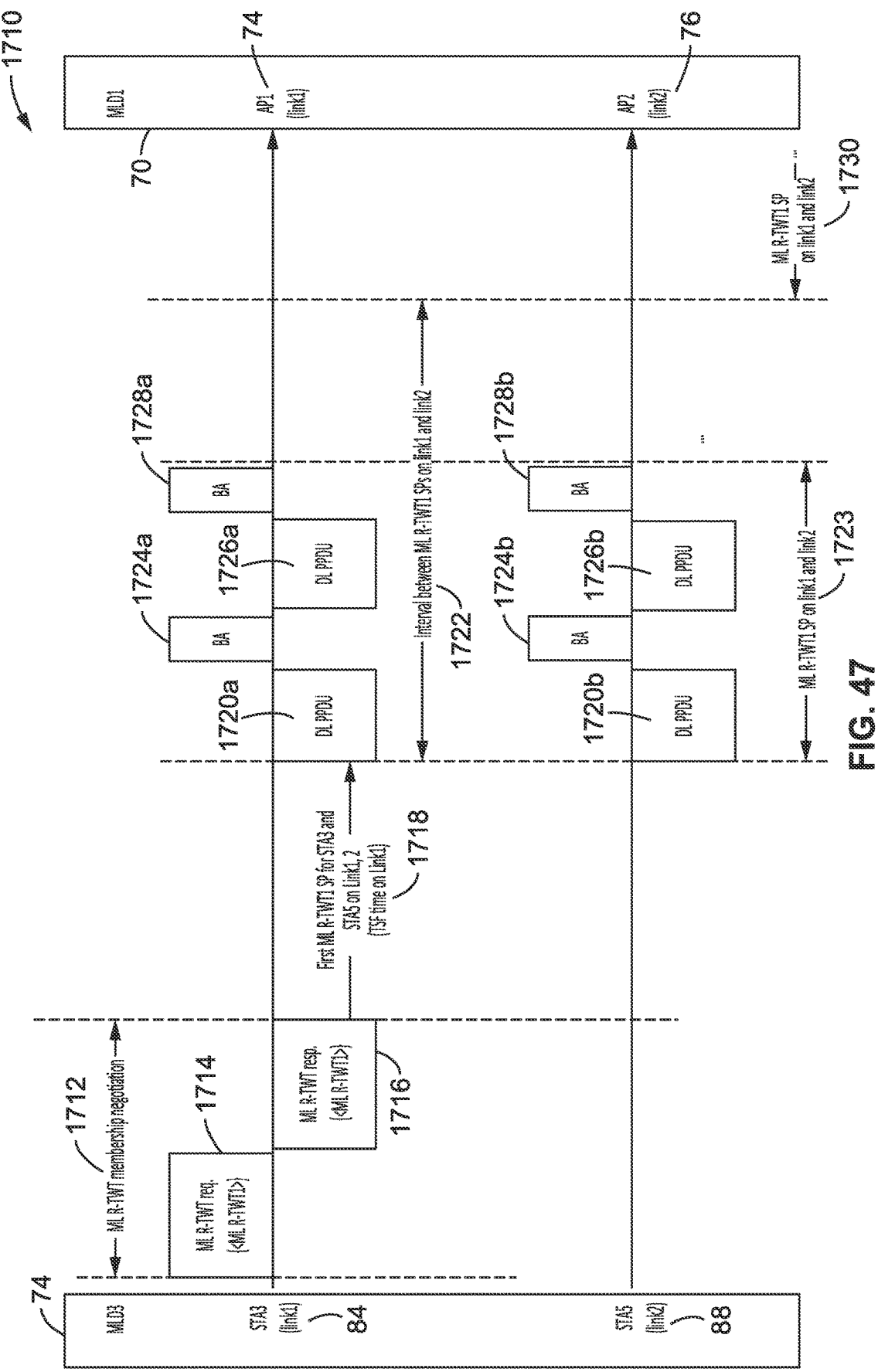
FIG. 47 is a communications diagram of a ML R-TWT setup using MLD level R-TWT ID, according to at least one embodiment of the present disclosure.

FIG. 47 illustrates an example embodiment 1710 of a ML R-TWT setup using MLD level R-TWT ID. In this example, MLD3 knows (has determined) that MLD1 has scheduled a ML R-TWT1 consisting of SL R-TWT2 on link1 and link2 as was shown in FIG. 46. Then it can request the membership of ML R-TWT1 using the MLD level R-TWT ID. Again, the figure depicts, by way of example and not limitation, interactions between MLD1 70 with AP1 76 and AP2 78 and MLD3 74 with STA3 84 and STA5 88.

An ML R-TWT membership negotiation 1712 commences with STA3 sending a ML R-TWT request frame 1714 to AP1 over link1 to request the membership of ML R-TWT1. After AP1 receives this request, it sends a ML R-TWT response frame 1716 back to indicate that the membership request is accepted, as well as a start time 1718 and end 1722.

Thus, MLD3 becomes a member of ML R-TWT1. During ML R-TWT1 SPs 1723 on link1 and link2, STA3 and STA5 exchange frames with AP1 and AP2, respectively. In particular, AP1 is shown transmitting DL PPDUs 1720a and 1726a, and receiving BAs 1724a and 1728a from STA3; while AP2 is shown transmitting DL PPDUs 1720b and 1726b, and receiving BAs 1724b and 1728b from STA5.

The interval 1722 between ML R-TWT1 SPs on link 1 and link2 is determined from the parameters set during ML R-TWT setup. The purpose is to indicates that a R-TWT schedule will have multiple SPs periodically. Outside of the R-TWT SP, all the STAs use the EDCA to contend for the channel as defined in IEEE 802.11ax except that the R-TWT scheduled STAs shall end their TXOPs before the start time of the upcoming R-TWT SP.

4.7.2. Link Info Field per ML TWT Element

This section considers the same scenario as discussed in Section 4.7.1.1 except that the Link Info field is present in the Control Field.

Figure 48:
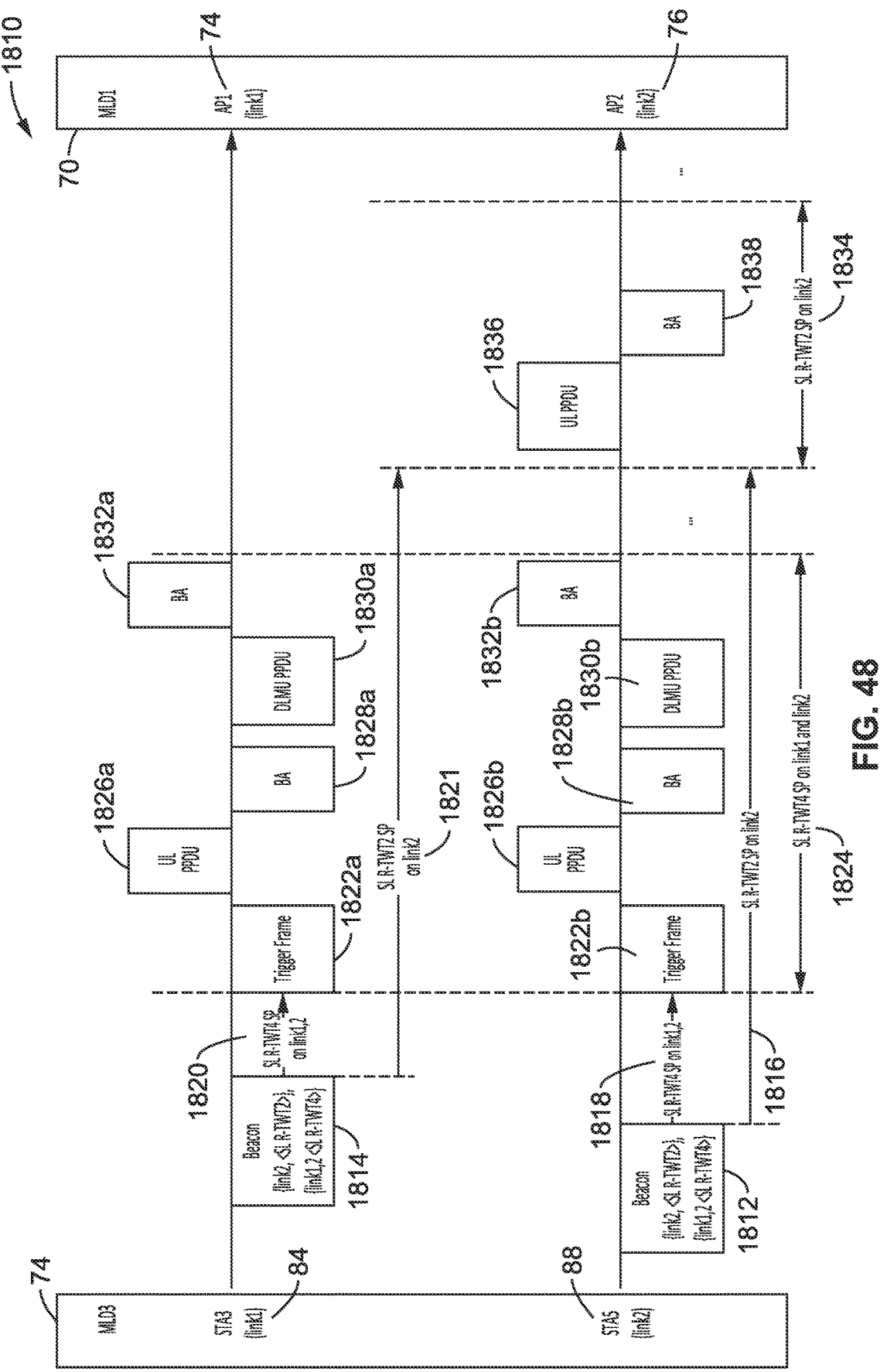
FIG. 48 is a communications diagram of R-TWT scheduling with the AP announcing all the ML R-TWT scheduling of its affiliated AP MLD, according to at least one embodiment of the present disclosure.

FIG. 48 illustrates an example embodiment 1810 of R-TWT scheduling with the AP announcing all the ML R-TWT scheduling of its affiliated AP MLD. In this example, a link Info field in the Broadcast ML TWT Parameter Set Field can represent multiple links. That is, the format of the link Info field can be as shown in FIG. 32 through FIG. 35. Again, the figure depicts, by way of example and not limitation, interactions between MLD1 70 with AP1 76 and AP2 78 and MLD3 74 with STA3 84 and STA5 88.

AP1 sends a beacon 1814 carrying two ML TWT elements on link1. The first ML TWT element carries one Broadcast ML TWT Parameter Set field to schedule 1821 SL R-TWT2 1834. In the first ML TWT element, the Link Info Field in the Control field is set to "Link2" which indicates the SL R-TWT2 is scheduled on link2. The second ML TWT element carries one Broadcast ML TWT Parameter Set field for SL R-TWT4. In the second ML TWT element, the Link Info Field in the Control field is set to "Link1 and Link2" which indicates SL R-TWT4 scheduling 1820 for SL R-TWT4 1824 on link1 and link2.

AP2 sends a beacon 1812 carrying two ML TWT elements on link2. The two elements carry the SL R-TWT2 scheduling 1816 on link2 and SL R-TWT4 scheduling 1818 on link1 and link2 the same as the beacon sent by AP1.

The remainder of the figure is the same as FIG. 38, with AP1 sending TF 1822a, and AP2 sending TF 1822b, to which STA3 and STA5, respectively, respond with UL PPDU 1826a, 1826b. Upon receiving the transmissions, the APs respond with BAs 1828a and 1828b. AP1 and AP2 are seen sending DL MU PPDUs 1830a and 1830b, and receiving BAs 1832a, 1832b from STA3 and STA5 respectively. Each of these transmissions are depicted as being aligned for links of an NSTR link pair.

Then in an SL R-TWT2 SP 1834 on link2 STA5 sends a non-triggered UL PPDU 1836 and receives a BA 1838 from AP2.

In this example, the Target Wake Time field of a Broadcast ML TWT Parameter Set field is set to the TSF time of the AP which transmits the Broadcast ML TWT Parameter Set field. For example, the Target Wake Time field of a Broadcast ML TWT Parameter Set field sent on link1 is set to TSF time of AP1 on link1. The Target Wake Time field of a Broadcast ML TWT Parameter Set field sent on link2 is set to TSF time of AP2 on link2.

4.8. ML R-TWT Operation on Special MLD Links

This section describes some ML R-TWT operations on special MLD links, such as enhanced Multi-Link Single-Radio (eMLSR) link, enhanced Multi-Link Multi-Radio (eMLMR) links, and Non-Simultaneous Transmit-Receive (NSTR) links.

Figure 49:
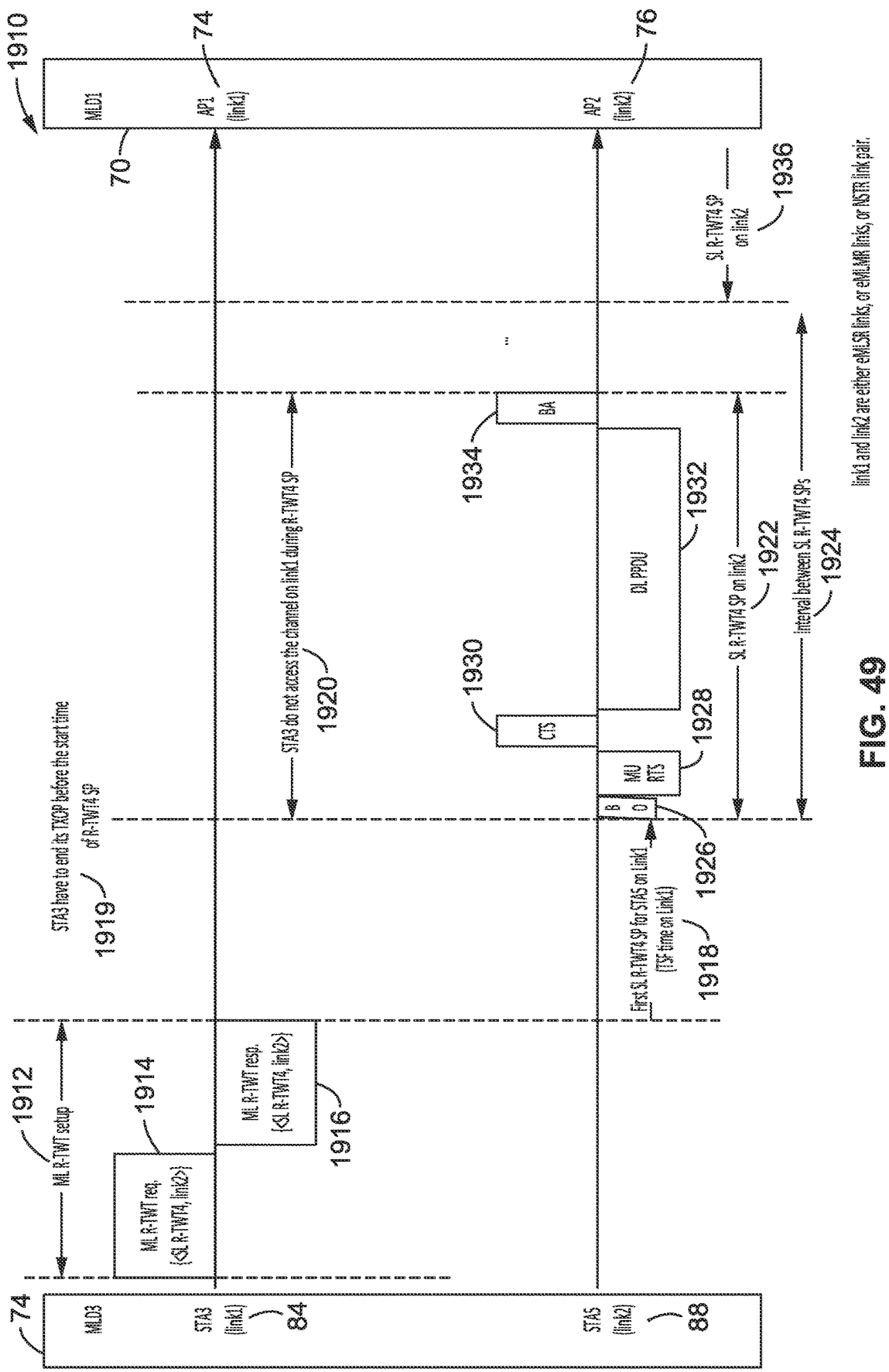
FIG. 49 is a communications diagram of ML R-TWT operations on Special MLD links, according to at least one embodiment of the present disclosure.

FIG. 49 illustrates an example embodiment 1910 of ML R-TWT Operations on Special MLD links. The network topology for the example is shown in FIG. 16. This example considers a scenario that: (a) MLD1 and MLD3 operates in eMLSR on link1 and link2, or (b) MLD1 and MLD3 operates in eMLMR mode whereby link1 and link2 are eMLMR links, or that (c) MLD3 is an NSTR MLD and link1 and link2 are a NSTR link pair of MLD3. Again, the figure depicts, by way of example and not limitation, interactions between MLD1 70 with AP1 76 and AP2 78 and MLD3 74 with non-AP STA3 84 and non-AP STA5 88.

In a ML R-TWT setup 1912, STA3 is seen requesting 1914 membership, in response to which AP1 responds with ML R-TWT response 1916 scheduling a SL R-TWT4 on link2 only, with schedule 1918 and duration 1922. Non-AP MLD3 negotiates membership of SL R-TWT4 with AP MLD1 and STA5 becomes a member of SL R-TWT4. During the SL R-TWT4 SP, STA5 can exchange the frames with AP2. Then, it is possible that STA3 has to end its TXOP on link1 1919 before the start time of R-TWT4 SP, and STA3 is not allowed to access 1920 the channel on link1 until the R-TWT4 SP ends or STA5 finishes its frame exchange with AP2 during the R-TWT4 SP.

When considering eMLSR/eMLMR delay, STA3 has to end its TXOP on link1 eMLSR/eMLMR at a given Delay time before the start time of R-TWT4 SP. AP1 is not allowed to transmit to STA3 on link1 until R-TWT4 SP ends. It will be recognized that this delay time is specified in the associated EML capability fields, which can be indicated in an association procedure.

Communications are seen with AP2 completing Backoff (BO) 1926 and sending MU Ready-To-Send (RTS) 1928, and receiving Clear-To-Send (CTS) 1930 from STA5. AP2 then sends DL PPDU 1932, which upon receipt STA5 sends BA 1934. After the interval between SL R-TWT4 SPs 1924, then another SL R-TWT4 on link2 1936 can commence.

It should be appreciated that similar conditions apply in regard to an AP operating as the TXOP and having to insure that its TXOP ends within a given amount of time before the start of R-TWT SP on a first special link.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) scheduling a multi-link (ML) restricted target wait time (R-TWT), by an AP station whose service periods (SPs) are scheduled on multiple links; (d)(ii) receiving a ML R-TWT request frame from a non-AP multiple-link device (MLD) to negotiate its membership of the ML R-TWT; (d)(iii) responding to said ML R-TWT request frame by an MLD of said AP with a ML R-TWT response frame to indicate acceptance or rejection of the ML R-TWT request frame request from the non-AP MLD; and (d)(iv) wherein the non-AP MLD becomes a member of the ML R-TWT if the AP MLD accepts its request.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) sending a frame containing multi-link (ML) target wait time (TWT) element for ML restricted-TWT (R-TWT) signaling by a non-AP STA; (d)(ii) wherein the ML TWT element carries one or more Broadcast ML TWT Parameter Set Fields; and (d)(iii) wherein the ML TWT element contains link information to indicate which links the information in the Broadcast ML TWT Parameter Set Fields is applied to as the R-TWT schedule is only scheduled on those links.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d)(i) setting up a multi-link (ML) restricted target wait time (R-TWT), by an AP station whose service periods (SPs) are scheduled on multiple links, and for which a non-AP multiple-link device (MLD) may negotiate membership in the ML R-TWT; (d)(ii) scheduling a communication over a special MLD link of a first station on a first MLD; and (d)(iii) requiring that the second station of that first MLD must end its transmit opportunity (TXOP), leaving a given delay period, before the start of the first station on that MLD exchanging frames over the special MLD link.

A wireless communication system/apparatus performing transmission of packets, where CSMA/CA is applied in the system/apparatus, comprising: (a) an AP MLD schedules a ML R-TWT whose SPs are scheduled on multiple links; (b) a non-AP MLD sends a ML R-TWT request frame to negotiate its membership of the ML R-TWT; (c) wherein the AP MLD responds with a ML R-TWT response frame to accept or reject the request from the non-AP MLD; and (d) wherein the non-AP MLD becomes a member of the ML R-TWT if the AP MLD accepts its request.

A wireless communication system/apparatus performing transmission of packets, where CSMA/CA is applied in the system/apparatus, comprising: (a) a STA sends a frame containing ML TWT element for ML R-TWT signaling; (b) wherein the ML TWT element carries one or more Broadcast ML TWT Parameter Set Fields; and (c) wherein the ML TWT element contains link information to indicate which links the information in the Broadcast ML TWT Parameter Set Fields is applied to.

The apparatus, method or system of any preceding implementation, wherein the AP MLD can announce the scheduling of the ML R-TWT in a beacon frame, a (ML) probe response frame, (re)association frame, or ML R-TWT scheduling announcement frame.

The apparatus, method or system of any preceding implementation, wherein an AP affiliated with the AP MLD can announce the scheduling of the ML R-TWT SPs on its own link only.

The apparatus, method or system of any preceding implementation, wherein an AP affiliated with the AP MLD can announce the scheduling of all the ML R-TWT scheduled by the AP MLD.

The apparatus, method or system of any preceding implementation, wherein an AP affiliated with the AP MLD can only announce the scheduling of the ML R-TWTs of which some of the SPs are scheduled on the same link of the AP.

The apparatus, method or system of any preceding implementation, wherein an AP affiliated with the AP MLD can announce the scheduling of the ML R-TWTs and SL R-TWTs in a same frame.

The apparatus, method or system of any preceding implementation, wherein a ML R-TWT can consist of one or more SL R-TWTs which are scheduled by the APs affiliated with the AP MLD on different links.

The apparatus, method or system of any preceding implementation, wherein the AP MLD can assign a unique ML level R-TWT ID to the ML R-TWT to identify the ML R-TWT.

The apparatus, method or system of any preceding implementation, wherein the AP MLD can assign a same SL level R-TWT ID to the SL R-TWTs of the ML R-TWT to indicate that those SL R-TWTs belong to a same ML R-TWT.

The apparatus, method or system of any preceding implementation, wherein the SL R-TWTs with a same SL level R-TWT ID in a same ML TWT element can be regarded as a ML R-TWT.

The apparatus, method or system of any preceding implementation, wherein the SL R-TWTs with the same SP scheduling, e.g., same SP start time, SP duration, and SP interval, on different links can be regarded as a ML R-TWT.

The apparatus as recited in claim 1, wherein the SL R-TWTs with a same ML level R-TWT ID can be regarded as a ML R-TWT.

The apparatus, method or system of any preceding implementation, wherein ML R-TWT request or response frame can contain the link information to indicate the links where the corresponding ML R-TWT parameters are applied to.

The apparatus, method or system of any preceding implementation, wherein ML R-TWT request or response frame can contain one or more ML TWT element(s) which carries the ML R-TWT information for one or more links.

The apparatus, method or system of any preceding implementation, wherein AP MLD can accept the ML R-TWT membership request on partial links of the ML R-TWT.

The apparatus, method or system of any preceding implementation, wherein the membership negotiation of a ML R-TWT can occur before AP MLD announces the scheduling of that ML R-TWT.

The apparatus, method or system of any preceding implementation, wherein the ML TWT element can share the same element ID as TWT element.

The apparatus, method or system of any preceding implementation, wherein the ML TWT element can carry one link information field to indicate which links the information in all the Broadcast ML TWT Parameter Set Fields is applied to.

The apparatus, method or system of any preceding implementation, wherein each link information field can carry one link information field to indicate which links its information is applied to.

The apparatus, method or system of any preceding implementation, wherein the AP MLD can announce the scheduling of the ML R-TWT in a beacon frame, a (ML) probe response frame, (re)association frame, or ML R-TWT scheduling announcement frame.

The apparatus, method or system of any preceding implementation, wherein an AP affiliated with the AP MLD can announce the scheduling of the ML R-TWT SPs on its own link only.

The apparatus, method or system of any preceding implementation, wherein an AP affiliated with the AP MLD can announce the scheduling of all the ML R-TWT scheduled by the AP MLD.

The apparatus, method or system of any preceding implementation, wherein an AP affiliated with the AP MLD can only announce the scheduling of the ML R-TWTs of which some of the SPs are scheduled on the same link of the AP.

The apparatus, method or system of any preceding implementation, wherein an AP affiliated with the AP MLD can announce the scheduling of the ML R-TWTs and SL R-TWTs in a same frame.

The apparatus, method or system of any preceding implementation, wherein a ML R-TWT can consist of one or more SL R-TWTs which are scheduled by the APs affiliated with the AP MLD on different links.

The apparatus, method or system of any preceding implementation, wherein the AP MLD can assign a unique ML level R-TWT ID to the ML R-TWT to identify the ML R-TWT.

The apparatus, method or system of any preceding implementation, wherein the AP MLD can assign a same SL level R-TWT ID to the SL R-TWTs of the ML R-TWT to indicate that those SL R-TWTs belong to a same ML R-TWT.

The apparatus, method or system of any preceding implementation, wherein the SL R-TWTs with a same SL level R-TWT ID in a same ML TWT element can be regarded as a ML R-TWT.

The apparatus, method or system of any preceding implementation, wherein the SL R-TWTs with the same SP scheduling, e.g., same SP start time, SP duration, and SP interval, on different links can be regarded as a ML R-TWT.

The apparatus, method or system of any preceding implementation, wherein the SL R-TWTs with a same ML level R-TWT ID can be regarded as a ML R-TWT.

The apparatus, method or system of any preceding implementation, wherein ML R-TWT request or response frame can contain the link information to indicate the links where the corresponding ML R-TWT parameters are applied to.

The apparatus, method or system of any preceding implementation, wherein ML R-TWT request or response frame can contain one or more ML TWT element(s) which carries the ML R-TWT information for one or more links.

The apparatus, method or system of any preceding implementation, wherein AP MLD can accept the ML R-TWT membership request on partial links of the ML R-TWT.

The apparatus, method or system of any preceding implementation, wherein the membership negotiation of a ML R-TWT can occur before AP MLD announces the scheduling of that ML R-TWT.

The apparatus, method or system of any preceding implementation, wherein the ML TWT element can share the same element ID as TWT element.

The apparatus, method or system of any preceding implementation, wherein the ML TWT element can carry one link information field to indicate which links the information in all the Broadcast ML TWT Parameter Set Fields is applied to.

The apparatus, method or system of any preceding implementation, where each link information field can carry one link information field to indicate which links its information is applied to.

The apparatus, method or system of any preceding implementation, wherein said special MLD link comprises a non-simultaneous transmit receive (NSTR) link.

The apparatus, method or system of any preceding implementation, wherein said special MLD link comprises an enhanced multi-link single-radio (eMLSR) link.

The apparatus, method or system of any preceding implementation, wherein said special MLD link comprises an enhanced Multi-Link Multi-Radio (eMLMR) link.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, the apparatus comprising:
   (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) scheduling a multi-link (ML) restricted target wait time (R-TWT), by an AP station whose service periods (SPs) are scheduled on multiple links;
      (ii) receiving a ML R-TWT request frame from a non-AP multiple-link device (MLD) to negotiate its membership of the ML R-TWT;
      (iii) responding to said ML R-TWT request frame by an MLD of said AP with a ML R-TWT response frame to indicate acceptance or rejection of the ML R-TWT request frame request from the non-AP MLD; and
      (iv) wherein the non-AP MLD becomes a member of the ML R-TWT if the AP MLD accepts its request.

2. The apparatus as recited in claim 1, wherein the AP MLD can announce the scheduling of the ML R-TWT in a beacon frame, a (ML) probe response frame, (re)association frame, or ML R-TWT scheduling announcement frame.

3. The apparatus as recited in claim 1, wherein an AP affiliated with the AP MLD can announce the scheduling of the ML R-TWT SPs on its own link only.

4. The apparatus as recited in claim 1, wherein an AP affiliated with the AP MLD can announce the scheduling of all the ML R-TWT scheduled by the AP MLD.

5. The apparatus as recited in claim 1, wherein an AP affiliated with the AP MLD can only announce the scheduling of the ML R-TWTs of which some of the SPs are scheduled on the same link of the AP.

6. The apparatus as recited in claim 1, wherein an AP affiliated with the AP MLD can announce the scheduling of the ML R-TWTs and SL R-TWTs in a same frame.

7. The apparatus as recited in claim 1, wherein a ML R-TWT can consist of one or more SL R-TWTs which are scheduled by the APs affiliated with the AP MLD on different links.

8. The apparatus as recited in claim 1, wherein the AP MLD can assign a unique ML level R-TWT ID to the ML R-TWT to identify the ML R-TWT.

9. The apparatus as recited in claim 1, wherein the AP MLD can assign a same SL level R-TWT ID to the SL R-TWTs of the ML R-TWT to indicate that those SL R-TWTs belong to a same ML R-TWT.

10. The apparatus as recited in claim 1, wherein the SL R-TWTs with a same SL level R-TWT ID in a same ML TWT element can be regarded as a ML R-TWT.

11. The apparatus as recited in claim 1, wherein the SL R-TWTs with the same SP scheduling, e.g., same SP start time, SP duration, and SP interval, on different links can be regarded as a ML R-TWT.

12. The apparatus as recited in claim 1, wherein the SL R-TWTs with a same ML level R-TWT ID can be regarded as a ML R-TWT.

13. The apparatus as recited in claim 1, wherein ML R-TWT request or response frame can contain the link information to indicate the links where the corresponding ML R-TWT parameters are applied to.

14. The apparatus as recited in claim 1, wherein ML R-TWT request or response frame can contain one or more ML TWT element(s) which carries the ML R-TWT information for one or more links.

15. The apparatus as recited in claim 1, wherein AP MLD can accept the ML R-TWT membership request on partial links of the ML R-TWT.

16. The apparatus as recited in claim 1, wherein the membership negotiation of a ML R-TWT can occur before AP MLD announces the scheduling of that ML R-TWT.

17. An apparatus for wireless communication in a network, the apparatus comprising:
(a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
(b) a processor coupled to said wireless communication circuit for operating on the WLAN;
(c) a non-transitory memory storing instructions executable by the processor for communicating with other STAs; and
(d) wherein said instructions, when executed by the processor, perform steps of a wireless communications protocol for said wireless communication circuit, comprising:
(i) sending a frame containing multi-link (ML) target wait time (TWT) element for ML restricted-TWT (R-TWT) signaling by a non-AP STA;
(ii) wherein the ML TWT element carries one or more Broadcast ML TWT Parameter Set Fields; and
(iii) wherein the ML TWT element contains link information to indicate which links the information in the Broadcast ML TWT Parameter Set Fields is applied to as the R-TWT schedule is only scheduled on those links.

18. The apparatus as recited in claim 17, wherein the ML TWT element can share the same element ID as TWT element.

19. The apparatus as recited in claim 17, wherein the ML TWT element can carry one link information field to indicate which links the information in all the Broadcast ML TWT Parameter Set Fields is applied to.

20. The apparatus as recited in claim 17, wherein each link information field can carry one link information field to indicate which links its information is applied to.

21. An apparatus for wireless communication in a network, the apparatus comprising:
(a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
(b) a processor coupled to said wireless communication circuit for operating on the WLAN;
(c) a non-transitory memory storing instructions executable by the processor for communicating with other STAs; and
(d) wherein said instructions, when executed by the processor, perform steps of a wireless communications protocol for said wireless communication circuit, comprising:
(i) setting up a multi-link (ML) restricted target wait time (R-TWT), by an AP station whose service periods (SPs) are scheduled on multiple links, and for which a non-AP multiple-link device (MLD) may negotiate membership in the ML R-TWT;
(ii) scheduling a communication over a special MLD link of a first station on a first MLD; and
(iii) requiring that the second station of that first MLD must end its transmit opportunity (TXOP), leaving a given delay period, before the start of the first station on that MLD exchanging frames over the special MLD link.

22. The apparatus of claim 21, wherein said special MLD link comprises a non-simultaneous transmit receive (NSTR) link.

23. The apparatus of claim 21, wherein said special MLD link comprises an enhanced multi-link single-radio (eMLSR) link.

24. The apparatus of claim 21, wherein said special MLD link comprises an enhanced Multi-Link Multi-Radio (eMLMR) link.

* * * * *